United States Patent
Ahuja et al.

(10) Patent No.: US 10,636,187 B2
(45) Date of Patent: *Apr. 28, 2020

(54) METHODS AND SYSTEMS FOR IMAGES WITH INTERACTIVE FILTERS

(71) Applicant: Glu Mobile, Inc., San Francisco, CA (US)

(72) Inventors: Sourabh Ahuja, San Francisco, CA (US); Liang Wu, San Francisco, CA (US); Michael Mok, San Francisco, CA (US); Lian A. Amaris, Oakland, CA (US)

(73) Assignee: Glu Mobile Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,970

(22) Filed: Dec. 13, 2017

(65) Prior Publication Data

US 2018/0165858 A1    Jun. 14, 2018

Related U.S. Application Data

(63) Continuation of application No. 14/984,111, filed on Dec. 30, 2015, now Pat. No. 9,875,566, which is a (Continued)

(51) Int. Cl.
*G09G 5/377* (2006.01)
*G06T 11/60* (2006.01)
(Continued)

(52) U.S. Cl.
CPC ............... *G06T 11/60* (2013.01); *G06F 3/01* (2013.01); *G06F 3/0482* (2013.01);
(Continued)

(58) Field of Classification Search
None
See application file for complete search history.

(56) References Cited

U.S. PATENT DOCUMENTS 5,388,194 A    2/1995 Vogel
5,548,340 A  *  8/1996 Bertram .................. G06F 3/033
                                                     345/632

(Continued)

FOREIGN PATENT DOCUMENTS

WO    WO 2013/116937 A1    8/2013

OTHER PUBLICATIONS

Apple Inc., "Wiper Messenger: Share YouTube Videos", p. 1-2, Last Accessed: Aug. 22, 2014, https://itunes.apple.com/us/app/wiper-messenger/id828356683?ls=1&mt=8.

(Continued)

*Primary Examiner* — Diane M Wills
(74) *Attorney, Agent, or Firm* — Morgan, Lewis & Bockius LLP; Brett A. Lovejoy

(57) ABSTRACT

At a first device there is received from a second device (i) a native pixilated image and (ii) interactive filter data associated with the image. The filter data corresponds to an interactive filter applied to the image. A first representation of the image is displayed in accordance with the interactive filter data on the display. All or a first subset of the pixels of the image are obscured in the first representation. Responsive to user input, for a limited period of time, a second representation of the image is displayed in place of the first representation. None or a second subset of the pixels of the image is obscured in the second representation, where the second subset is less than the first subset. Then there is displayed on the display, after the limited period of time has elapsed, the first representation in place of the second representation.

33 Claims, 46 Drawing Sheets

Related U.S. Application Data continuation of application No. 14/465,747, filed on Aug. 21, 2014, now Pat. No. 9,230,355.

(51) Int. Cl.

| | | |
|---|---|---|
| *G06T 5/00* | (2006.01) | |
| *G06T 11/00* | (2006.01) | |
| *G06F 3/01* | (2006.01) | |
| *G06F 3/0481* | (2013.01) | |
| *G06F 3/0482* | (2013.01) | |
| *G06F 3/0485* | (2013.01) | |
| *G06F 3/0488* | (2013.01) | |
| *G06T 5/10* | (2006.01) | |

(52) U.S. Cl.
CPC ........ *G06F 3/0485* (2013.01); *G06F 3/04817* (2013.01); *G06F 3/04883* (2013.01); *G06T 5/001* (2013.01); *G06T 5/10* (2013.01); *G06T 11/001* (2013.01); *G06F 2203/04802* (2013.01); *G06T 2207/20024* (2013.01); *G06T 2207/20092* (2013.01); *G06T 2207/20221* (2013.01); *G09G 5/377* (2013.01)

(56) References Cited

U.S. PATENT DOCUMENTS

| | | | |
|---|---|---|---|
| 5,710,839 A | 1/1998 | Cok | |
| 8,731,620 B2 | 5/2014 | Roberts et al. | |
| 2003/0038820 A1 | 2/2003 | Purpura | |
| 2004/0075670 A1 | 4/2004 | Bezine et al. | |
| 2006/0036949 A1 | 2/2006 | Moore et al. | |
| 2007/0156689 A1 | 7/2007 | Meek et al. | |
| 2007/0209021 A1 | 9/2007 | Chien et al. | |
| 2007/0299925 A1 | 12/2007 | Kirkland | |
| 2009/0204920 A1 | 8/2009 | Beverley et al. | |
| 2009/0315895 A1 | 12/2009 | Pahud et al. | |
| 2012/0176401 A1* | 7/2012 | Hayward | G06T 3/0093 345/619 |
| 2012/0287300 A1 | 11/2012 | Edwards et al. | |
| 2012/0326993 A1 | 12/2012 | Weisman | |
| 2013/0194301 A1* | 8/2013 | Robbins | G06F 21/60 345/629 |
| 2014/0028674 A1 | 1/2014 | Eldin | |
| 2014/0075335 A1 | 3/2014 | Hicks | |
| 2014/0160112 A1 | 6/2014 | Yaron et al. | |
| 2014/0164980 A1* | 6/2014 | Clausen | G06F 3/04883 715/778 |
| 2014/0181634 A1 | 6/2014 | Compain et al. | |
| 2014/0201844 A1 | 7/2014 | Buck | |
| 2014/0218393 A1* | 8/2014 | Lee | G06F 3/0481 345/619 |
| 2014/0331188 A1* | 11/2014 | Sandstrom | G06F 3/04883 715/863 |
| 2015/0277638 A1* | 10/2015 | Bustamante | G06F 3/0412 345/173 |
| 2015/0371049 A1* | 12/2015 | Xavier | G06T 11/60 726/26 |

OTHER PUBLICATIONS

Confide, "Your Off-the-Record Messenger," 2014, located at https://web.archive.org/web/20140919052648/https:/getconfide.com/, accessed on Dec. 18, 2015, 2 pages.

Confide, "Your Off-The-Record Messenger," 2015, located at https://getconfide.com/, accessed on Dec. 18, 2015, 6 pages.

Google, "Wiper Messenger: Share YouTube", p. 1-2, Last Accessed: Aug. 25, 2014, https://play.google.com/store/apps/details?id=com.gowiper.android.

Inviting and Connecting to Friends, https://gowiper.com/faq/, 1, Wiper, Inc.

Lawler, R., "Confide Raises $1.9 Million In Seed Funding To Bring Disappearing Messages To Enterprise Users," Feb. 4, 2014, located at http://techcrunch.com/2014/02/04/confide-1-9m/, accessed on Dec. 18, 2015, 4 pages.

Ovide, S., "Capitalizing on the Sony Hack, a Secret Messaging App Is Pitching Hollywood," *The Wall Street Journal*, Dec. 23, 2014, located at http://blogs.wsj.com/digits/2014/12/23/capitalizing-on-sony-hack-secret-messaging-app-pitches-hollywood/tab/print/, accessed on Dec. 18, 2015, 3 pages.

Reisinger, D., "App maker pitches self-destruct messaging to Hollywood," Dec. 23, 2014, located at http://www.cnet.com/news/confide-targets-sony-pictures-celebs-in-new-pitch-to-hollywood/, accessed on Dec. 18, 2015, 3 pages.

Smith, C., This app will let you delete all your drunk texts once you sober up, http://bgr.com/2014/07/25/wiper-ios-and-android-messaging-app/, Jul. 25, 2014, 1, BGR Media, LLC.

Tweedie, S., "If You've Ever Wanted To Erase Your Texts From Someone Else's Phone, Then You Should Try Wiper", http://www.businessinsider.com/wiper-app-completely-erase-conversations-2014-7, Jul. 24, 2014, 1, Business Insider Inc.

Wiper Inc., "Wiper is fun, fast music sharing with private texting and calling", p. 1-5, Last Accessed: Aug. 22, 2014, https://gowiper.com/.

Wiper Inc.,"Inviting and Connecting to Friends", p. 1-9, Last Accessed: Aug. 22, 2014, https://gowiper.com/faq/.

Wiper Messenger: Share YouTube Videos, https://itunes.apple.com/us/app/wiper-messenger/id828356683?ls=1&mt=8, 1, Apple Inc.

Wiper Messenger: Share YouTube, https://play.google.com/store/apps/details?id=com.gowiper.android, 1, Google.

\* cited by examiner

Nearby

| | | |
|---|---|---|
| 👤 S...a | 5170-1 | <0.5 miles away |
| 👤 L...u | 5170-2 | 1 mile away |
| 👤 K...z | 5170-3 | 2 miles away |
| 👤 I...e | 5170-4 | 2 miles away |
| 👤 M...k | 5170-5 | 6 miles away |
| 👤 T...o | 5170-6 | 10 miles away |
| 👤 C...n | 5170-7 | 13 miles away |

FIGURE 5LL ured in the memory and configured to 60
METHODS AND SYSTEMS FOR IMAGES WITH INTERACTIVE FILTERS

CROSS REFERENCE TO RELATED APPLICATIONS

This application is a continuation of U.S. patent application Ser. No. 14/984,111, entitled "Methods and Systems for Images with Interactive Filters," filed Dec. 30, 2015, which is a continuation of U.S. Pat. No. 9,230,355, entitled "Methods and Systems for Images with Interactive Filters," filed Aug. 21, 2014, each of which is hereby incorporated by reference.

TECHNICAL FIELD

The present application generally describes digital images, and more particularly images with interactive filters.

BACKGROUND

With the growth of the Internet, sharing of images has become a popular form of content sharing amongst users on the Internet. Users can send images to each other, post images to social networks and online photo album sites, and so on. Along with image sharing, modifying images before and after sharing has also become popular. Popular ways to modify images include adding user-generated drawings, applying pre-defined virtual stickers, and applying filters. However, these image modifications, as a whole, have become common and thus can feel stale and uninteresting in the minds of users. Thus, new ways of modifying images that refresh the concept of image modification, as well as serve other purposes, are desirable.

SUMMARY

In accordance with some implementations, a method is performed at a device with a display and an input device. The method includes: selecting an image; selecting an interactive filter; generating interactive filter data associated with the image and corresponding to the selected interactive filter; displaying a first representation of the image in accordance with the interactive filter data; receiving a user input; and in accordance with the user input and the interactive filter data, displaying a second representation of the image.

In accordance with some implementations, a method is performed at a first device with a display and an input device. The method includes: receiving, from a second device, an image and interactive filter data associated with the image; displaying a first representation of the image in accordance with the interactive filter data; receiving a user input; and in accordance with the user input and the interactive filter data, displaying a second representation of the image.

In accordance with some implementations, an electronic device includes a display, an input device, one or more processors, memory, and one or more programs; the one or more programs are stored in the memory and configured to be executed by the one or more processors and the one or more programs include instructions for performing the operations of any of the methods described above. In accordance with some implementations, a graphical user interface on an electronic device with a display, an input device, a memory, and one or more processors to execute one or more programs stored in the memory includes one or more of the elements displayed in any of the methods described above, which are updated in response to inputs, as described in any of the methods described above. In accordance with some implementations, a computer readable storage medium has stored therein instructions, which, when executed by an electronic device with a display, an input device, and one or more processors, cause the device to perform the operations of any of the methods described above. In accordance with some implementations, an electronic device includes: a display, an input device, and means for performing the operations of any of the methods described above.

BRIEF DESCRIPTION OF THE DRAWINGS

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
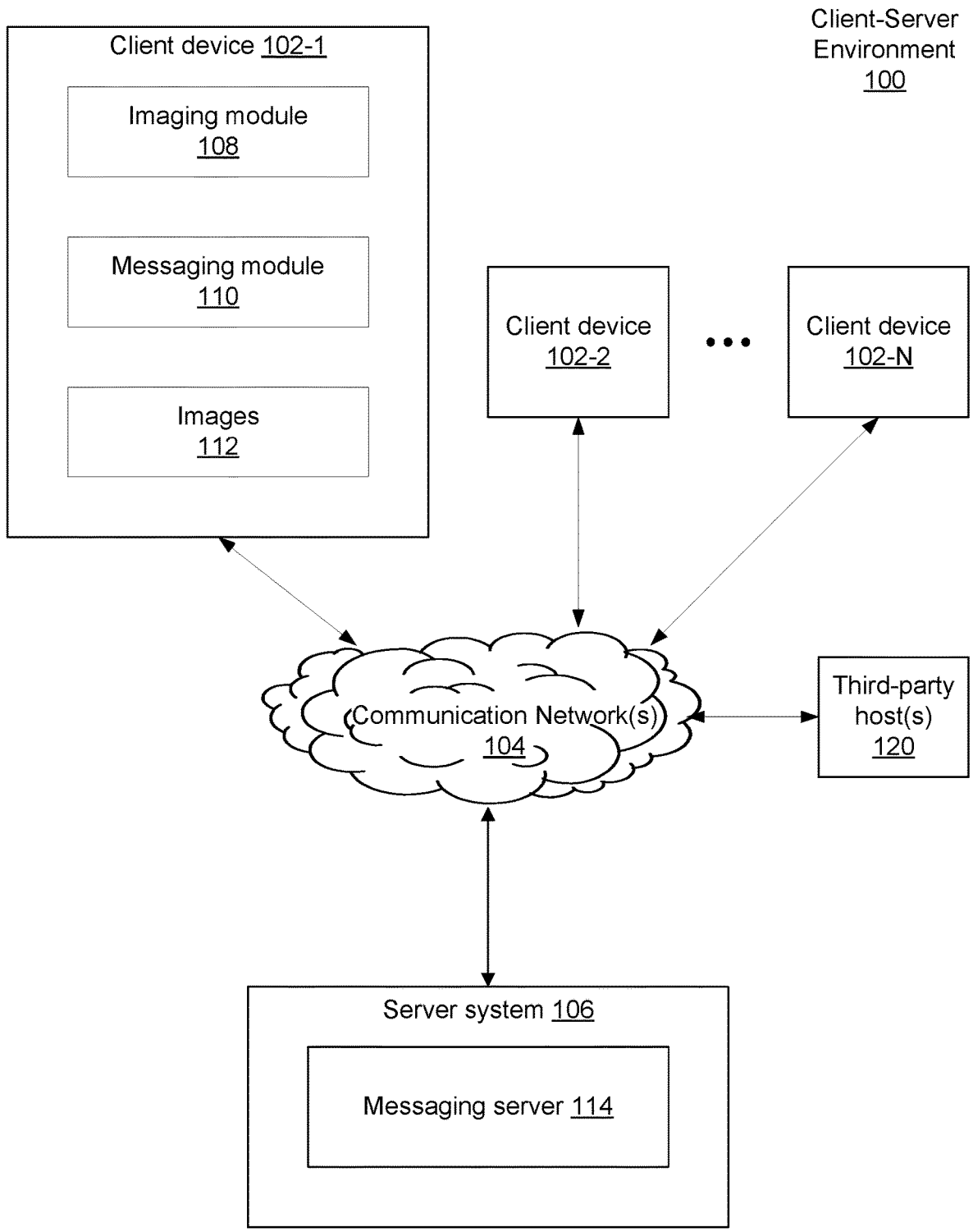
FIG. 1 is a diagram illustrating a client-server system in accordance with some implementations.

FIG. 1 illustrates a client-server environment 100 in accordance with some implementations. The client-server environment 100 includes client devices 102, a server system 106, and optionally one or more third-party hosts 120. The client devices 102, server system 106, and third-party hosts 120 are communicatively coupled by one or more communication networks 104.

In some implementations, the client-server environment 100 is a messaging environment, in which client devices 102 can send messages (e.g., chat messages, email messages) and other content (e.g., images, videos, audio) to each other through the server system 106. The client-server environment 100 in FIG. 1 is described as a messaging environment as an example and for ease of understanding. It should be appreciated, however, that the client-server environment 100 may be configured for other applications as well.

The communication network(s) 104 can be any wired or wireless local area network (LAN) and/or wide area network (WAN), such as an intranet, an extranet, or the Internet. It is sufficient that the communication network 104 provides communication capability between the client devices 102, the server system 106, and the third-party hosts 120. In some implementations, the communication network(s) 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The client-server environment includes multiple client devices 102 (e.g., clients 102-1 thru 102-N in FIG. 1). A respective client device 102 is any suitable computing device that, in some implementations, is capable of connecting to the communication network(s) 104, receiving from the server system 106 messages and content transmitted by other client devices 102, sending to the server system 106 messages and content that are ultimately transmitted to other client devices 102, and displaying, managing, and editing images. In some implementations, the client device 102 is a smartphone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook, a gaming device, a multimedia player device, or any other device that is capable of sending and receiving messages and content, as well as presenting (e.g., displaying), managing, and editing images. In some implementations, the client device 102 includes an image capture device (e.g., a camera).

In some implementations, the client device 102 includes an imaging module 108, messaging module 110, and one or more images 112. The client device 102 stores images 112 that are captured (e.g., with an image capture device on the client device 102) or received (e.g., received in a message, downloaded from online content). The client device 102 is configured to, with user input, manage, edit, and present the images 112 using the imaging module 108. In some implementations, the client device 102 is configured to send and receive messages and content to/from other client devices 102 using the messaging module 110. In some implementations, the client device 102 also includes other modules, such as a content sharing module. In some implementations, the imaging module 108 and messaging module 110 are part of the same client application (e.g., a messaging application with image editing and management features). In some other implementations, the imaging module 108 and messaging module 110 are in separate client applications in the client device 102.

Within the logical organization of files and data stored in the client device 102, the images 112 are placed in a "camera roll" or "gallery" (hereinafter collectively referred to as "gallery" for convenience), which is a collection of images captured and received by the client device 102. In some implementations, the client device 102 includes a device-wide gallery that client applications in the client device 102 can access (e.g., to store images to, to read images from), with user authorization. In some implementations, the client device 102 also includes a gallery exclusive to the imaging module 108, separate from the device-wide gallery.

Messages and content sent by a client device 102 are sent to the server system 106, which then sends the messages and content to respective destination client devices 102. In some implementations, the server system 106 includes a messaging server 114. The messaging server 114 operates a messaging service in which client devices 102 can send and receive messages and content to/from each other. The messaging server 114 facilitates connections between client devices 102 for sending and receiving messages and content, receiving messages and content from client devices 102, sending the messages and content to destination client devices 102, and maintains user accounts and data with respect to the messaging service. The messaging server 114 also stores, in the server system 106, copies of the messages and content sent by client devices 102.

The server system 106 is described herein as a single server computer for sake of convenience and ease of understanding. It should be appreciated, however, that the server system 106 may be implemented as a single server computer or as multiple server computers (e.g., in a distributed server system).

The client-server environment 100 optionally includes one or more third-party hosts 120. In some implementations, the third-party host is a website (e.g., conventional website, a blog, an online forum, an online message board), a social networking service (e.g., Facebook, Twitter), or an image sharing service (e.g., Instagram, Flickr). In some implementations, a client device 102 is configured to, in accordance with user command, transmit one or more images 112 to a third-party host 120, where the image 112 can be viewed and accessed by other users. For example, a user of a client device 102 can share an image 112 with other users (e.g., friends, the public) by commanding the client device 102 to transmit the image 112 to a third-party host 120 for posting (e.g., in a social network status update, in a webpage).

Returning to the client device 102, a user can edit images 112 stored at the client device 102 using the imaging module 108. The imaging module 108 is configured to enable the user to make virtual drawings (e.g., doodles) on, apply virtual stickers (e.g., predefined icons, logos, etc.) onto, and apply non-interactive and interactive filters onto, any respective image 112. Images 112 with interactive filters, etc. can be sent to other client devices 102. Further details regarding images with interactive filters are described below.

Figure 2:
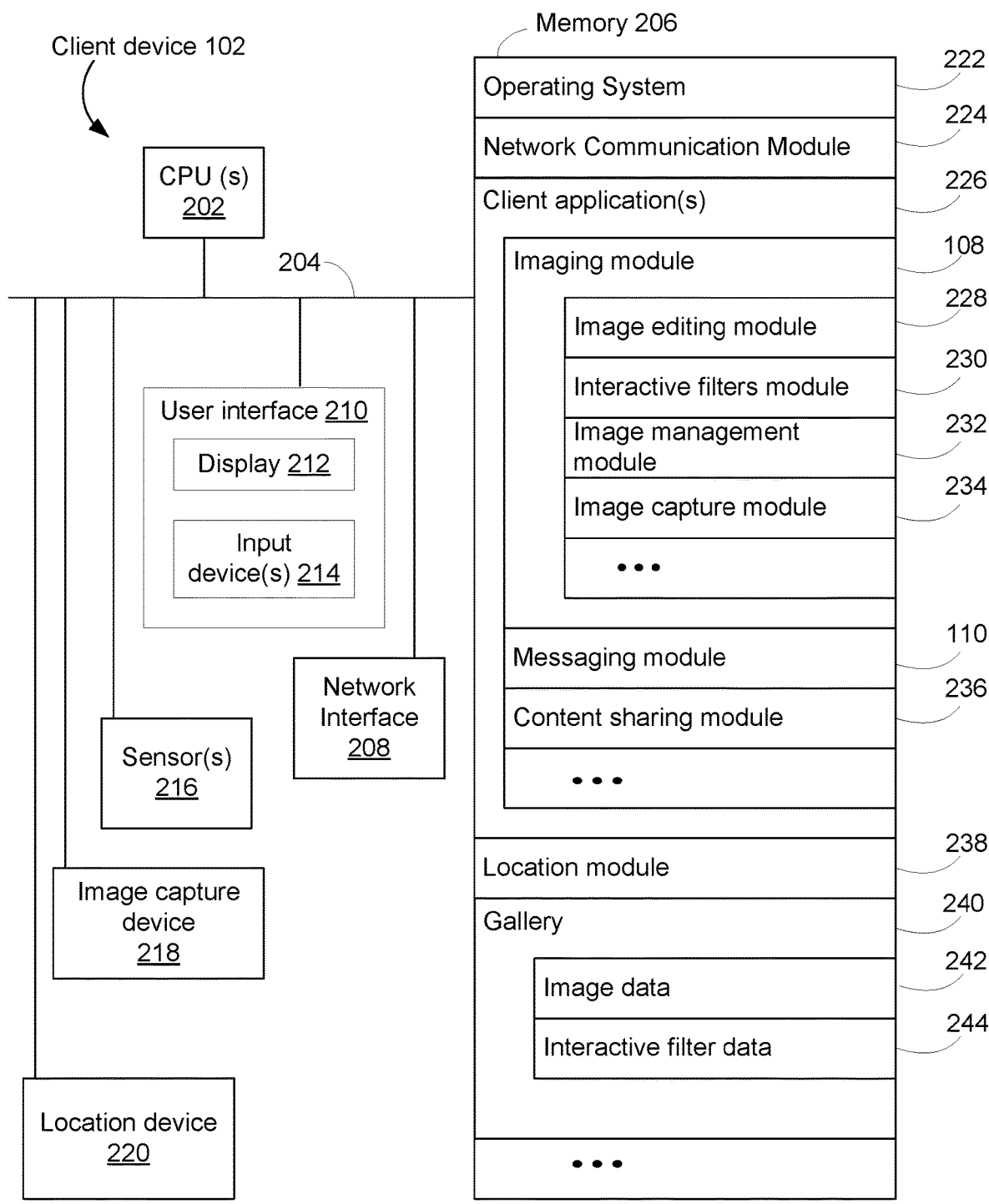
FIG. 2 is a block diagram illustrating a client device in accordance with some implementations.

FIG. 2 is a block diagram illustrating a client device 102 in accordance with some implementations. The client device 102 typically includes one or more processing units (CPU's) 202, one or more network or other communications interfaces 208, memory 206, and one or more communication buses 204, for interconnecting these components. The communication buses 204 optionally include circuitry (sometimes called a chipset) that interconnects and controls communications between system components. The client device 102 also includes a user interface 210. The user interface 210 includes a display device 212 and one or more input devices 214.

In some implementations, the display device 212 is integrated with the device (e.g., housed in the same chassis as the other components, such as with a smartphone). In some other implementations, the display device 212 is separate from other components of the client device 102 (e.g., a separate device from the device that houses the CPUs 202 and memory 206, as with a desktop computer).

In some implementations, the input device(s) 214 include one or more of: a mouse or similar pointing device, a keyboard, a touch-sensitive surface (e.g., a touch pad, a touch screen), a joystick, and one or more buttons. In some implementations, the display device 212 is a touch screen.

In some implementations, the client device 102 includes additional input devices, such as an audio input device (e.g., a microphone).

In some implementations, the client device 102 also includes one or more of: one or more sensors 216 (e.g., accelerometer, magnetometer, proximity sensor, gyroscope), an image capture device 218 (e.g., a camera device or module and related components), and a location module 220 (e.g., a global positioning system module or other navigation or geolocation module and related components).

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 store the following programs, modules and data structures, or a subset thereof, including operation system 222, network communication module 224, one or more client applications 226, a location module 238, and gallery 240

The operating system 222 includes procedures for handling various basic system services and for performing hardware dependent tasks, as well as obtaining readings from sensors 216.

The network communication module 224 facilitates communication with other devices and computers (e.g., other client devices 102, server system 106, third-party hosts 120) via the one or more communication network interfaces 208 (wired or wireless) and one or more communication networks 104, such as the Internet, other wide area networks, local area networks, metropolitan area networks, and so on.

The client application(s) 226 perform various operations. In some implementations, the client applications 108 include an imaging module 108, a messaging module 110, and a content sharing module 236. The imaging module 108 includes an image editing module 228 for editing images (e.g., cropping, removing red eye, applying interactive and non-interactive filters, applying virtual stickers, applying user-generated drawings and text), an interactive filters module 230 for generating interactive filters data corresponding to interactive filters applied to images, image management module 232 for managing (sorting, organizing, deleting, etc.) images 112 stored in a gallery (e.g., gallery 240), and image capture module 234 for capturing images using the image capture device 218.

As previously mentioned, in some embodiments, the client application 108 includes a messaging module 110 for sending and receiving messages and content, as well as managing (e.g., deleting, organizing) the sent and received messages and content.

As previously mentioned, in some embodiments, the client application 108 includes a content sharing module 236 for sharing content (e.g., images in gallery 240) with third-party hosts 120 (e.g., post to a social network or photo sharing site, upload to website).

In some implementations, the imaging module 108, the messaging module 110, and the content sharing module 236 are part of a client application 226 (e.g., a chat application) that includes imaging, messaging, and sharing features.

In some implementations, the location module 238 determines the location of the client device 102 (e.g., using GPS or other similar systems, location identification by IP address, etc.).

The gallery 240 is a collection of images 112 stored in the memory 206. The gallery 240 includes image data 242 and interactive filter data 244. Further details regarding the image data 242 and the interactive filter data 244 are described in further detail below.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a client device, FIG. 2 is intended more as functional description of the various features which may be present in a client device than as a structural schematic of the implementations described herein. In practice, and as recognized by those of ordinary skill in the art, items shown separately could be combined and some items could be separated.

Figure 3:
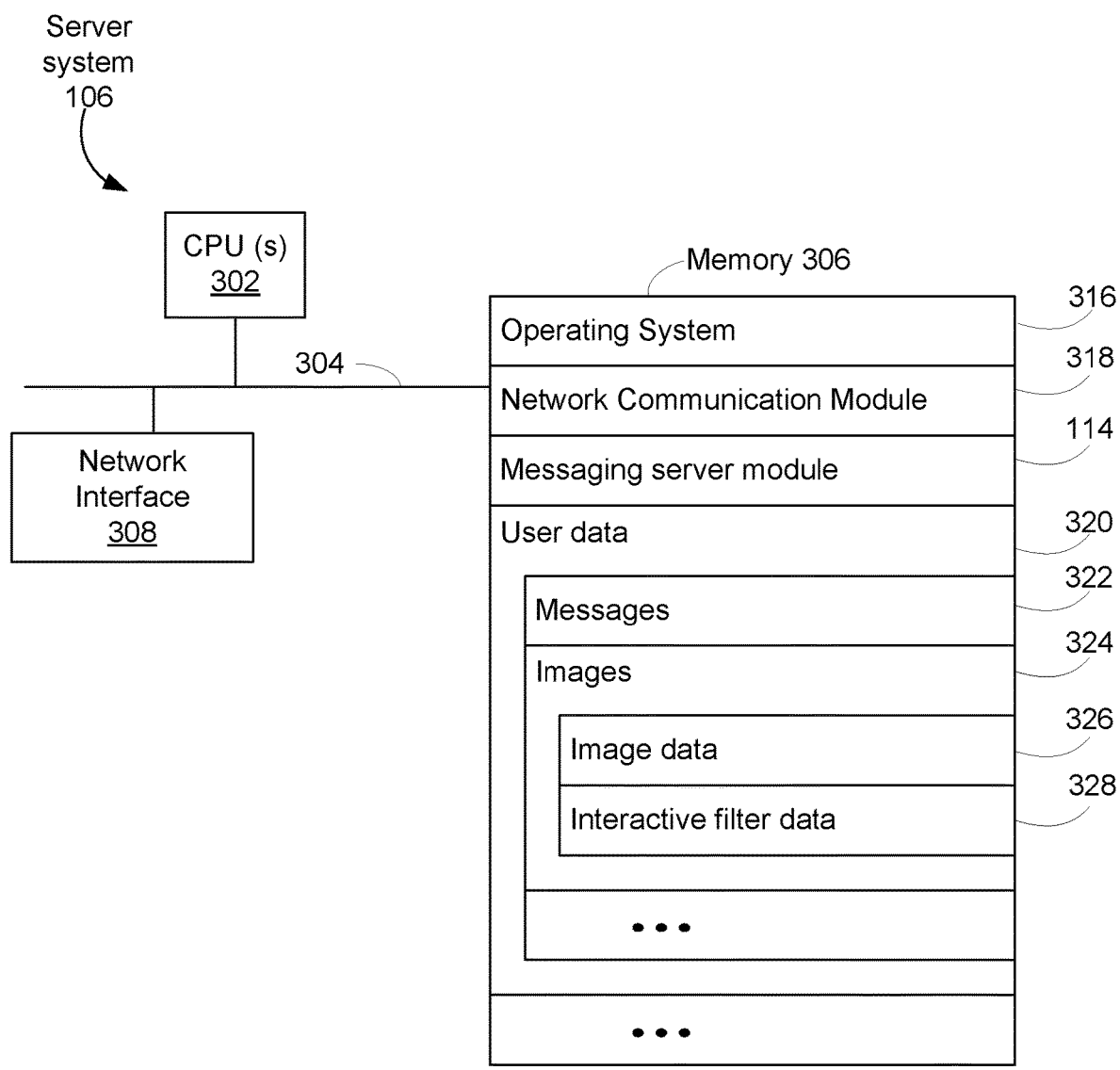
FIG. 3 is a block diagram illustrating a server system in accordance with some implementations.

FIG. 3 is a block diagram illustrating a server system 106, in accordance with some implementations. The server system 106 typically includes one or more processing units (CPU's) 302, one or more network or other communications interfaces 308, memory 306, and one or more communication buses 304 for interconnecting these components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 306 includes one or more storage devices remotely located from the CPU(s) 302. Memory 306, including the non-volatile and volatile memory device(s) within memory 306, comprises a non-transitory computer readable storage medium. In some implementations, memory 306 or the non-transitory computer readable storage medium of memory 306 stores the following programs, modules and data structures, or a subset thereof, including an operation system 316, a network communication module 318, a messaging server module 114, and user data 320.

The operating system 316 includes procedures for handling various basic system services and for performing hardware dependent tasks.

The network communication module 318 facilitates communication with other devices and computers (e.g., client devices 102, third-party hosts 120) via the one or more communication network interfaces 308 (wired or wireless) and one or more communication networks 104, such as the Internet, other wide area networks, local area networks, metropolitan area networks, and so on.

The messaging server module 114 operates a messaging service and performs operations related to the messaging service. In some implementations, the messaging server module 114 connects client devices 102, receives messages and content from client devices 102 and sends the messages and content to their destination client devices 102, and manages the user data 320 for the messaging service.

User data 320 is the data associated with the users of the messaging service. User data 320 includes user account and profile information (e.g., username, password) (not shown), and, for each user, messages 322 sent and received by the user, and images 324 sent and received by the user. The images include image data 326 and interactive filter data 328.

Each of the above identified elements may be stored in one or more of the previously mentioned memory devices, and each of the modules or programs corresponds to a set of instructions for performing a function described above. In some embodiments, the set of instructions is executed by one or more processors (e.g., the CPUs 302). The above identified modules or programs need not be implemented as separate software programs, procedures or modules, and thus, in some implementations, various subsets of these modules is combined or otherwise re-arranged. In some implementations, memory 306 stores a subset of the modules and data structures identified above. Furthermore, in some embodiments, memory 306 stores additional modules and data structures not described above.

Although FIG. 3 shows a server system, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the server system 106 and how features are allocated among them will vary from one implementation to another, and, in some instances, depends in part on the amount of data traffic that the system must handle during peak usage periods as well as during average usage periods.

Figure 4A:
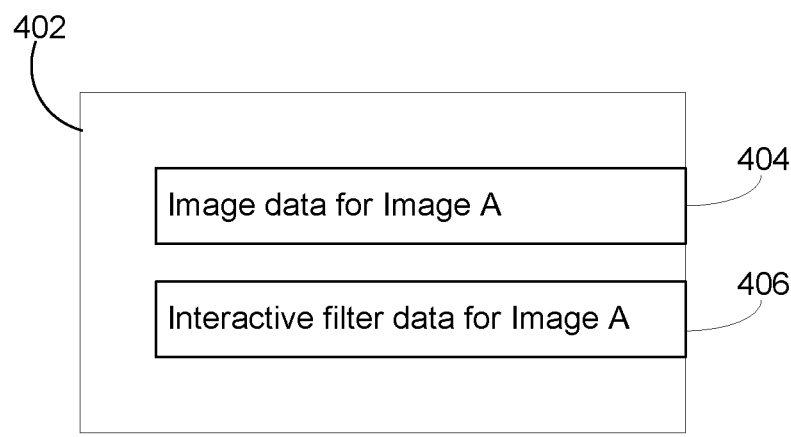
FIGS. 4A-4C illustrate example data structures in accordance with some implementations.
Figure 4B:
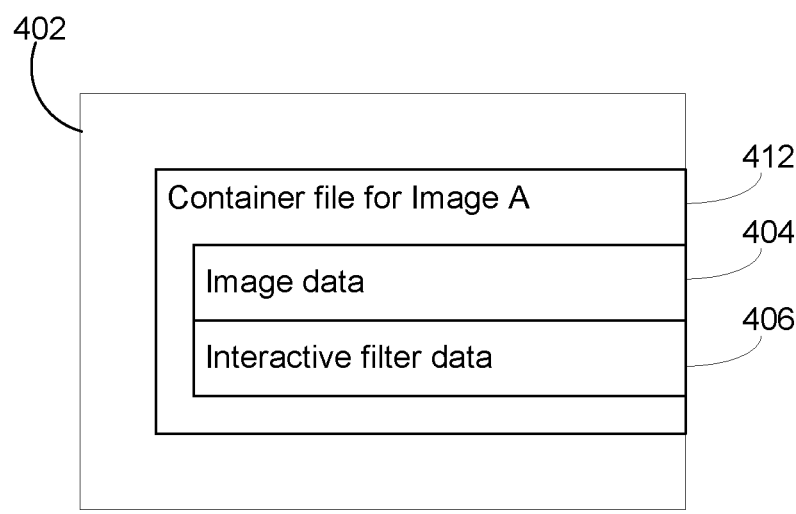
Figure 4C:
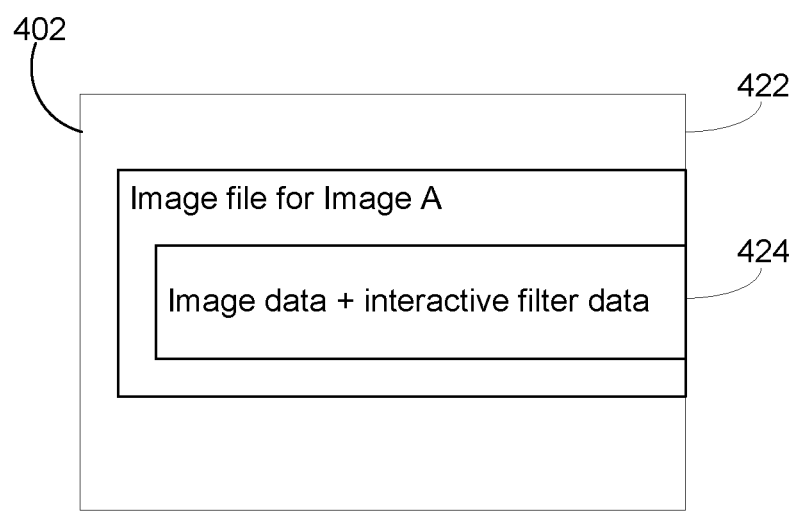

FIGS. 4A-4C illustrate example data structures for image data and interactive filter data in accordance with some implementations. The image data for an image is a numeric representation or encoding of an image in digital form. The interactive filter data associated with an image includes data or metadata that identifies an interactive filter that has been applied to the image, defines the characteristics and parameters, visual and non-visual, of the interactive filter, and optionally stores a state of the interactive filter with respect to the image. FIGS. 4A-4C illustrate examples of data structures in which an image and associated interactive filter data is stored in memory at a client device 102 or the server system 106.

FIG. 4A illustrates the image data 404 and the interactive filter data 406 for an Image A stored in a memory 402 (e.g., memory 206 or 306). In FIG. 4A, the image data 404 and the interactive filter data 406 for Image A are stored as distinct files or data in the memory 402. In some implementations, the image data 404 is a file in any suitable image file format, including well-known formats such as JPEG, PNG, GIF, and TIFF, and formats yet to be developed; the image data 404 corresponds to the image without the interactive filter. The interactive filter data 406 is in its own file or data structure, or is a part of another file or data structure that is not the image data 404. In some implementations, the interactive filter data 406 is data in a database.

In some implementations, the interactive filter data 406 includes a reference to the image data 404, but the image data 404 has no reference to the interactive filter data 406. In some implementations, the data structure shown in FIG. 4A is used to facilitate the capability to apply interactive filters to images in existing image file formats (e.g., JPEG, PNG, GIF) and other possible image-only formats.

FIG. 4B illustrates the image data 404 (i.e., the image file as in FIG. 4A) and the interactive filter data 406 for Image A stored in a container file 412 for Image A. Within the container file 412, the image data 404 and the interactive filter data 406 for Image A are still distinct from each other, but are stored within the same container file 412. In some implementations, the data structure shown in FIG. 4B is used, similar to the data structure shown in FIG. 4A, to facilitate the capability to apply interactive filters to images in existing image file formats (e.g., JPEG, PNG, GIF) and other possible image-only formats.

FIG. 4C illustrates the image data and the interactive filter data 424 for Image A stored together in an image file 422. In the image data and the interactive filter data 424, there is no clear distinction or separation between the image data and the interactive filter data. In some implementations, the image file 422 is in an image file format that natively supports interactive filters. How the image data and the interactive filter data are stored together varies with the specifics of the file format for the image file 422.

FIGS. 5A-5LL illustrate example user interfaces, including images with interactive filters, in accordance with some implementations. The user interfaces shown in FIG. 5A-5LL are example user interfaces for a client application 226, in a client device 102, that includes messaging, imaging, and content sharing features. For sake of convenience and as an example of the disclosed implementations, the user interfaces are described below as user interfaces for a messaging application on a client device 102 that includes a touch screen (e.g., a smartphone). The messaging application is associated with a messaging service operated by the server system 106. The user interfaces are displayed on a display (e.g., display 212) of the client device. It should be appreciated that the user interfaces, operations, and interactions described below are applicable to other types of client devices and input devices (e.g., a laptop computer with keyboard and touch pad, a desktop computer with a mouse and keyboard, a tablet device with a touch screen).

Figure 5A:
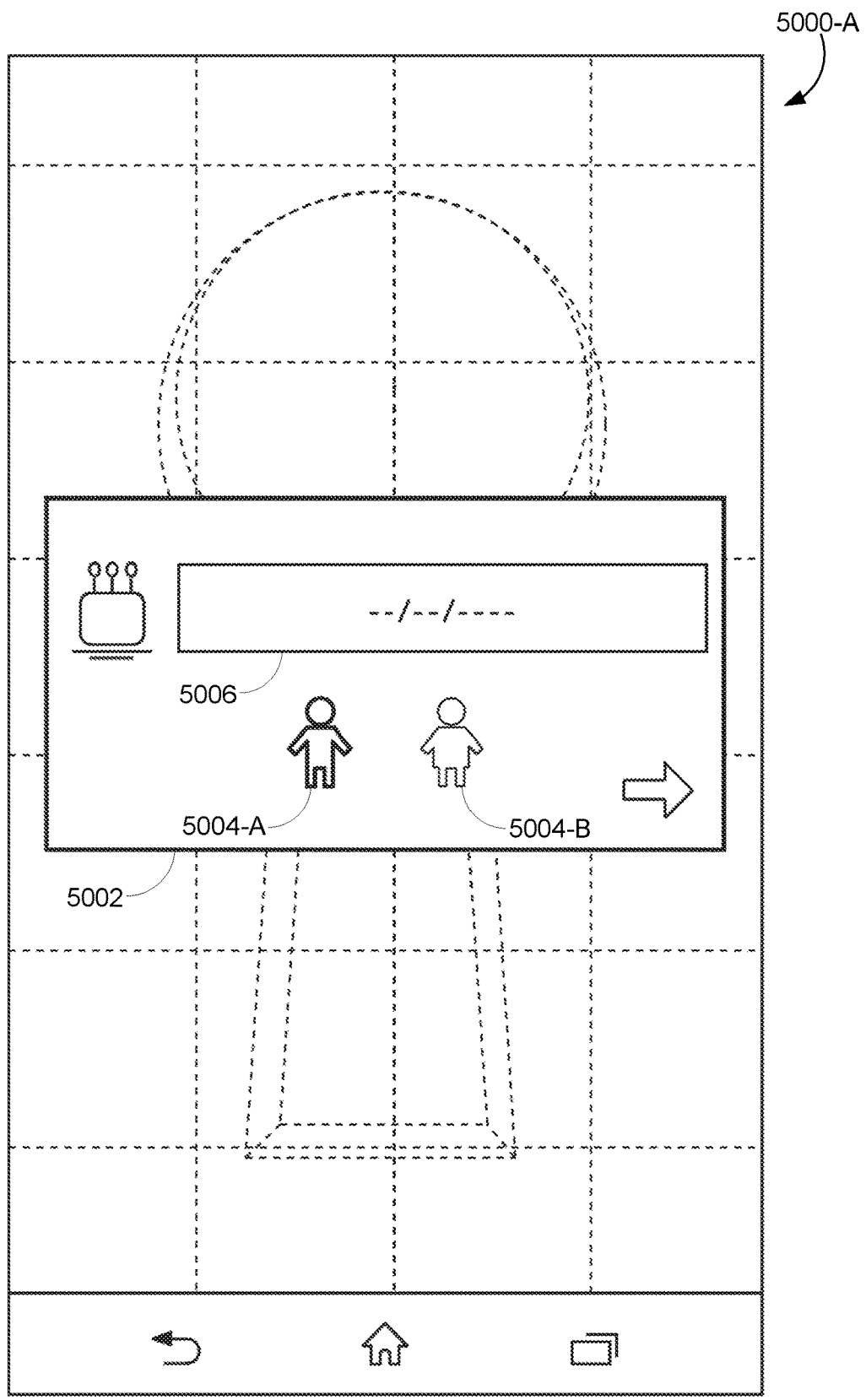
FIGS. 5A-5LL illustrate example user interfaces, including images with interactive filters, in accordance with some implementations.

After the messaging application is installed onto the client device 102 and is launched or opened for the first time, the messaging application prompts the user of the client device 102 for information to initiate the user into the messaging service. For example, the messaging application prompts the user for account information (e.g., a username and password to open an account with the messaging service, a username and password for a single sign-on or shared authentication service used by the messaging service) and user profile information (e.g., age, sex or gender). FIG. 5A illustrates user interface ("UI") 5000-A of the messaging application, in which a prompt 5002 for age and sex is presented to the user. The prompt includes sex icons 5004-A (male) and 5004-B (female). The user selects either icon 5004-A or 5004-B by performing a tap gesture on the touch screen at a location corresponding to the desired icon (e.g., tap on the desired icon). For example, in FIG. 5A the male icon 5004-A is selected (as indicated by the thicker outlines than the female icon 5004-B).

Figure 5B:
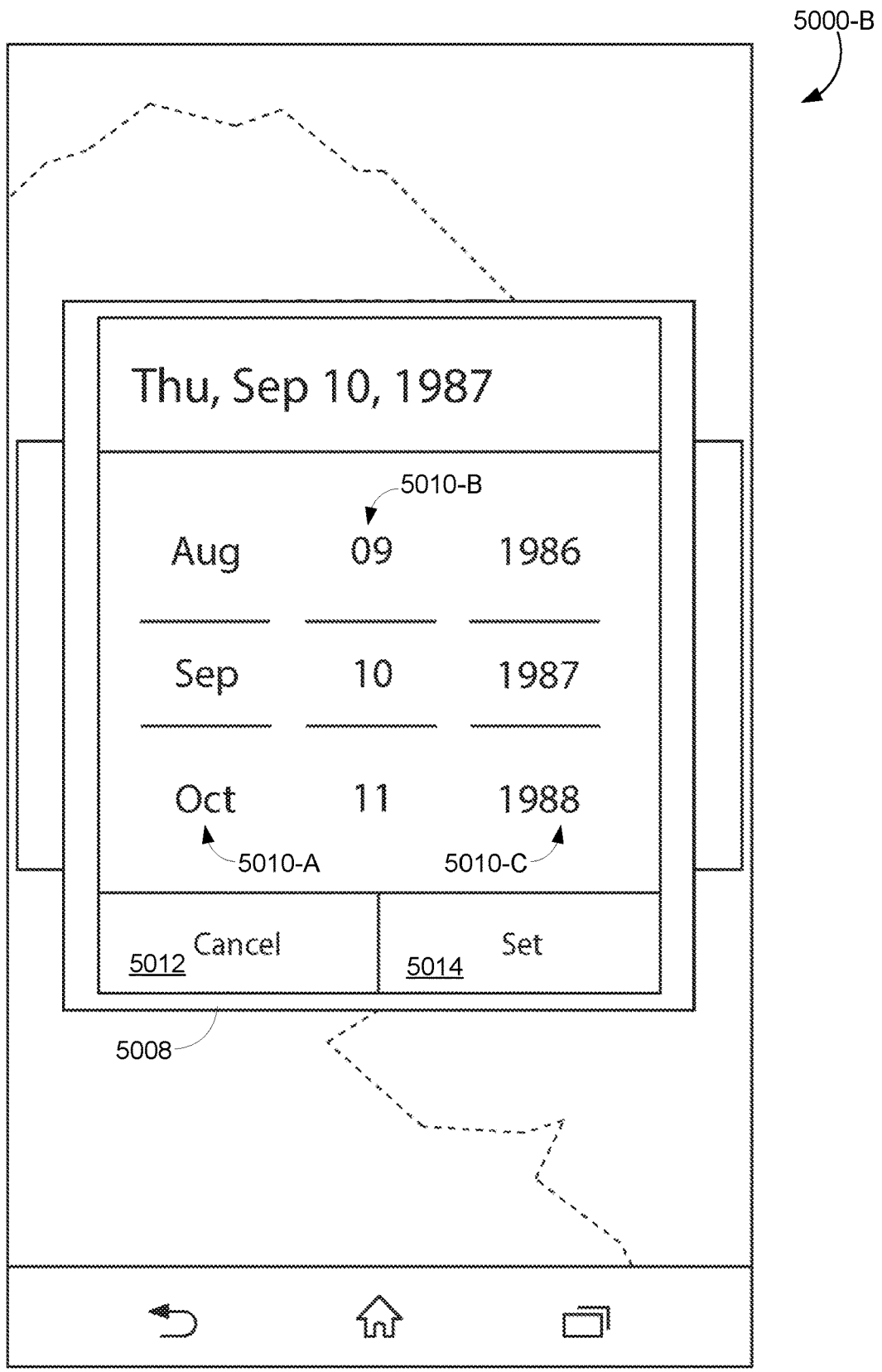

The prompt 5002 also includes a birth date field 5006. When the user selects the birth date field 5006 (e.g., by tapping on the field 5006 on the touch screen), the user is prompted to enter a birth date. FIG. 5B illustrates UI 5000-B, which shows a birth date selector 5008 that is displayed in response to the selection of the birth date field 5006. The birth date selector 5008 includes respective spinners 5010 for selecting the month (5010-A), day (5010-

B), and year (5010-C) of the user's birth date. For example, in FIG. 5B, Sep. 10, 1987 is selected in the spinners 5010. After the user has selected the birth date using the spinners 5010, the user can select (e.g., tap on) the set button 5014 to input the selected birth date and continue on to the next step in the initiation process. The user can also, prior to selecting the set button 5014, select the cancel button 5012 to abort the birth date selection and go back to the previous step in the process (e.g., prompt 5002). After the completion of the initiation process, the features of the messaging application are enabled for the user to use.

In some implementations, features of the messaging application are selectively enabled or disabled, depending on the birth date input by the user during the initiation process (as in FIG. 5B). If the user had input a birth date that indicates that the user has not yet reached a threshold age (e.g., 18 years old), certain features of the messaging applications are disabled until the user reaches the threshold age. For example, if the user has not reached 18 years old (i.e., the user is a minor), messaging and content (e.g., images) sharing features of the messaging application are disabled; the user cannot send and messages and content, and cannot share content to third-party hosts 120, and the imaging features remain enabled. Thus, the minor user can still capture images (e.g., using the image capture module 234) and store the captured images into the gallery 240, manage (e.g., organize, browse, delete) images in the gallery 240 (e.g., using the image management module 232), and edit images stored in the gallery 240 (e.g., using the image editing module 228), including applying drawings, texts, virtual stickers, non-interactive filters, and interactive filters to the images, interacting with any filters applied to images in the gallery 240.

As another example, if the user is a minor, the user can send and receive messages and can receive content (e.g., images), but cannot send content (e.g., images, with an interactive filter or not) or share content with third-party hosts 120.

If the user reaches the threshold age, or is already older than the threshold age, the features of the messaging application are fully enabled. The description below assumes that, unless stated otherwise, the features of the messaging application are fully enabled.

Figure 5C:
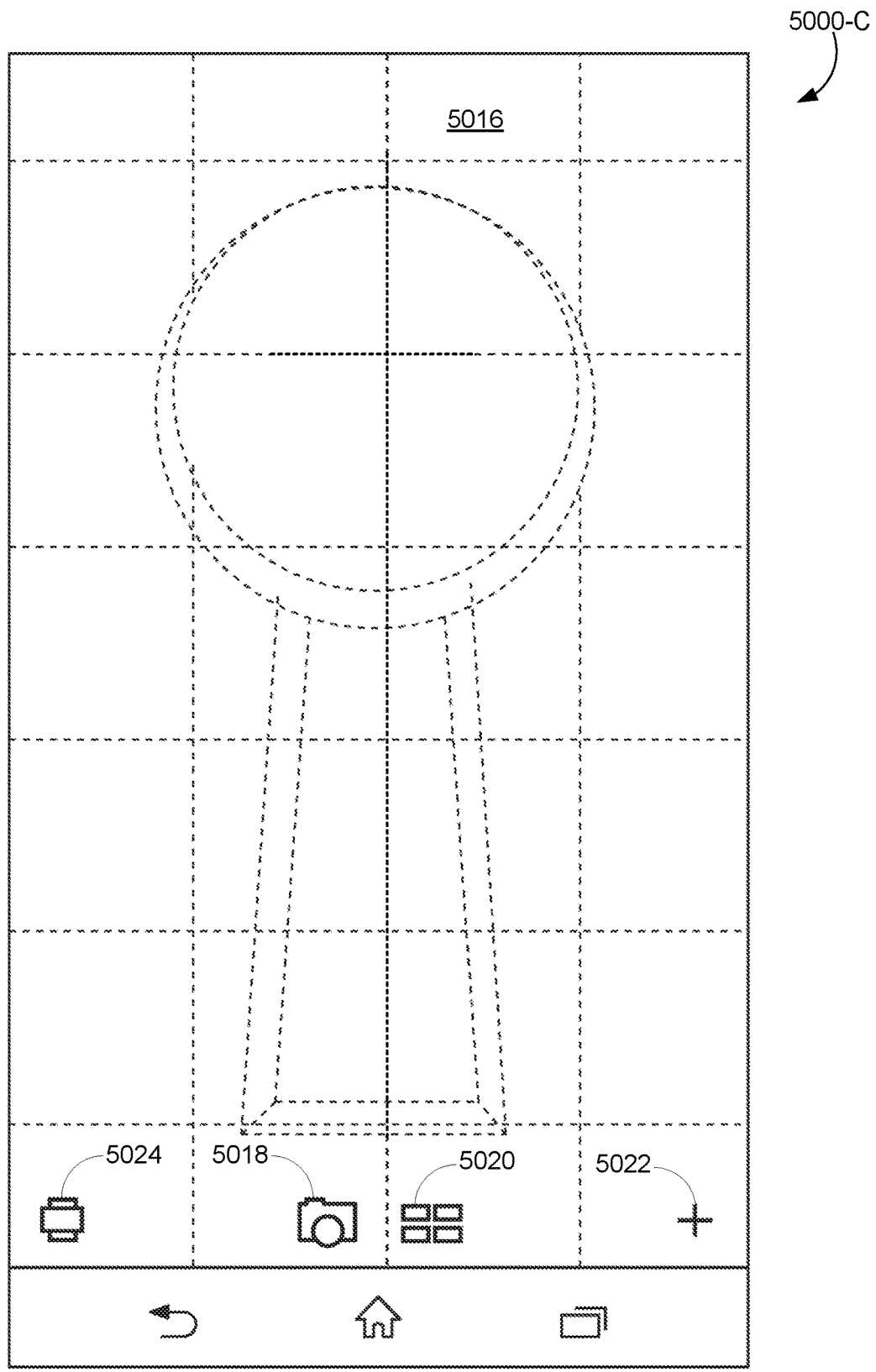

FIG. 5C illustrates UI 5000-C, which includes the home screen 5016 of the messaging application. In some implementations, the home screen 5016 includes camera icon 5018, gallery icon 5020, add conversation icon 5022, and sent/received images icon 5024. The user can select the camera icon 5018 to open a camera user interface (not shown) of the image capture module 234 within the messaging application for capturing images using the image capture device 218. The user selects the gallery icon 5020 to open a images browser user interface (not shown) of the image management module 232 for managing images, including viewing, selecting, organizing, and deleting images and associated interactive filters data that are in the gallery 240. The user selects the add conversation icon 5022 to open an add conversation user interface (not shown) of the messaging module 110 to select another user with whom to start a messaging conversation or session. In some implementations, the users with whom to start a conversation are drawn from the user's contacts list stored in the client device 102 and/or the user's social network(s). In some implementations, the user selects the send/received images icon 5024 to open a user interface (further described below with reference to FIGS. 5JJ-5KK) for browsing images sent to other users and received from other users in messaging conversations. In some implementations, the name of the messaging application (not shown) is displayed on the home screen 5016. In some implementations, a settings icon (not shown), which the user may select to open a user interface for configuring settings associated with the messaging application, is displayed on the home screen 5016. In some implementations, the positions of the icons 5018, 5020, 5022, and 5024 differ from that shown in FIG. 5C. In some implementations, gallery icon 5020 and add conversation icon 5022 are not displayed on the home screen 5016, but their corresponding features are accessible through other ways within the messaging application.

Figure 5D:
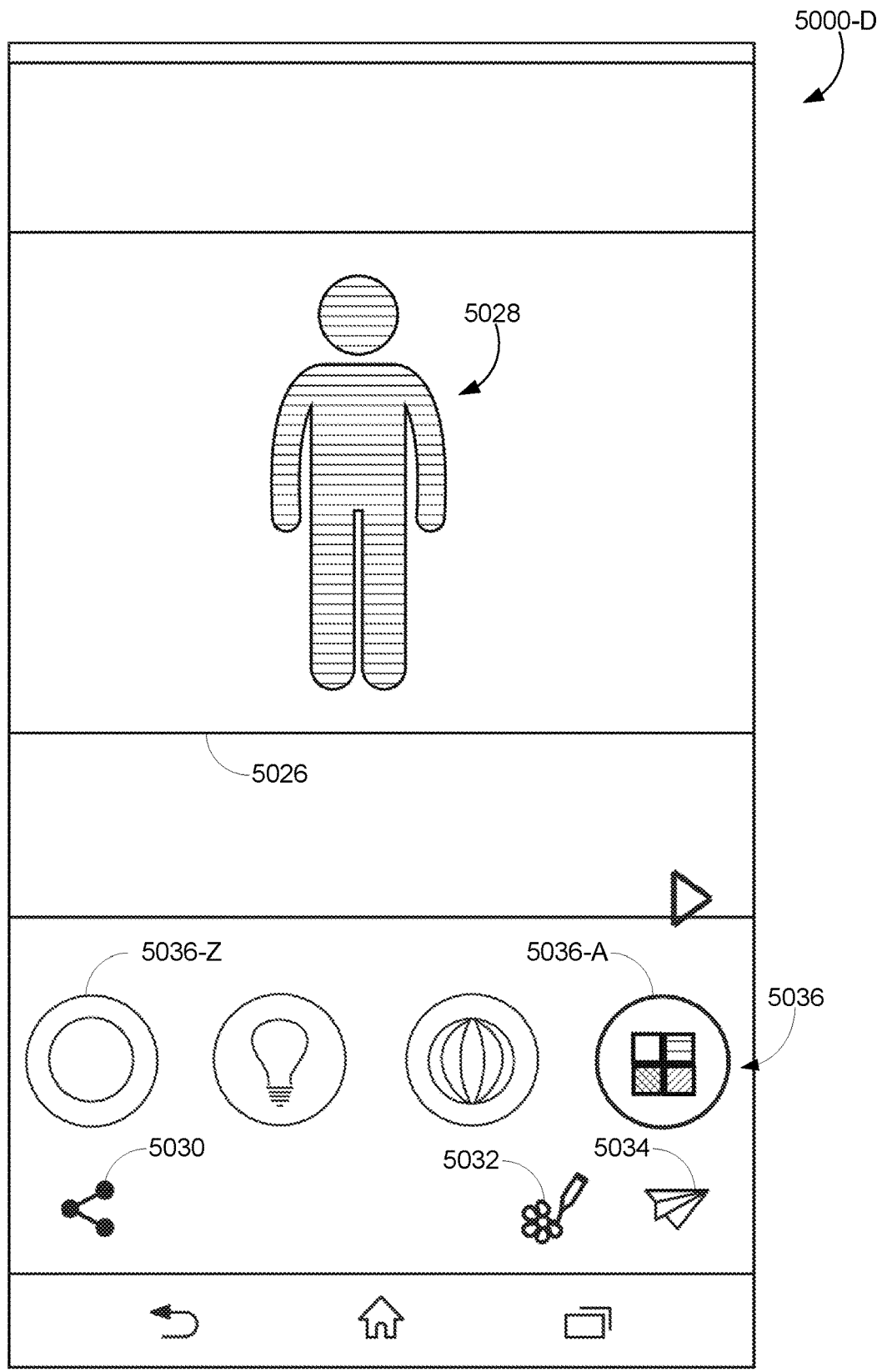

When the user selects an image from the image browser user interface (not shown) to open the image, the user editing of the image is facilitated. For example, FIG. 5D illustrates UI 5000-D, which includes an image 5026 (e.g., an image opened from the image browser user interface), which shows a human figure 5028, and controls for opening or activating various features or user interfaces. For example, the controls include a sharing icon 5030, which the user can select to open an interface (e.g., a pop-up for selecting a social network; not shown) for sharing the image 5026 with a third-party host 120. A drawings/stickers icon 5032 can be selected by the user to open a user interface (further described below with reference to FIGS. 5V-5W) for adding drawings and/or stickers to the image. A send icon 5034 can be selected by the user to open a user interface (not shown) for selecting a user to send the image to.

The controls also include a row of interactive filter icons 5036. In some implementations, the row of interactive filter icons 5036 is scrollable (e.g., with a swipe or drag gesture on the row) to scroll in or out interactive filter icons 5036. The user can select any of the interactive filter icons 5036 to apply the corresponding interactive filter to the image 5026.

Figure 5E:
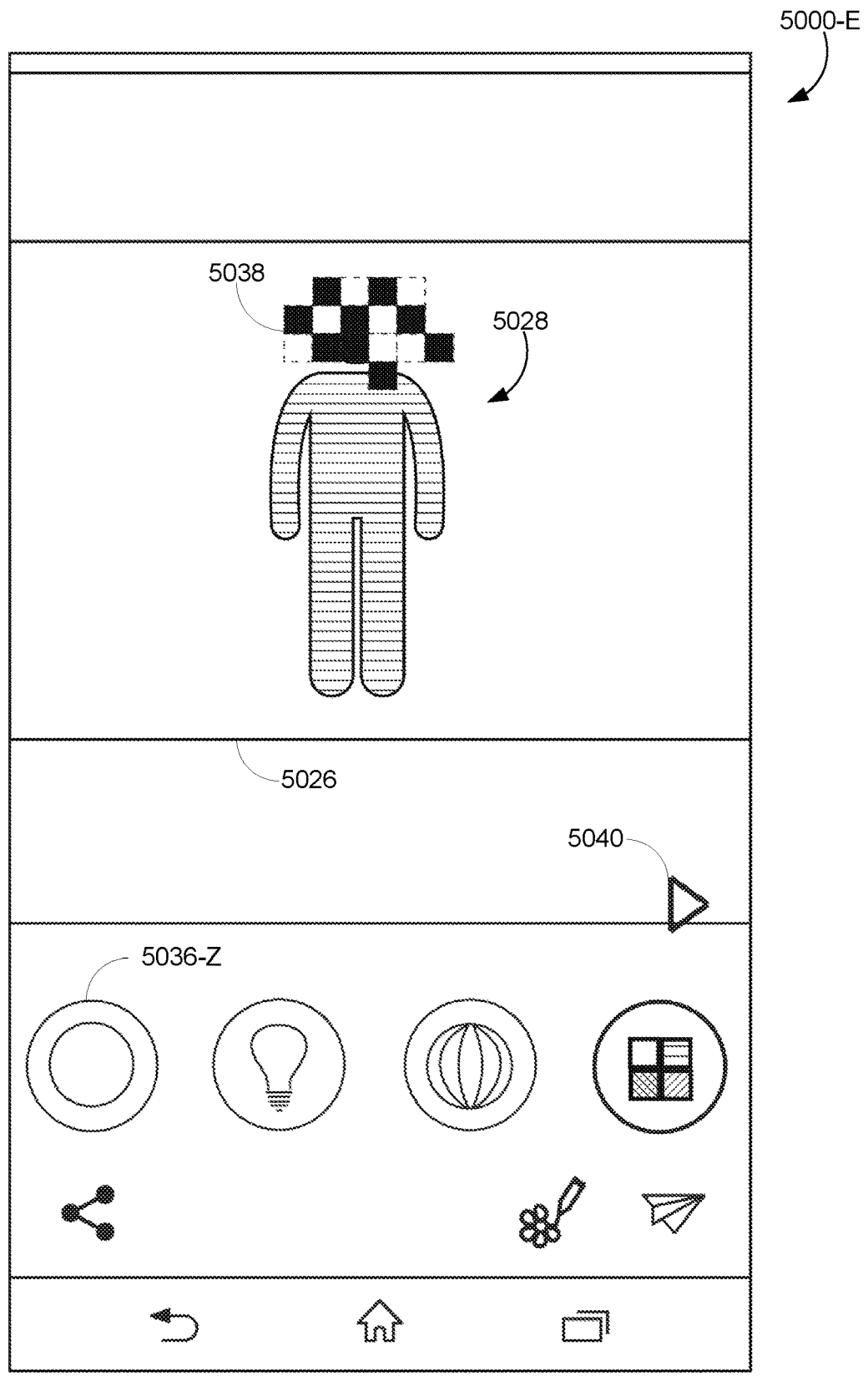

Icon 5036-A corresponds to a censoring filter. When the user selects the censoring filter icon 5036-A, the censoring filter is active. The user can then select an area (e.g., by tapping and/or swiping or rubbing) on the image 5026 to apply a censoring mosaic to the image. For example, if the user taps on the head of the human figure 5028 in the image 5026 while the censoring filter is active, then a censoring area (e.g., censoring mosaic or pixelization) 5038 is applied to the image 5026 to the area of the head, as shown in UI 5000-E (FIG. 5E).

When the censoring mosaic is applied to the image 5026, interactive filter data is generated by the interactive filters module 230 for the image 5026. More generally, when an interactive filter is applied to an image, interactive filter data is generated by the interactive filters module 230 for the image. The relationship between the interactive filter data and the image data is described above with reference to FIGS. 4A-4C. In some implementations, the interactive filter data for the image 5026 identifies the filter (censoring), and includes data for the specific application of the filter (e.g., the location and size of the censoring mosaic). The user can continue selecting areas to which censoring mosaics are applied, and the interactive filter data for the image 5026 is updated accordingly.

The user can select the normal icon 5036-Z to activate display of the image 5026 in its pre-filter state. In some implementations, selection of the normal icon 5036-Z commands the messaging application to remove any currently applied interactive filter, i.e., cancel any applied interactive filter and restore the image to its pre-interactive filter version, and delete any associated interactive filter data. In some implementations, icon 5036-Z is omitted, and a cancel button or icon is included to cancel any applied interactive filter (e.g., remove any currently applied interactive filter and restore the image to its pre-interactive filter version, and delete any associated interactive filter data).

In some implementations, the user can select the interactive mode icon 5040 to enter into an interactive mode for the image 5026. While in the interactive mode, the user can interact with the interactive filter (i.e., taping, swiping, etc. on the image interacts with the filter, as opposed to applying the filter to more areas of the image) applied to an image. For example, for an image 5026 with a censoring mosaic 5038, the user can tap or rub or swipe on the censoring mosaic 5028 to partially remove the censoring mosaic 5028. As the finger of the user moves away from the area where the censoring mosaic was partially removed, the removed portion of the censoring mosaic is restored. Thus, the removal is temporary, as well as partial. In some implementations, restoration of a removed portion of the censoring mosaic (or any of the interactive filters or interactive filter portions described below) is immediate (e.g., as soon as the finger moves away from the removal area). In some other implementations, the restoration is delayed (e.g., one second after the finger moves away). In some implementations, the user can interact with the filter to completely reverse the filter, but the filter is restored immediately after the user ends the interactive input or after a delay.

Figure 5F:
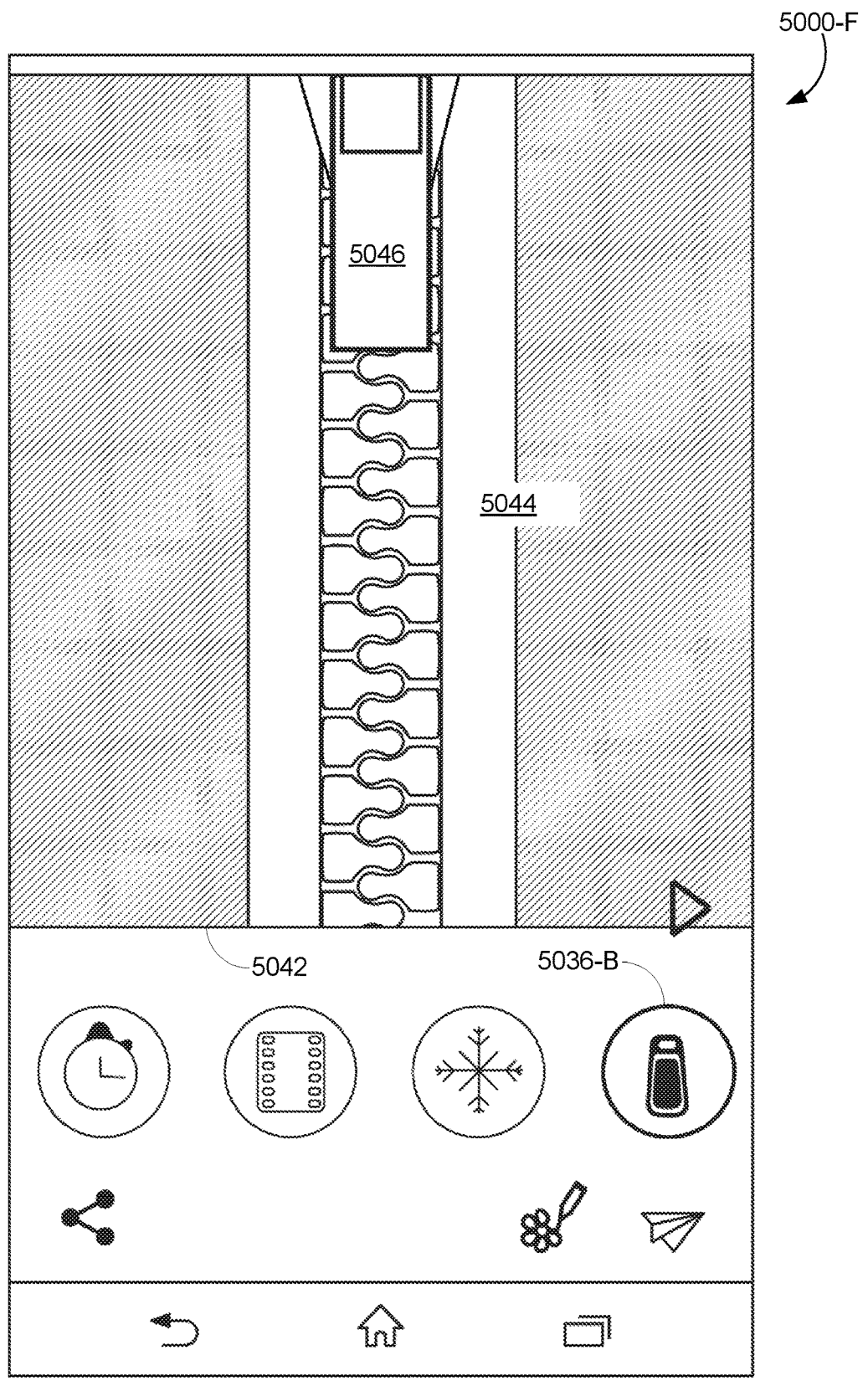

FIG. 5F illustrates UI 5000-F, which shows an image 5042 (of a human figure with a raised hand) with a zipper interactive filter 5044 (corresponding to icon 5036-B) already applied to the image 5042. The image 5042 is obscured (e.g., hidden) behind the zipper filter 5044, which is shown as a closed zipper. The zipper filter 5044 includes a zipper object 5046 that the user can manipulate. Thus, for example, when in the interactive mode, the user can manipulate the zipper object 5046 (e.g., drag the zipper object 5046 up and down) to simulate the opening and closing of the zipper, with the opening of the zipper representing reversal of the zipper filter 5044.

Figure 5G:
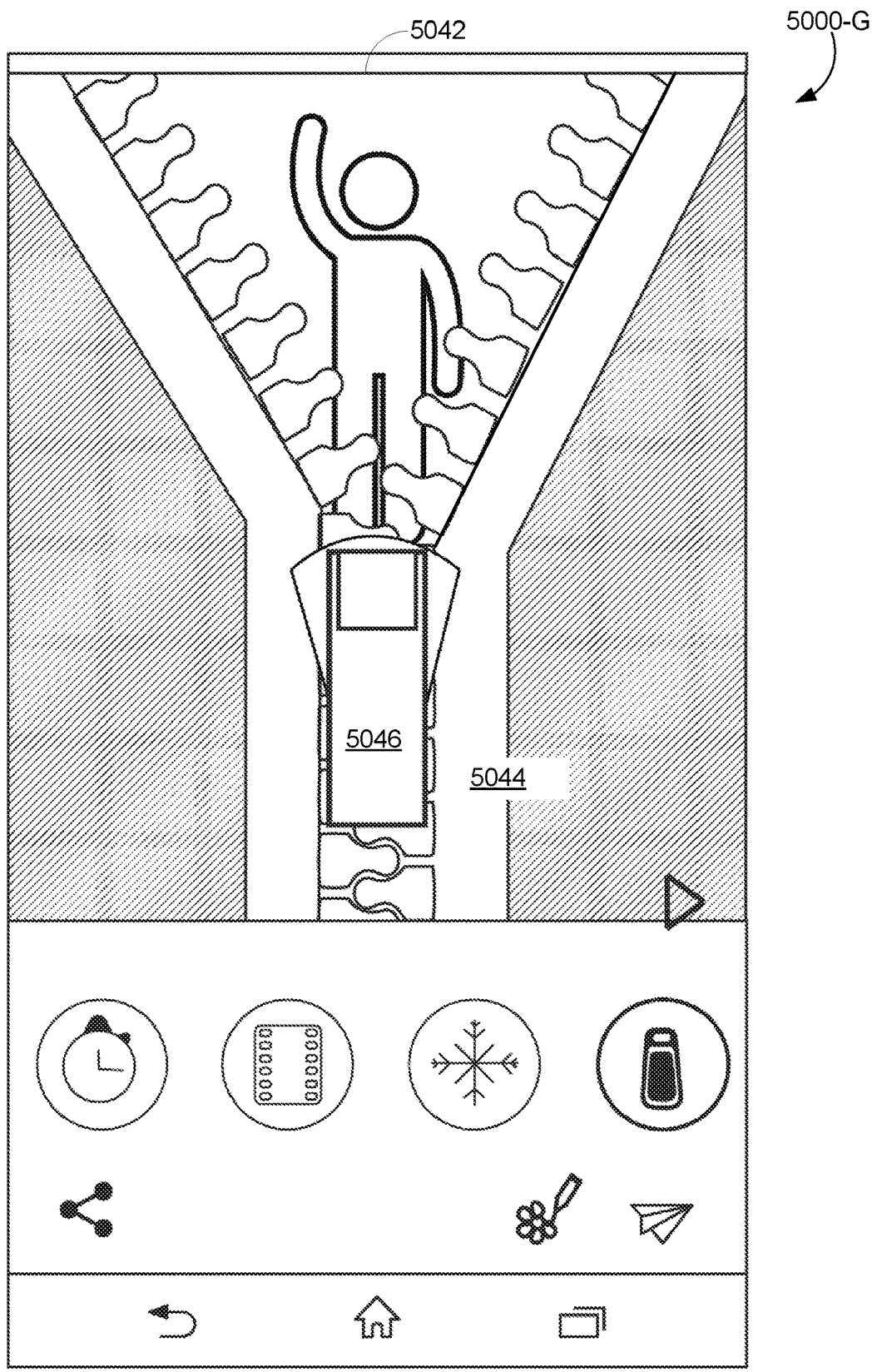

FIG. 5G illustrates 5000-G, which shows the image 5042 and the zipper interactive filter 5044, with the zipper of the zipper interactive filter 5044 is partially open in response to manipulation of the zipper object 5046. With the opening of the zipper, an opening through the zipper filter 5044 is created, and a portion of the image 5042 is visible through the opening.

In some implementations, the zipper automatically closes itself after being opened. The closing can be immediate in response to removal of the user's finger from the zipper object 5046, or after a delay from removal of the user's finger from the zipper object 5046 (e.g., one second, two seconds).

Figure 5H:
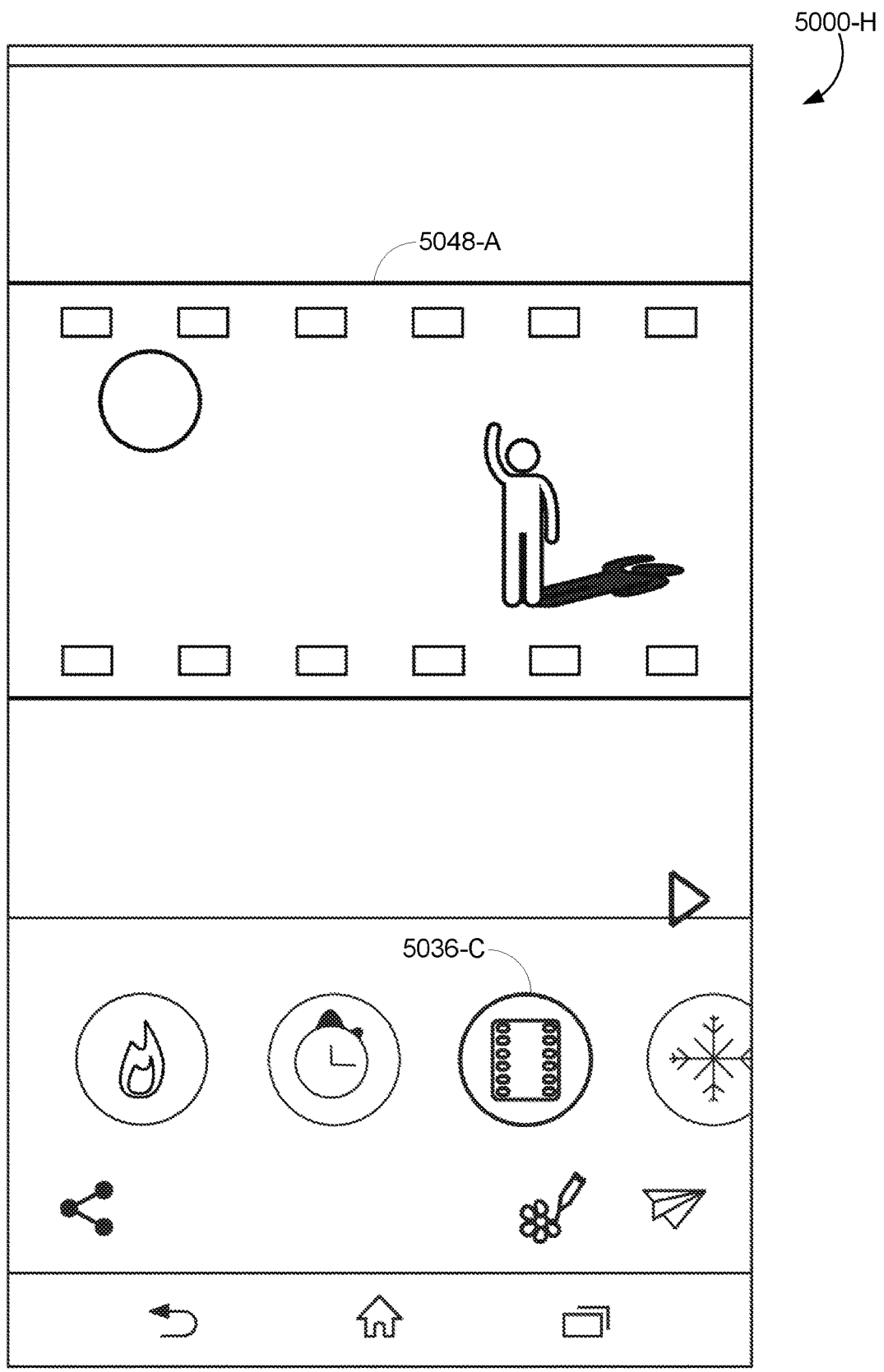
Figure 5I:
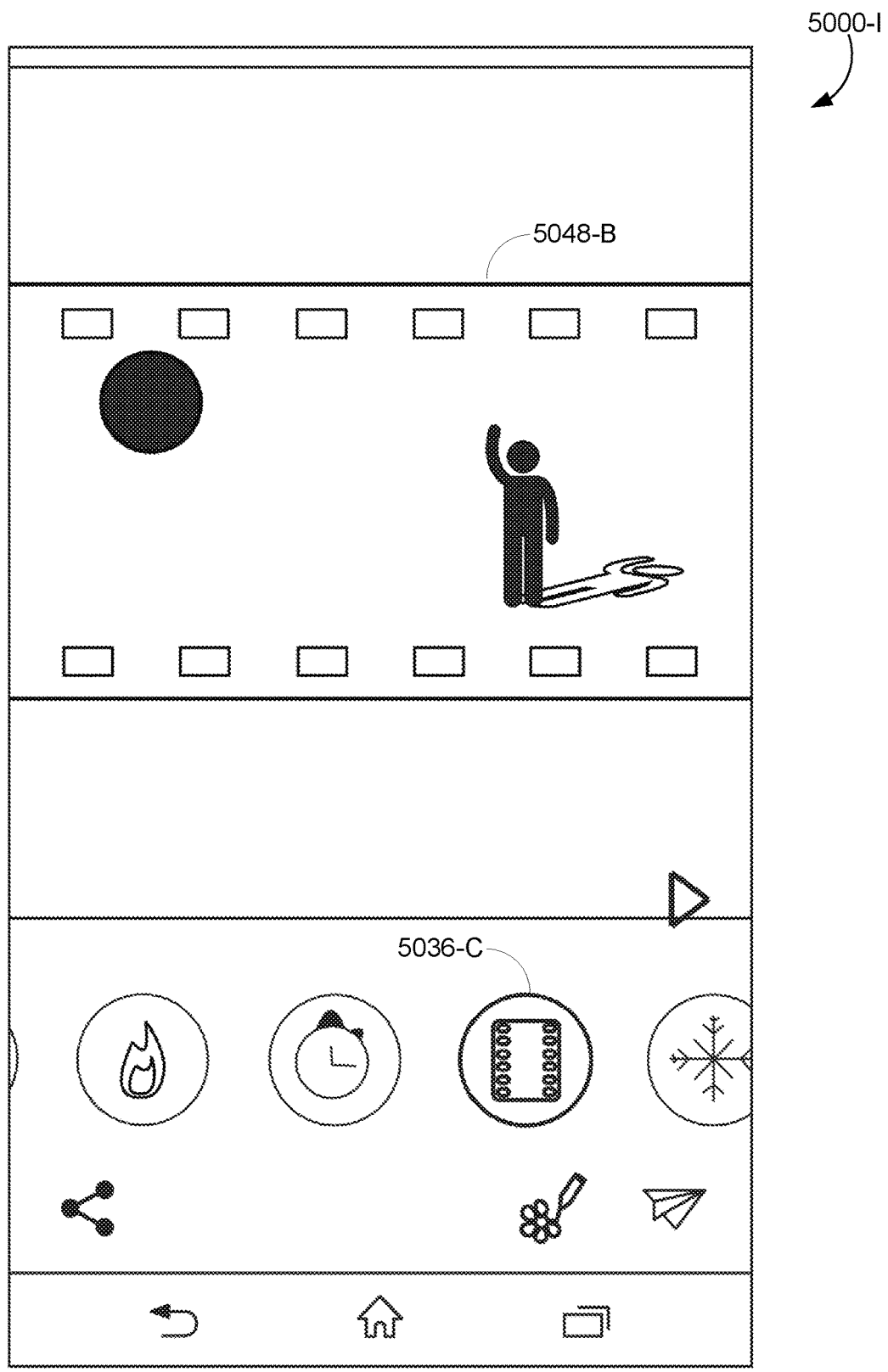

FIG. 5H illustrates UI 5000-H, which shows an image 5048 (of the sun and a human figure with a shadow) prior to application of an interactive filter (as image 5048-A). When the user selects the icon 5036-C, the negative interactive filter is applied, as shown in UI 5000-I (FIG. 5I). In FIG. 5I, the image 5048 with the filter applied (as image 5048-B) visually appears as a negative of pre-filter image 5048-A. In some implementations, in the interactive mode, the user can revert the image 5048-B partially and/or temporarily back to image 5048-A by, for example, shaking the client device 102 (as if shaking instant film to develop the picture captured in the instant film). The sensors 216 detect the shaking input by the user, and temporarily and partially reverse the filter in response.

Figure 5J:
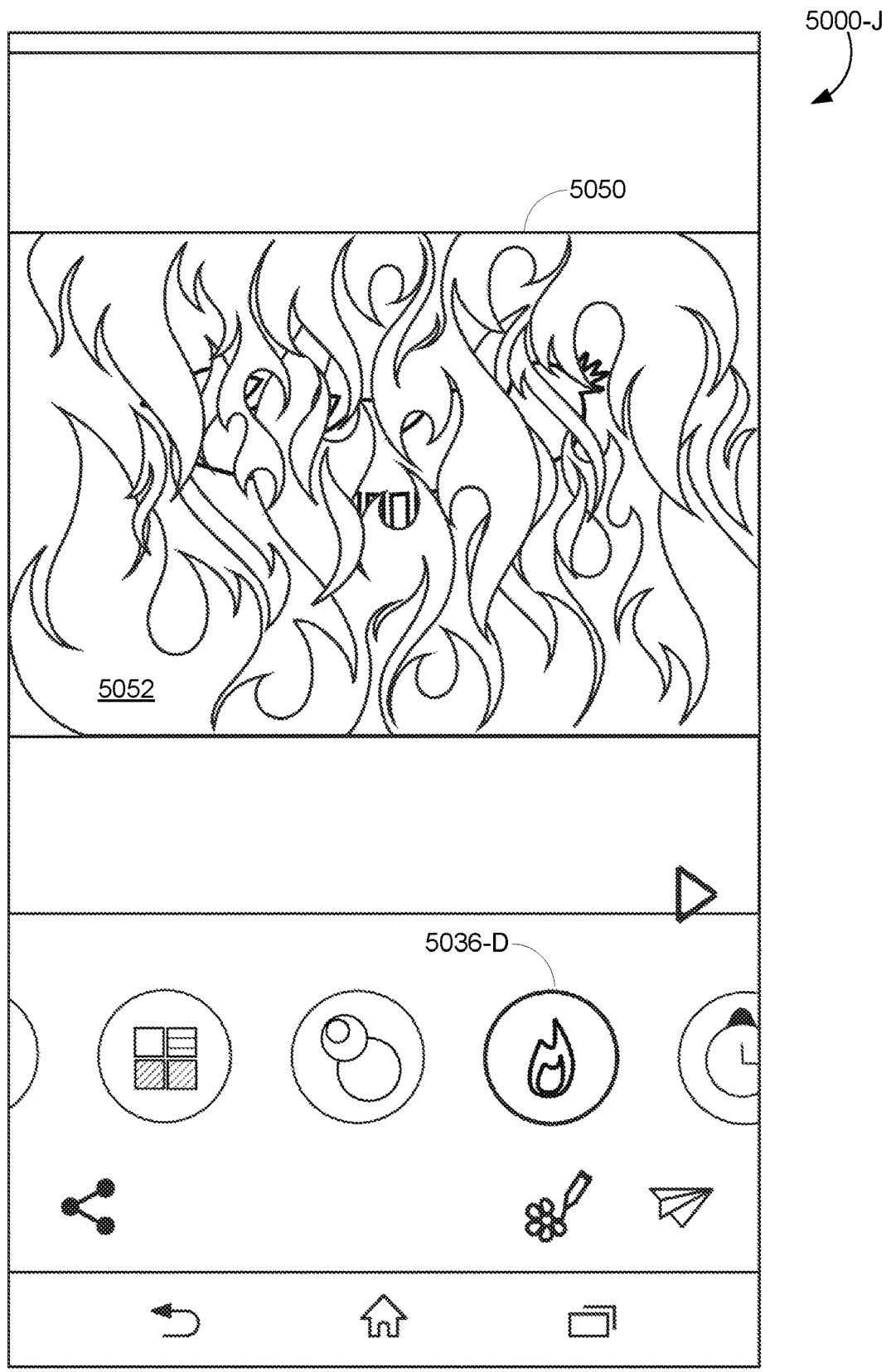
Figure 5K:
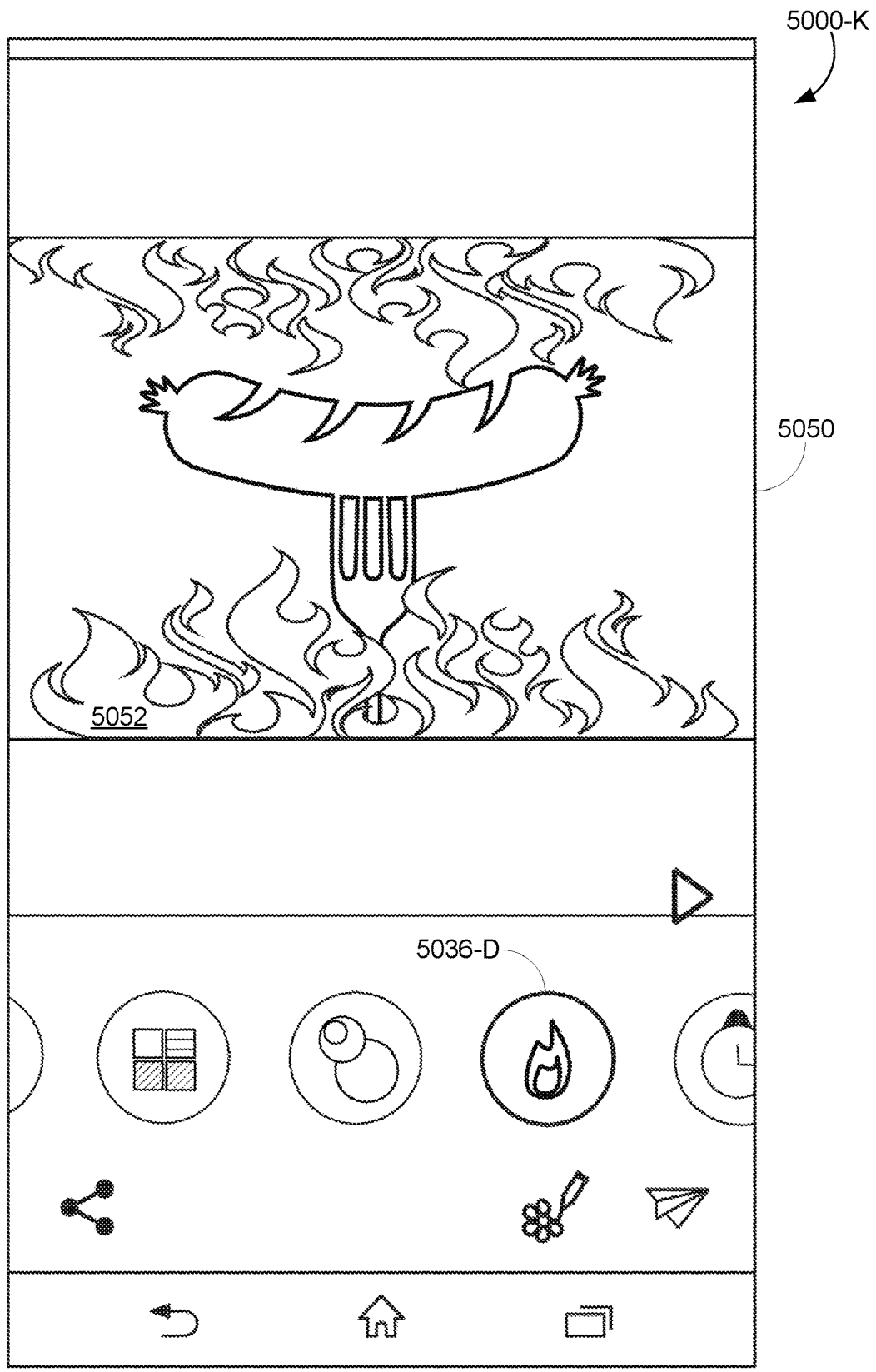

FIG. 5J illustrates UI 5000-J, which shows an image 5050 (of a sausage on a fork) with a flames interactive filter (corresponding to icon 5036-D) already applied. The flames filter appears visually as flames 5052 obscuring the image 5050. In some implementations, in the interactive mode, the user can partially and/or temporarily reverse the flames filter to reveal a portion of the image 5050 by blowing air into an audio input device of the client device 102 (e.g., a microphone, not shown), as if blowing out the flames. The audio input device detects the sounds from the blowing, which the messaging application treats as the input to partially and/or temporarily reverse the flames filter. FIG. 5K illustrates UI 5000-K, which shows image 5050 partially revealed through flames 5052 that are weaker (e.g., not as high) in response to the blowing input.

Figure 5L:
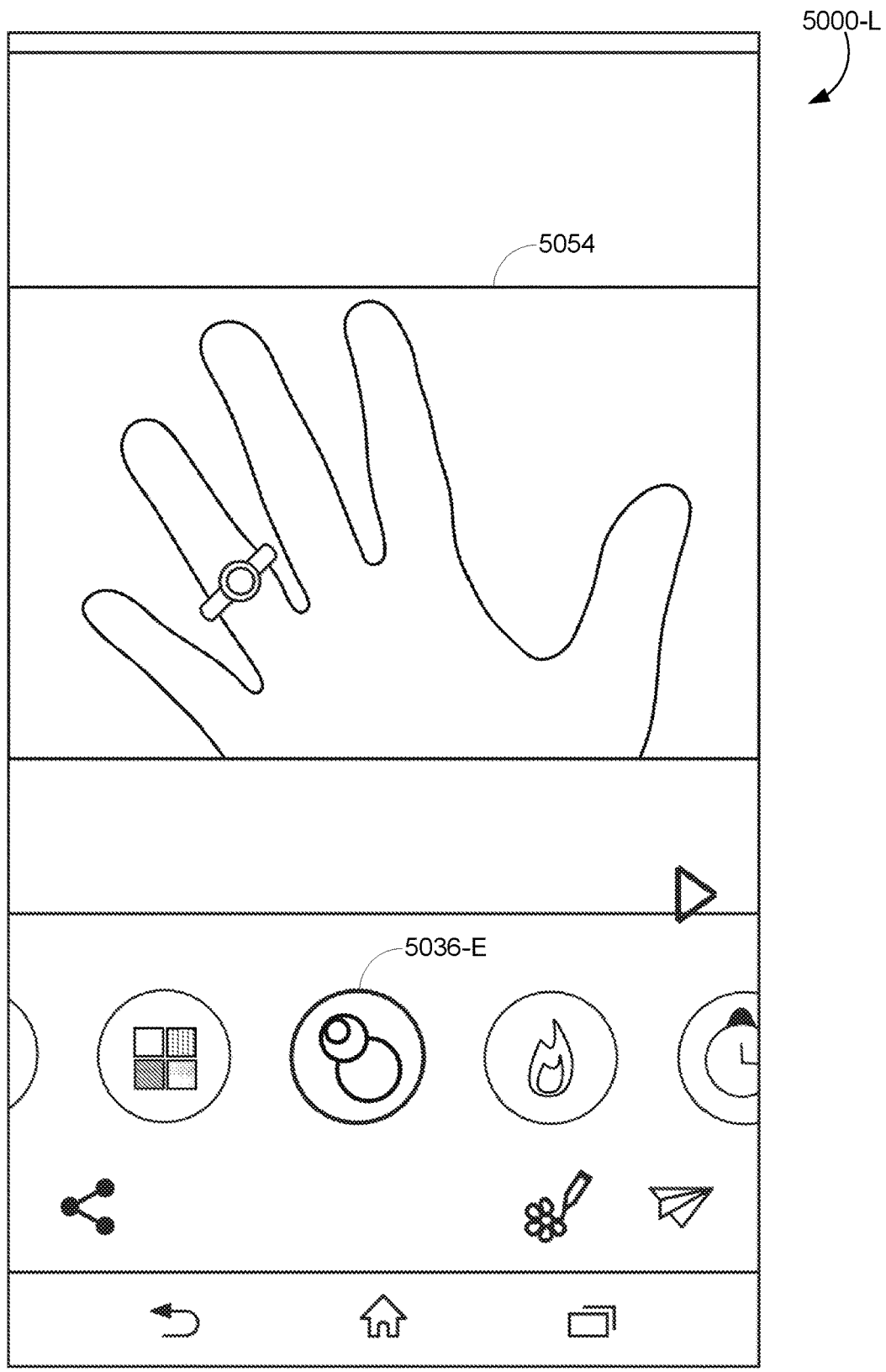
Figure 5M:
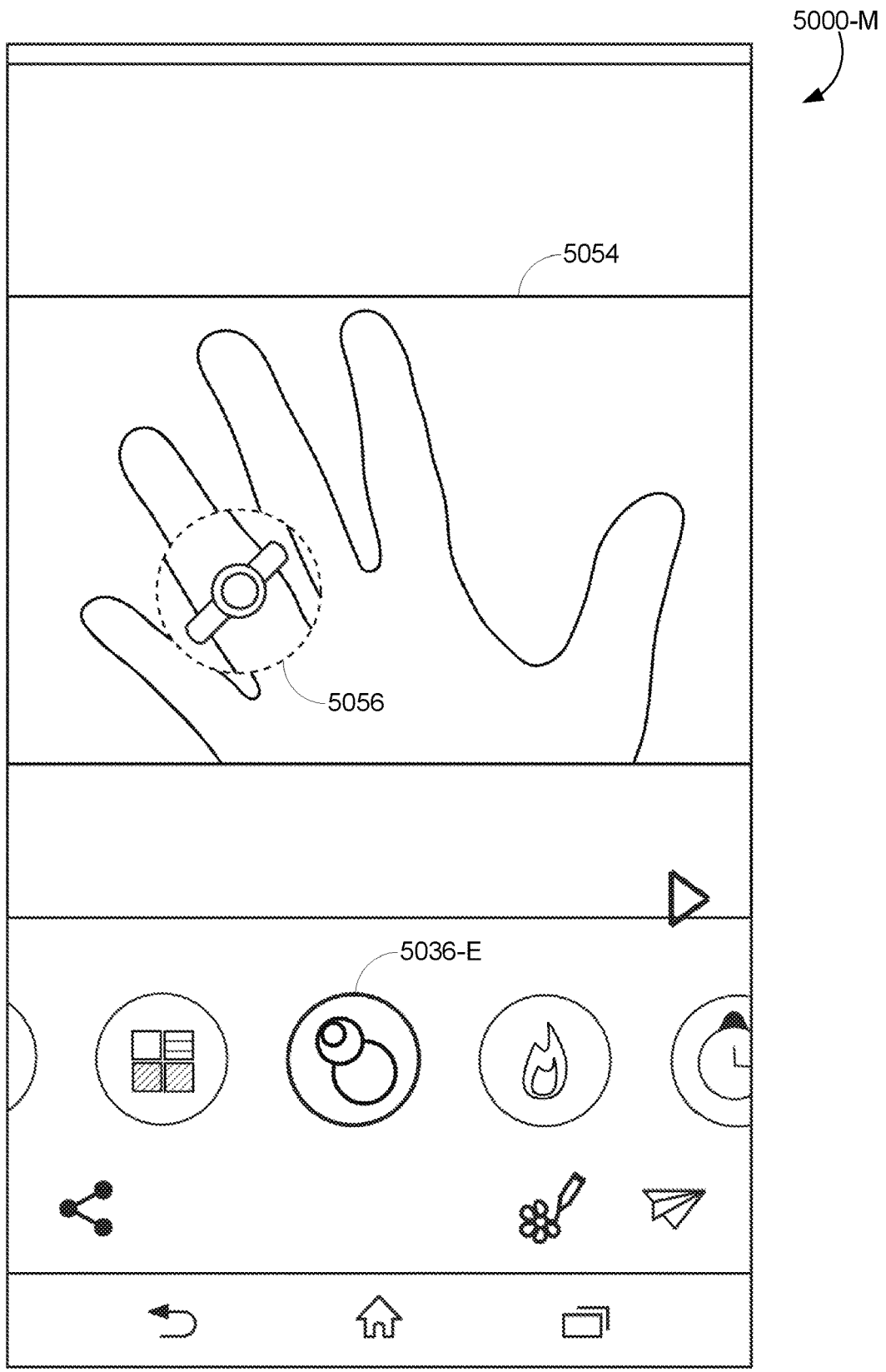

FIG. 5L illustrates UI 5000-L, which shows an image 5054 (of a hand with a ring on one of the fingers) prior to application of an interactive filter. When the user selects the icon 5036-E, the drops (or bubbles) interactive filter is active. In some implementations, the user can tap on the image 5054 to apply a drop or bubble object to the tapped area. For example, FIG. 5M includes UI 5000-M, which shows the image 5054 with a drop 5056 applied to the area of the ring on one of the fingers. Visually, a drop appears as a convex area (like a bubble or water drop, for example) that distorts and optionally zooms in on the portion of the image over which the drop is applied. For example, the area of the ring in the drop 5056 is distorted (the distortion is most pronounced at the edge of the drop 5056), and appears zoomed in compared to the ring in the image 5054 in FIG. 5L. The user can tap on the image 5054 to add as many drops as desired. In some implementations, the user can perform a pinch or de-pinch gesture on a drop to enlarge or shrink the drop, respectively. In some implementations, in the interactive mode, the user can tap on a drop to temporarily remove the drop.

Figure 5N:
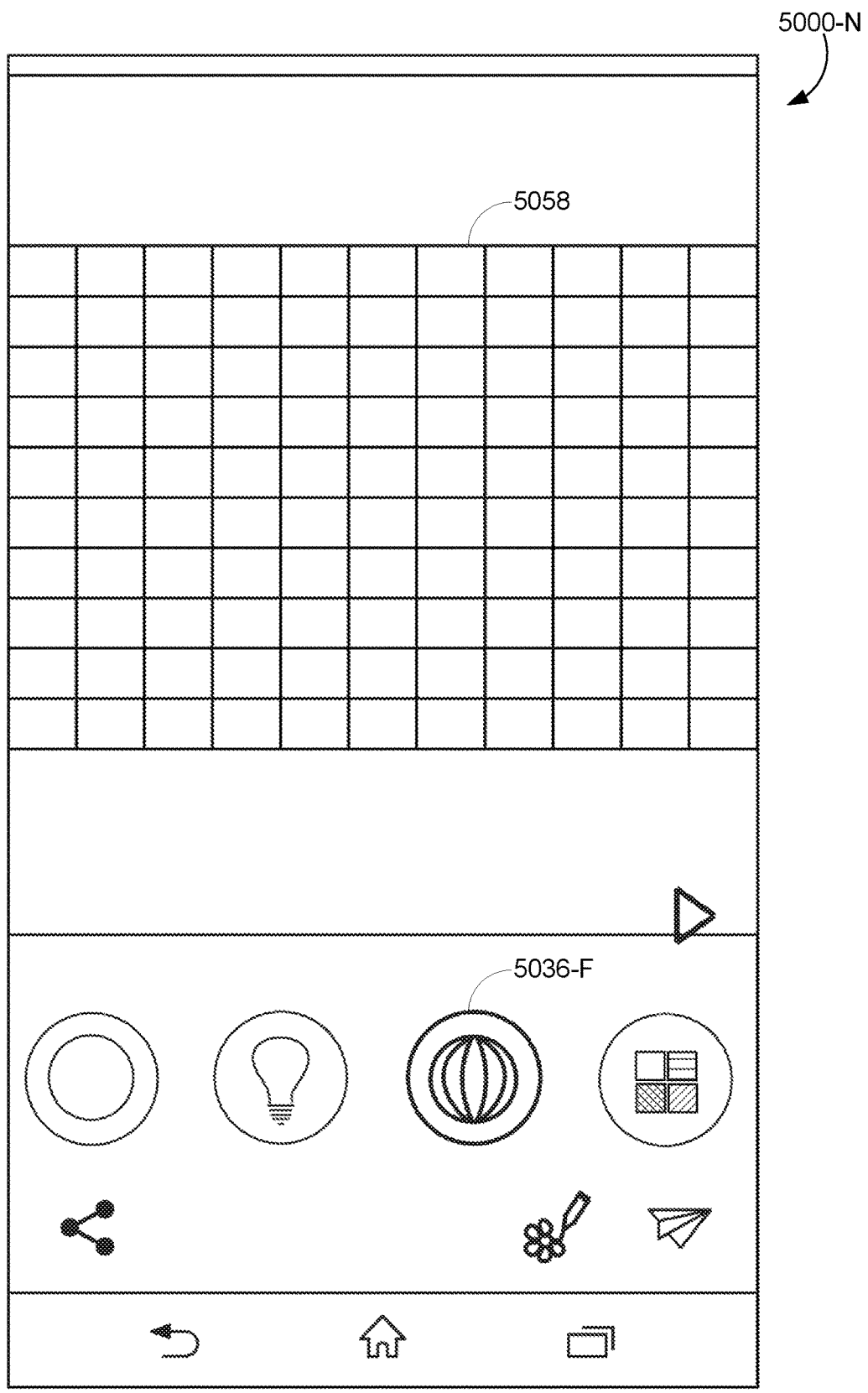
Figure 5O:
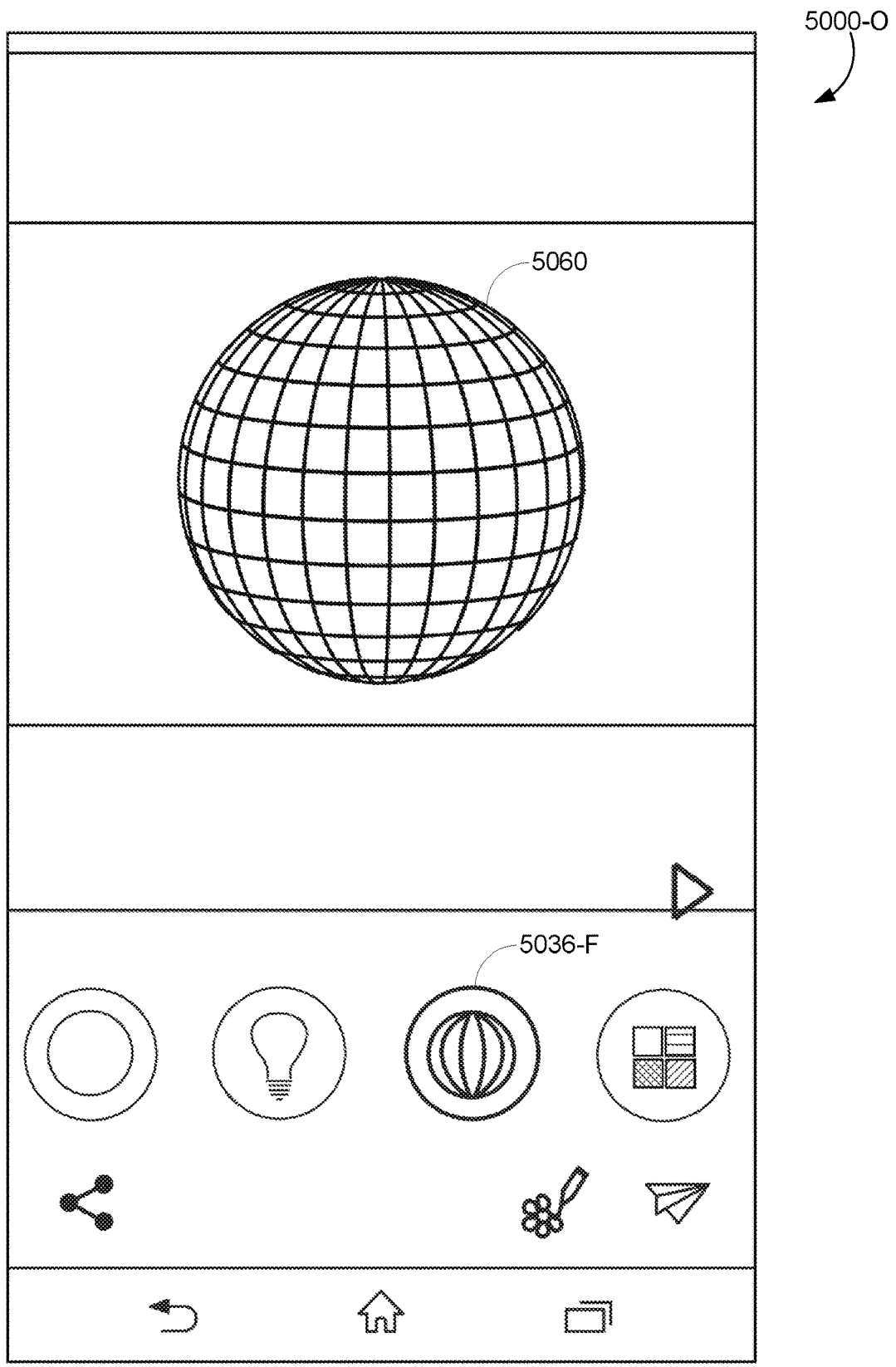

FIG. 5N illustrates UI 5000-N, which shows an image 5058 (of a grid pattern) prior to application of an interactive filter. When the user selects the icon 5036-F, the sphere interactive filter is applied to the image 5058 in response, which results in the projection of the image 5058 onto a virtual spherical object. As shown in UI 5000-O (FIG. 5O), a virtual spherical object 5060 is displayed. The surface of the virtual spherical object 5060 is a projection of the image 5058 onto the virtual spherical object 5060. In some implementations, in the interactive mode, the user can "spin" the virtual spherical object 5060 (e.g., by swiping on the virtual spherical object 5060) to view the image 5058 as a spherical surface projection. In some implementations, in the interactive mode, the user can tap on the virtual spherical object 5060 to partially and temporarily reverse the projection. In some implementations, in the interactive mode, the virtual spherical object 5060 starts spinning when displayed in response to selection of the icon 5036-F, and does not stop spinning until the user taps and holds his finger on the virtual spherical object 5060.

Figure 5P:
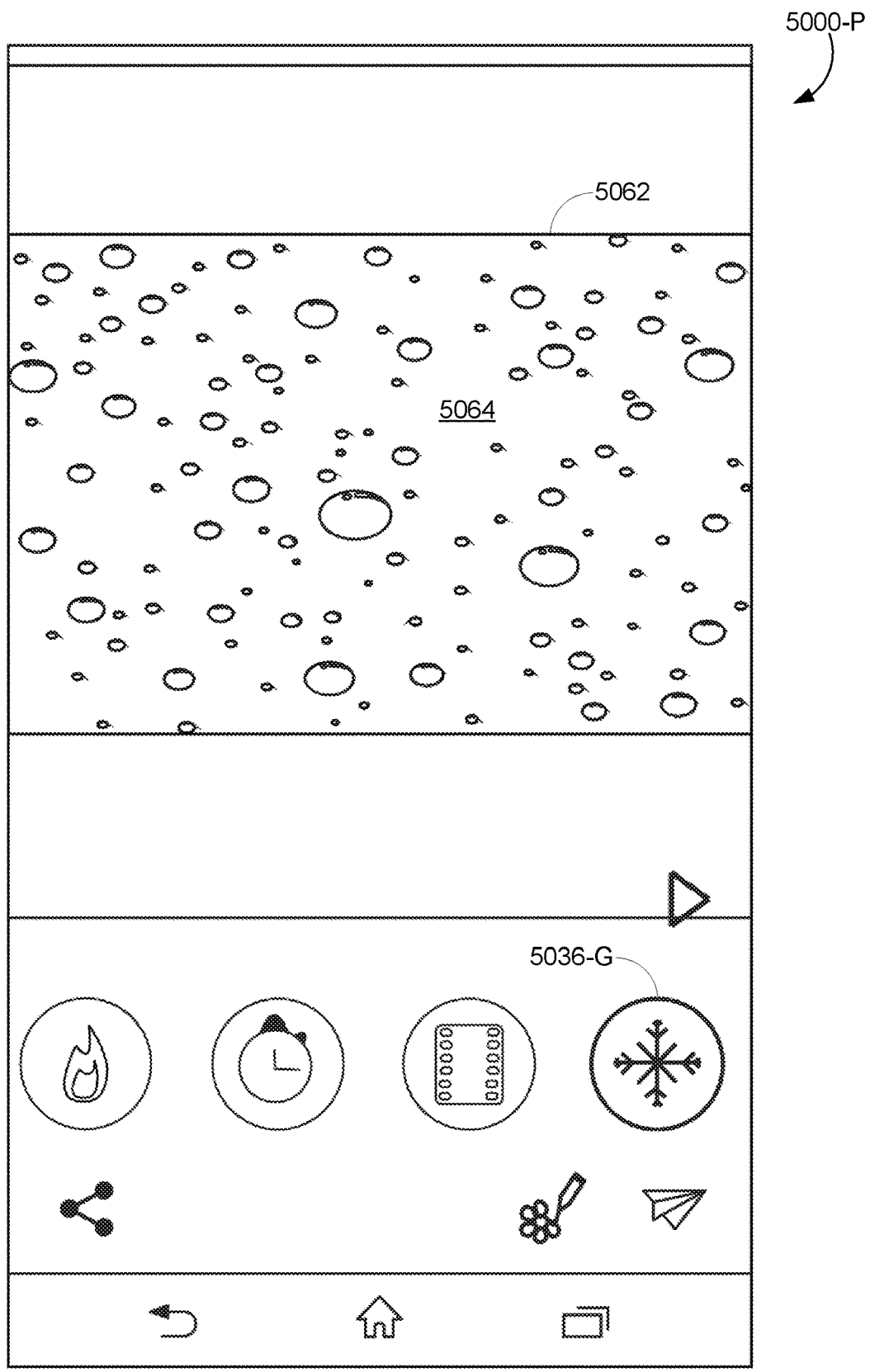
Figure 5Q:
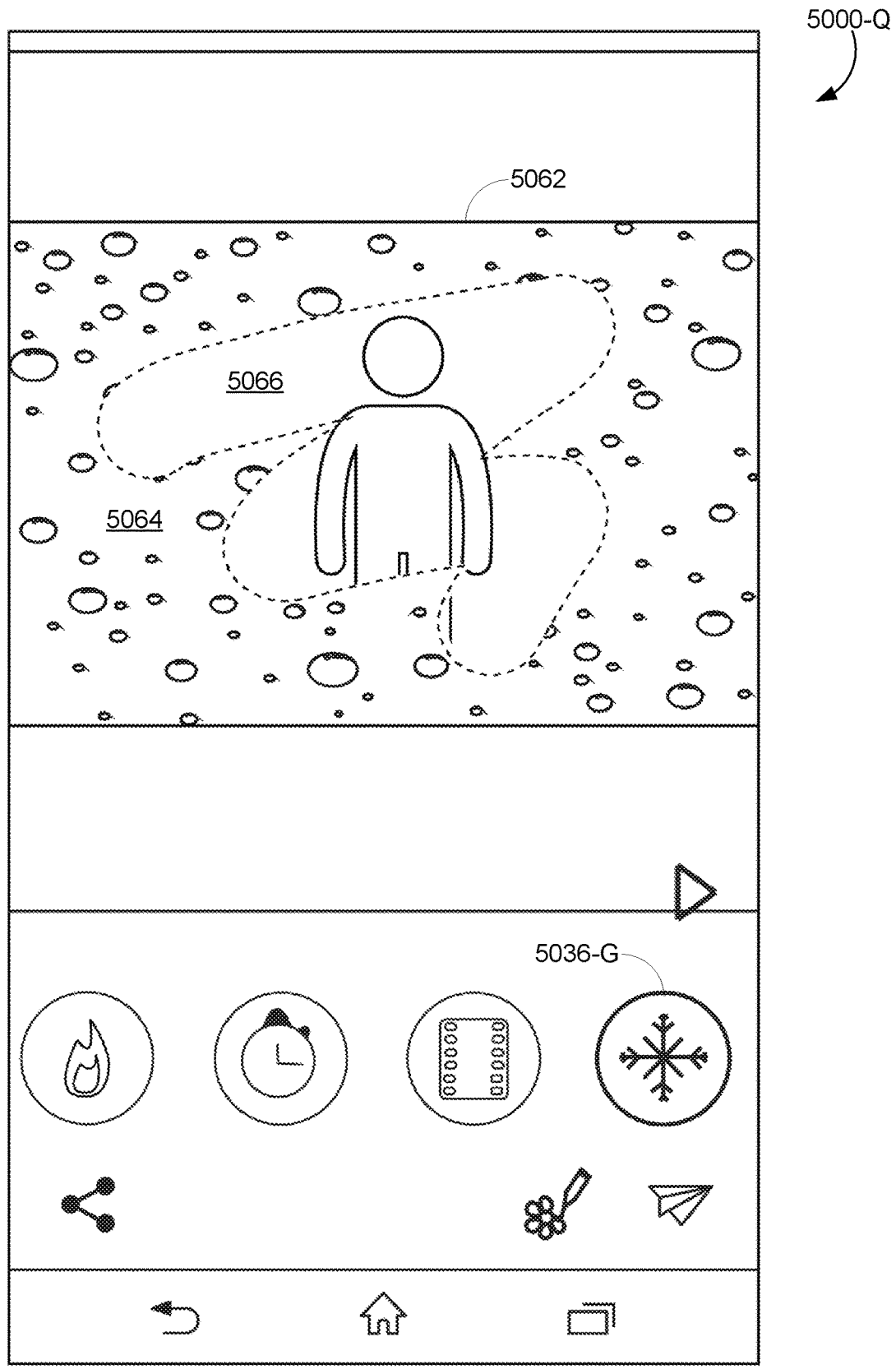

FIG. 5P illustrates UI 5000-P, which shows an image 5062 (of a human figure) with a condensation interactive filter (corresponding to icon 5036-G) already applied. The image 5062 is obscured (e.g., hidden) by the condensation filter. The condensation filter appears visually as a graphical representation of condensation 5064, as in condensation on a window. In some implementations, in the interactive mode, the user can partially and/or temporarily "wipe off the condensation" to reverse the condensation filter and reveal part of the image 5062 by swiping on the condensation 5064, as if wiping condensation off of a window or a glass. FIG. 5Q illustrates UI 5000-Q, which shows a portion of the image 5062 visible through an opening 5066 in the condensation 5064.

Figure 5R:
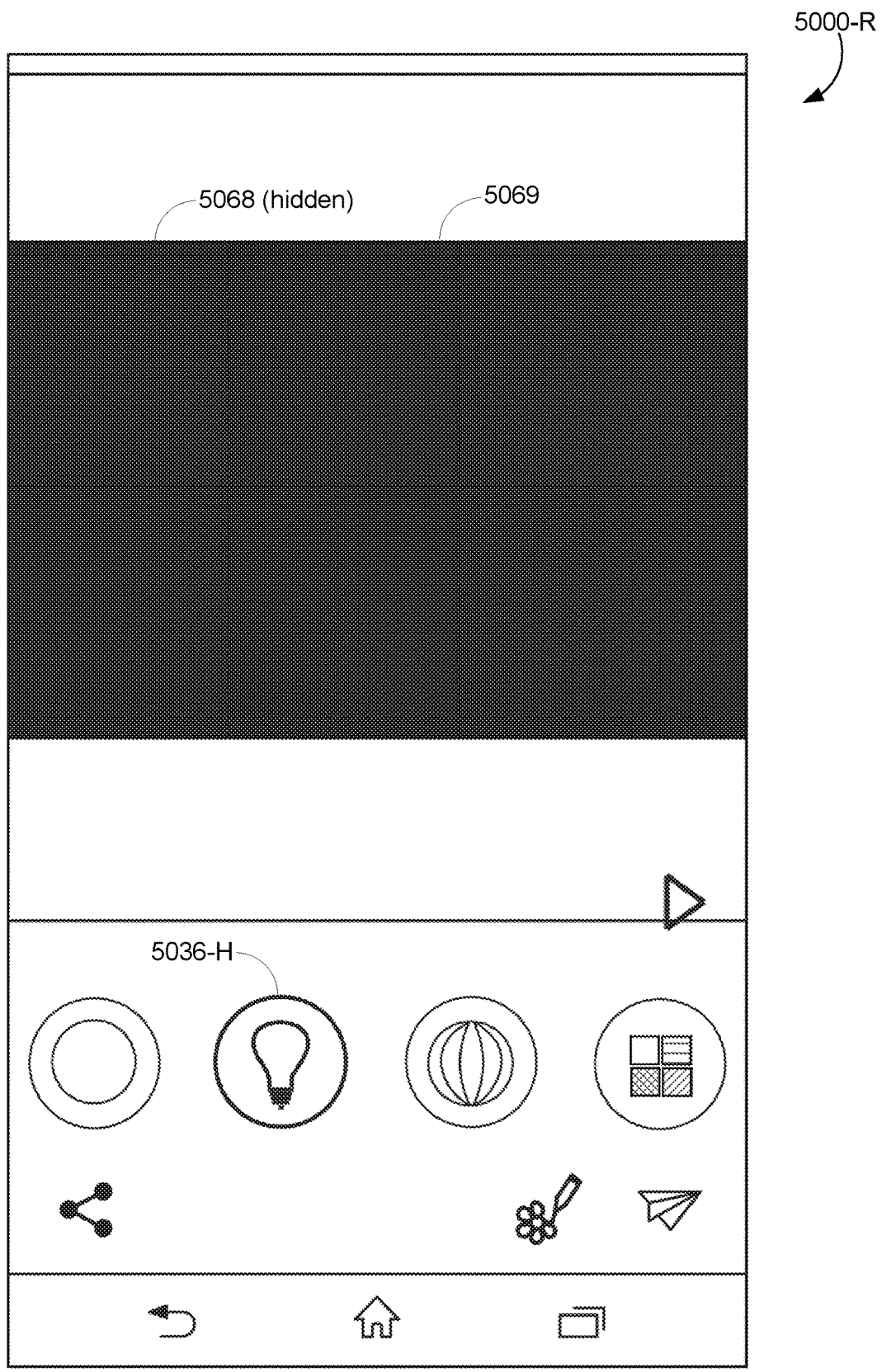
Figure 5S:
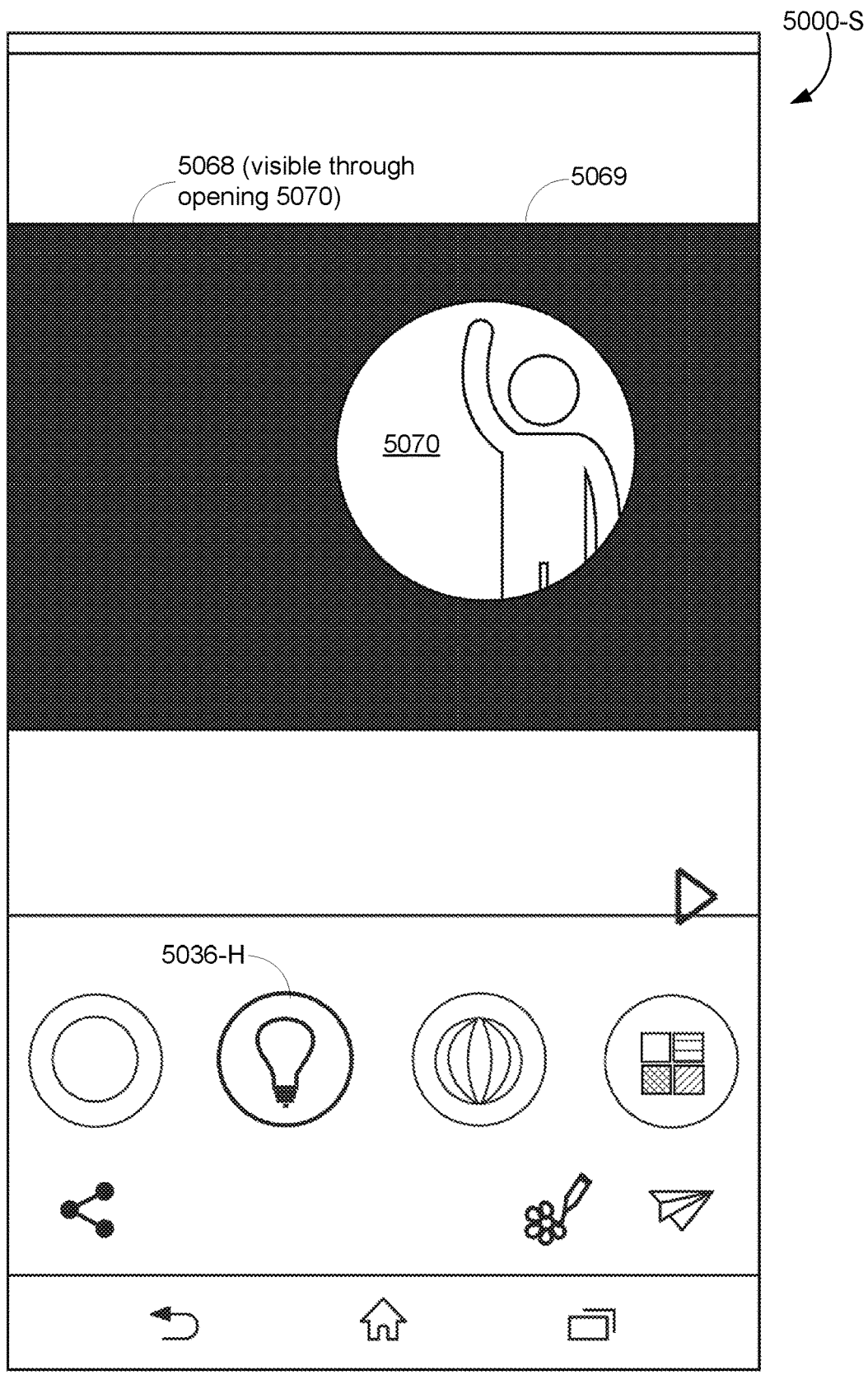

FIG. 5R illustrates UI 5000-R, which shows an image 5068 (of a human figure with a raised hand) with a darkroom interactive filter (corresponding to icon 5036-H) already applied. The image 5068 is obscured (e.g., hidden) by a black area 5069 over the image 5068. In some implementations, in the interactive mode, the user can tap and hold on the black area and move the finger on the black are to activate an opening 5070 in the black area, through which a portion of the image 5068 is visible; the opening 5070 in the black area simulates shining a flashlight in a dark room. FIG. 5S illustrates UI 5000-S, which shows the image 5068 partially visible through an opening 5070 in the black area.

Figure 5T:
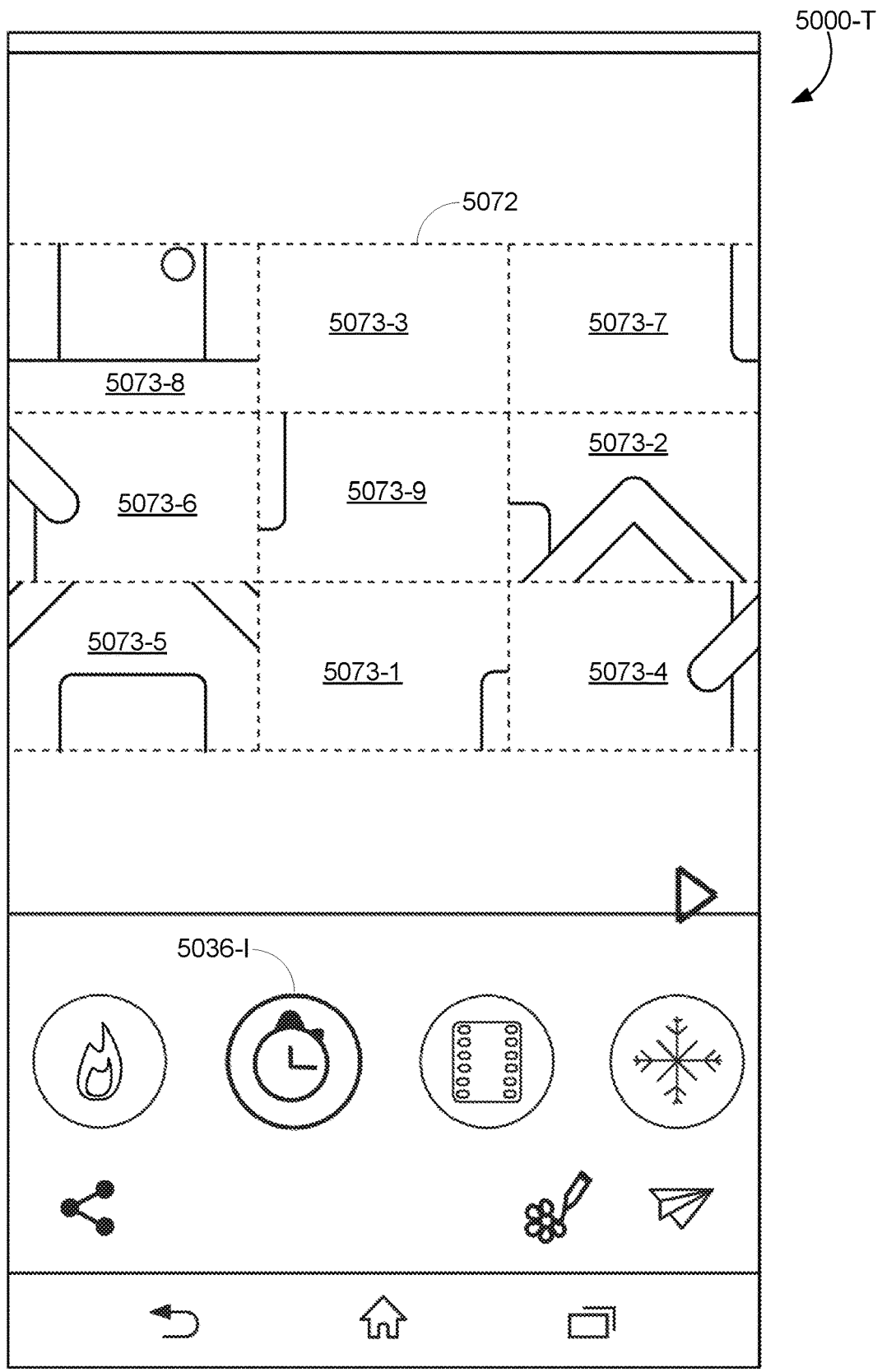
Figure 5U:
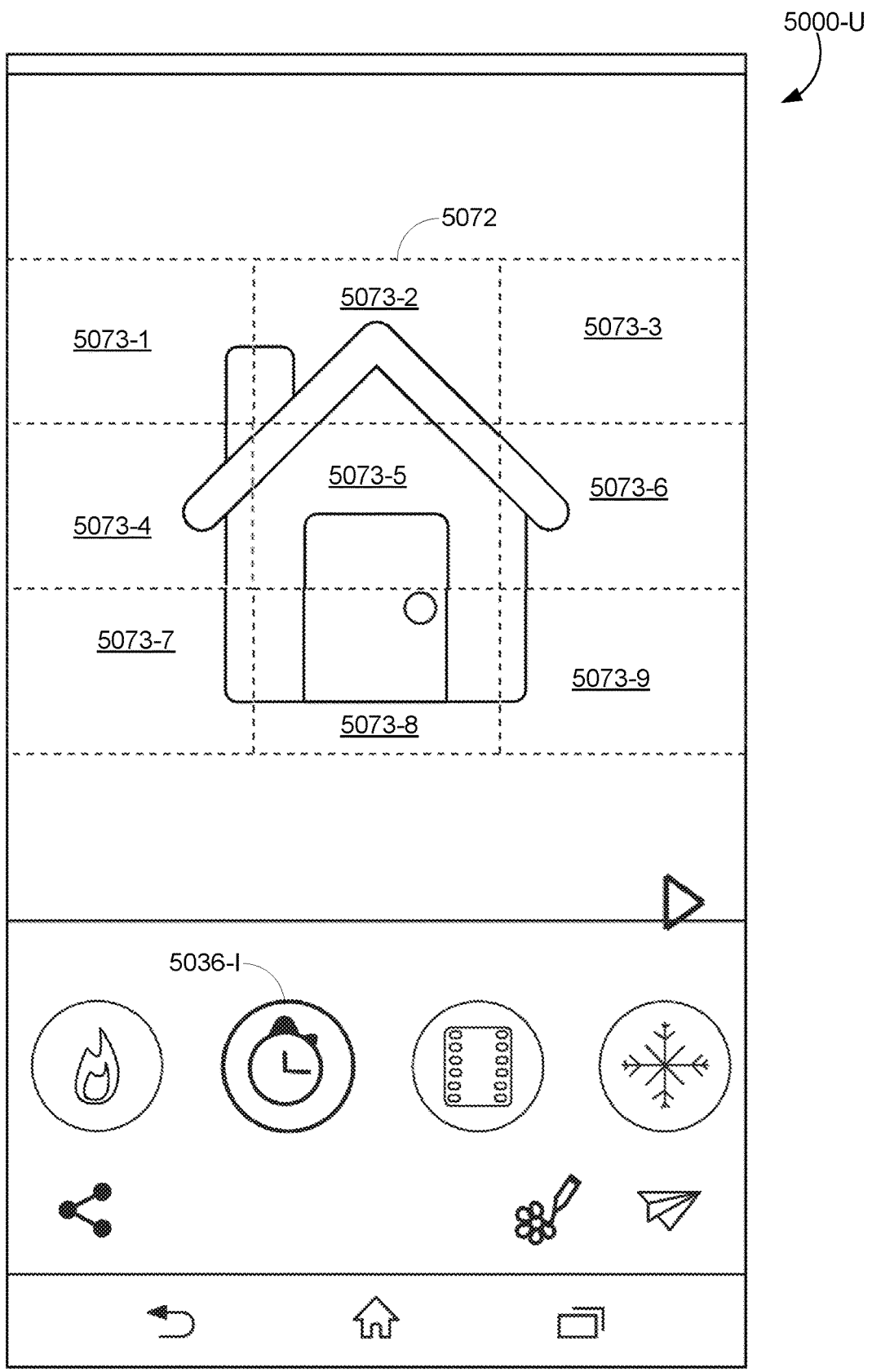

FIG. 5T illustrates UI 5000-T, which shows an image 5072 (of a house) with a puzzle interactive filter (corresponding to icon 5036-I) already applied. The image 5072 is displayed as a sliding tile puzzle, in which the image 5072 is divided into nine tiles 5073-1 thru 5073-9, and the tiles 5073 are scrambled into an arrangement. In some implementations, in the interactive mode, the user can drag the individual tiles 5073 around to rearrange the tiles 5073 in order to attempt reassembling the image 5072 (i.e. reverse the filter), as if solving a sliding tile puzzle. In some implementations, the puzzle is timed; the user has a predefined amount of time to solve the puzzle before the tiles 5073 are re-scrambled. The predefined amount of time can be an application or filter default, or an amount of time defined by the user who applied the filter and/or sent the image. FIG. 5U illustrates UI 5000-U, which shows the puzzle solved and image 5072 reassembled. In some implementations, after the puzzle is completely solved, the tiles 5073 are automatically re-scrambled after a delay from when the puzzle is solved (e.g., 5 seconds).

The interactive filters described above are but a few examples. It should be appreciated that many more types of interactive filters that obscure and/or distort the image, and which can be interacted with to at least partially reverse the filter, are possible.

Figure 5V:
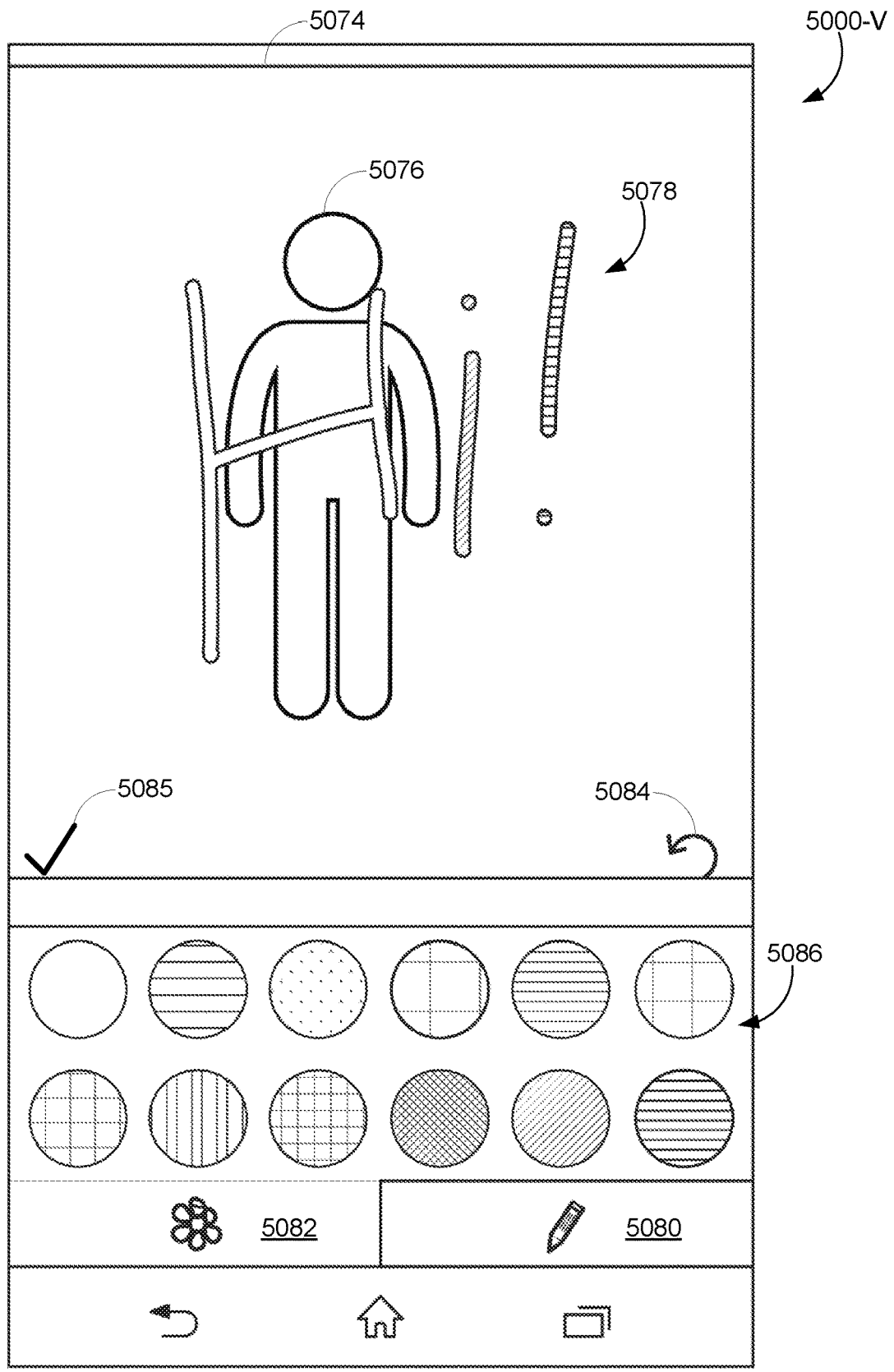
Figure 5W:
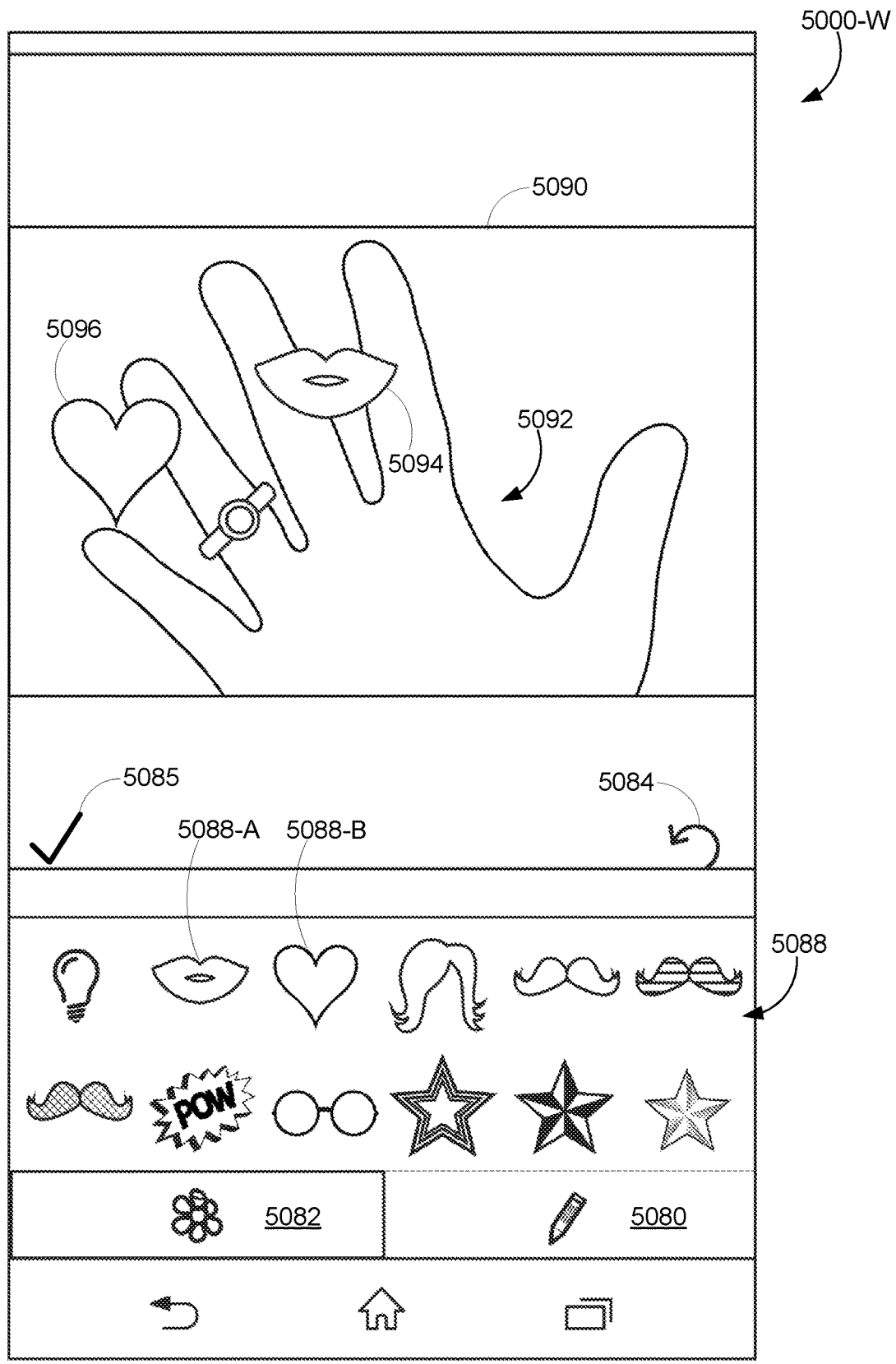

As described above, with reference to FIG. 5D, the user can select drawings/stickers icon 5032 to open a user interface for adding drawings and/or stickers to an image, examples of which are illustrated in FIGS. 5V-5W. FIG. 5V illustrates UI 5000-V, which shows an image 5074 with a human figure 5076, along with a user interface for adding drawings and stickers onto the image 5072. The user interface includes drawings icon 5080, stickers icon 5082, and icons 5086 corresponding to respective pen colors. When the drawing icons 5080 are selected, the pen color icons 5086 are displayed as shown in FIG. 5V. The user can select one of the pen color icons 5086 and then draw on the image 5074 to apply a drawing with the color corresponding to the selected icon 5086. The user can select the undo icon 5084 to undo the drawings (i.e., remove them from the image 5074), or select a done icon 5085 to confirm the addition of the drawings to the image and save the image with the drawings. In FIG. 5V, the image 5074 is shown with a drawing 5078 (a stylized "Hi!") drawn over the human figure 5076.

When the stickers icon 5082 is selected, sticker selection icons are displayed. For example, FIG. 5W illustrates UI 5000-W, which shows image 5090 of a hand 5092 with a ring. Stickers icon 5082 is selected, and sticker selection icons 5088 are displayed. Each sticker selection icon 5088 corresponds to an as-depicted, predefined virtual sticker. Stickers 5094 and 5096 have been applied to the image 5090. The sticker 5094 corresponds to icon 5088-A, and the sticker 5096 corresponds to icon 5088-B. The user can select the undo icon 5084 to undo the stickers (e.g., remove them from the image 5090), or select the done icon 5085 to confirm the addition of the stickers to the image and save the image with the stickers.

Figure 5X:

Interactive filters can be applied to images that have added drawings and/or stickers. FIG. 5X illustrates UI 5000-X, which shows an image 5098 of a hand 5012 with a ring. The image 5098 also includes drawing 5104 and sticker 5106. A drop 5100 of the drops interactive filter (corresponding to icon 536-E) is applied over the ring on the hand 5102.

In some implementations, drawings and stickers added to an image, once the image is saved, become a permanent part of the image; the image with the drawings and stickers is a new image relative to the original image, with new image data (e.g., the image data encodes the original image plus the stickers and drawings).

In some implementations, one or more of the stickers available for adding to images are advertisements (e.g., brands or logos associated with a company or product or service, banner advertisements).

The images described above, with interactive filters, drawings, and/or stickers, are stored in the memory 206 and collected in the gallery 240.

Figure 5Y:
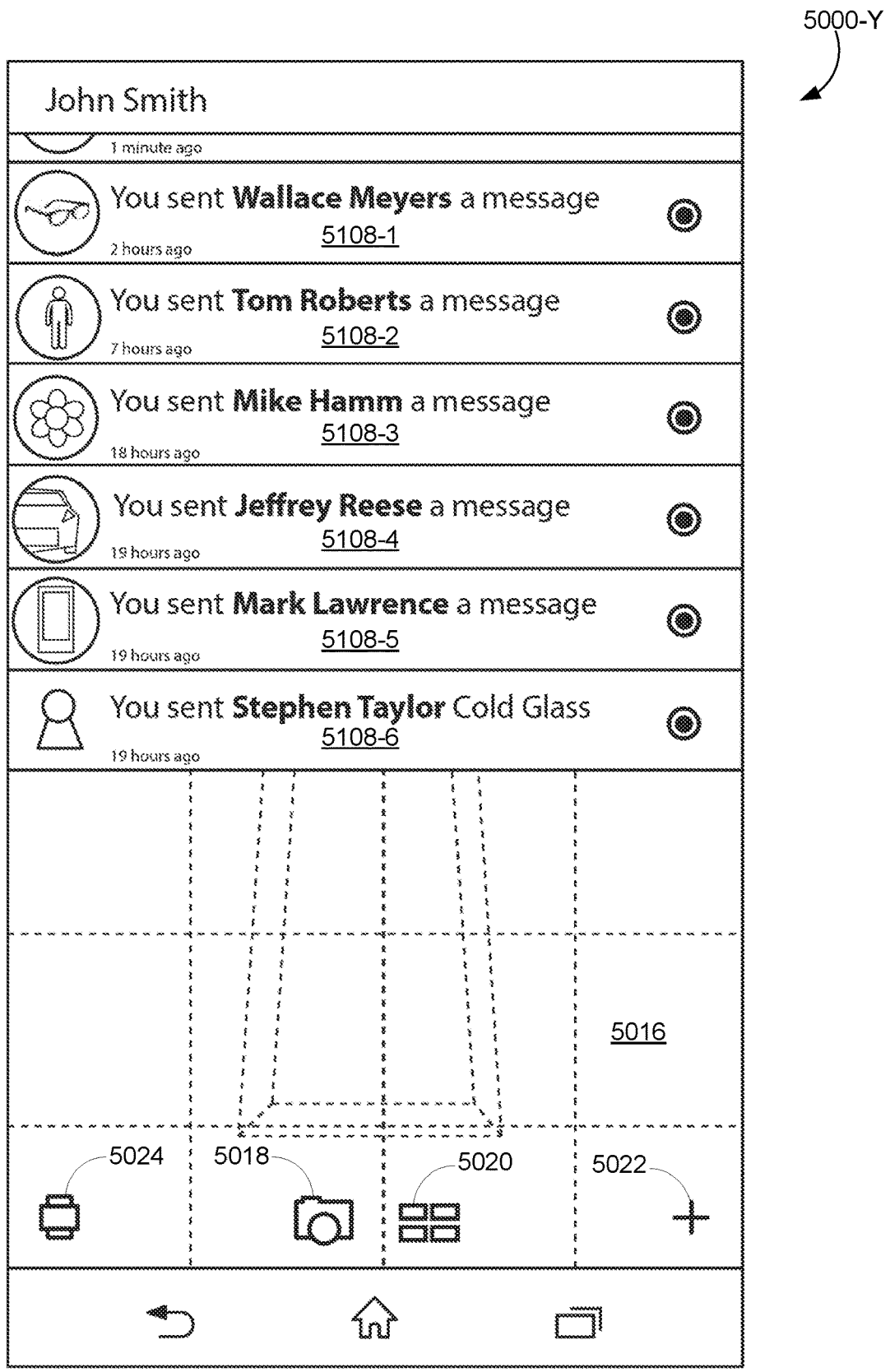

FIG. 5Y illustrates UI 5000-Y, which shows home screen 5116, and a scrollable list of active messaging conversations 5108-1 thru 5108-6 within the home screen 5116. In some implementations, each conversation in the list is represented by a bar with information about the conversation, as shown in FIG. 5Y. The bar for each conversation 5108 in the list shows the last action in that conversation and a time of that last action, as well as an icon indicating whether the last action has been viewed by the user. For example, the last action in the conversation 5108-6 is that the user of the client device 102 sent user "Stephen Taylor" an image with the "Cold Glass" filter (i.e., the condensation filter, FIGS. 5P-5Q) applied. In the conversation 5108-1, the user of the client device 102 sent user "Wallace Meyers" a message.

Figure 5Z:
Figure 5A:
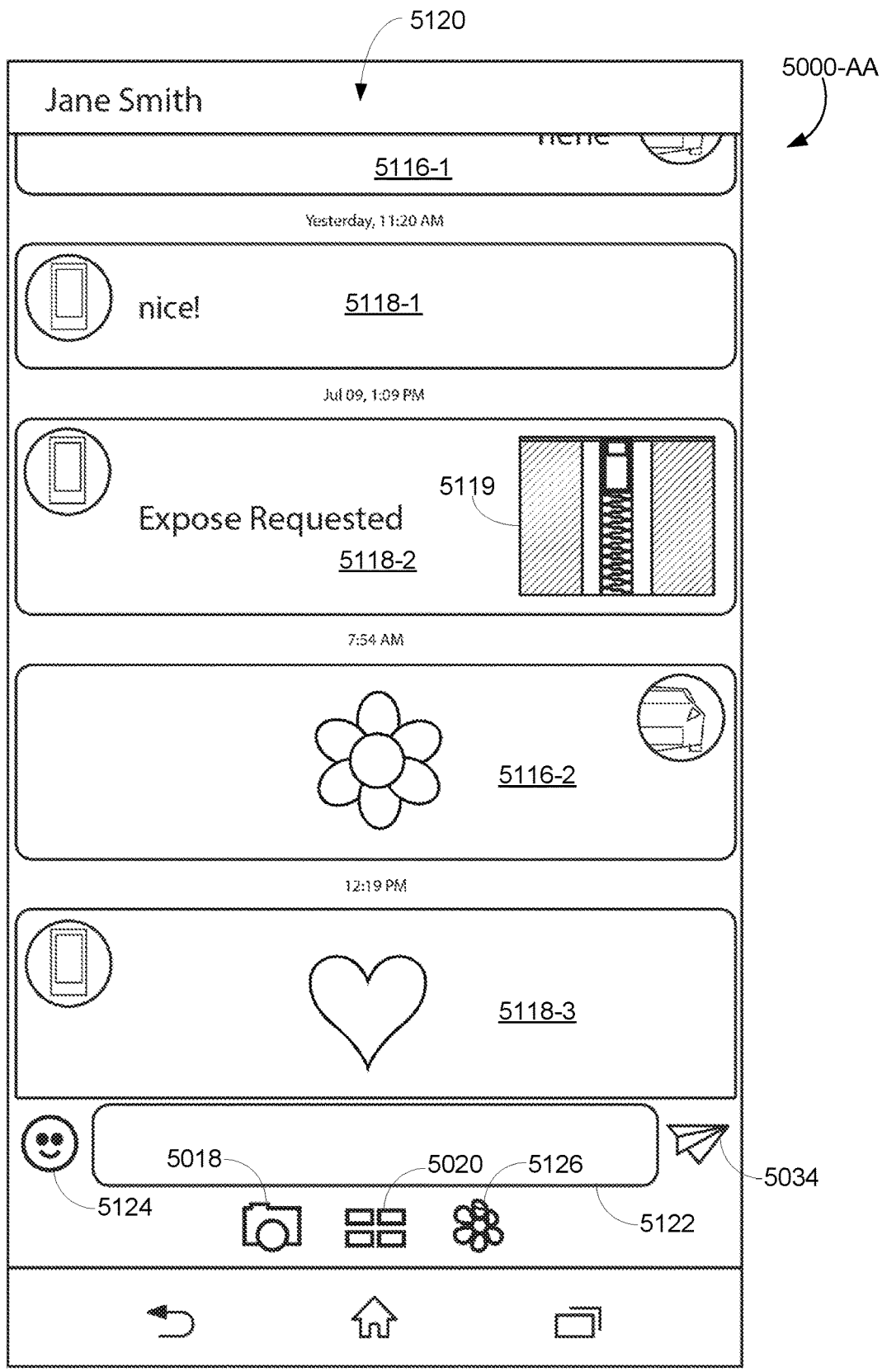
Figure 5B:
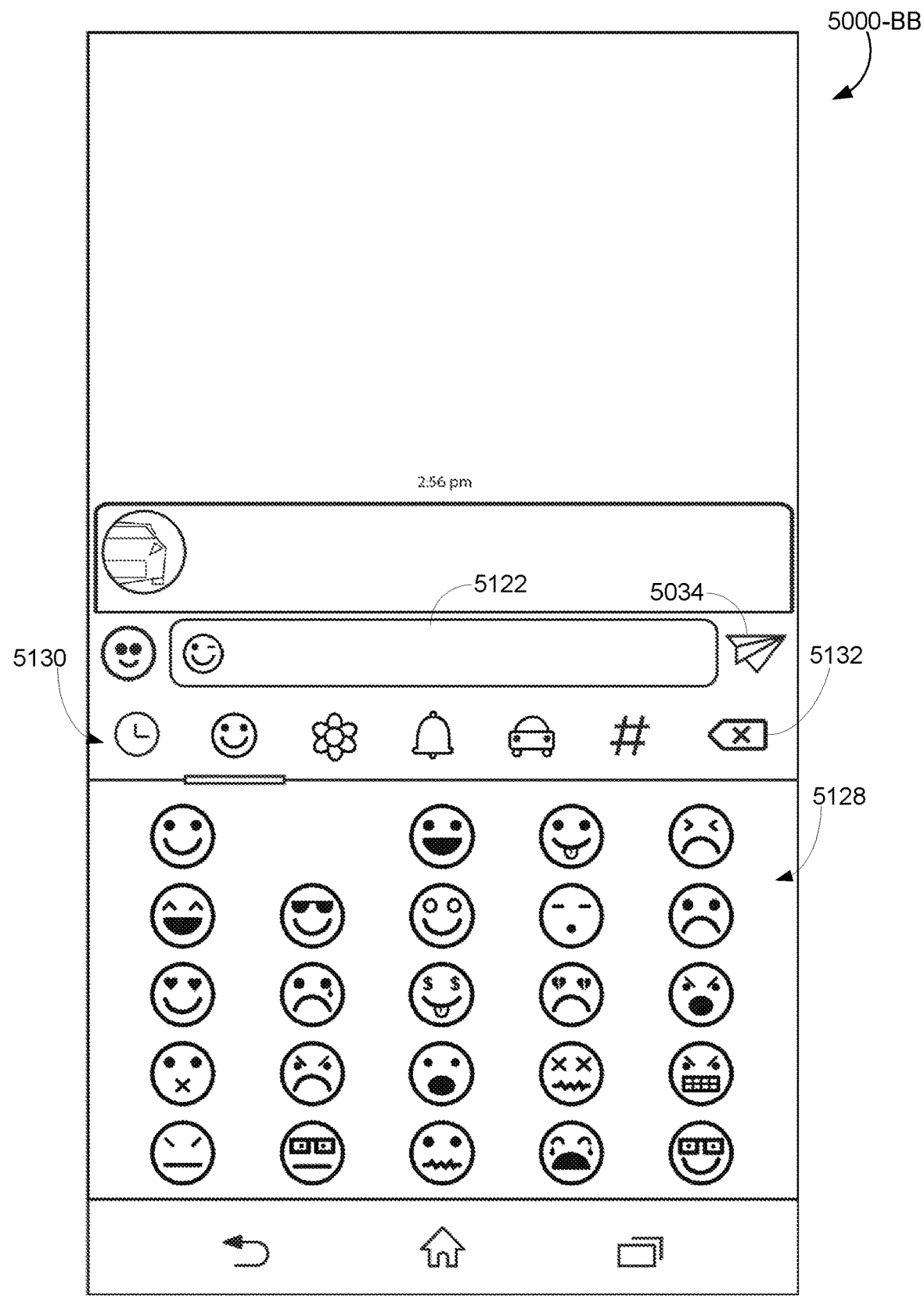
Figure 5C:
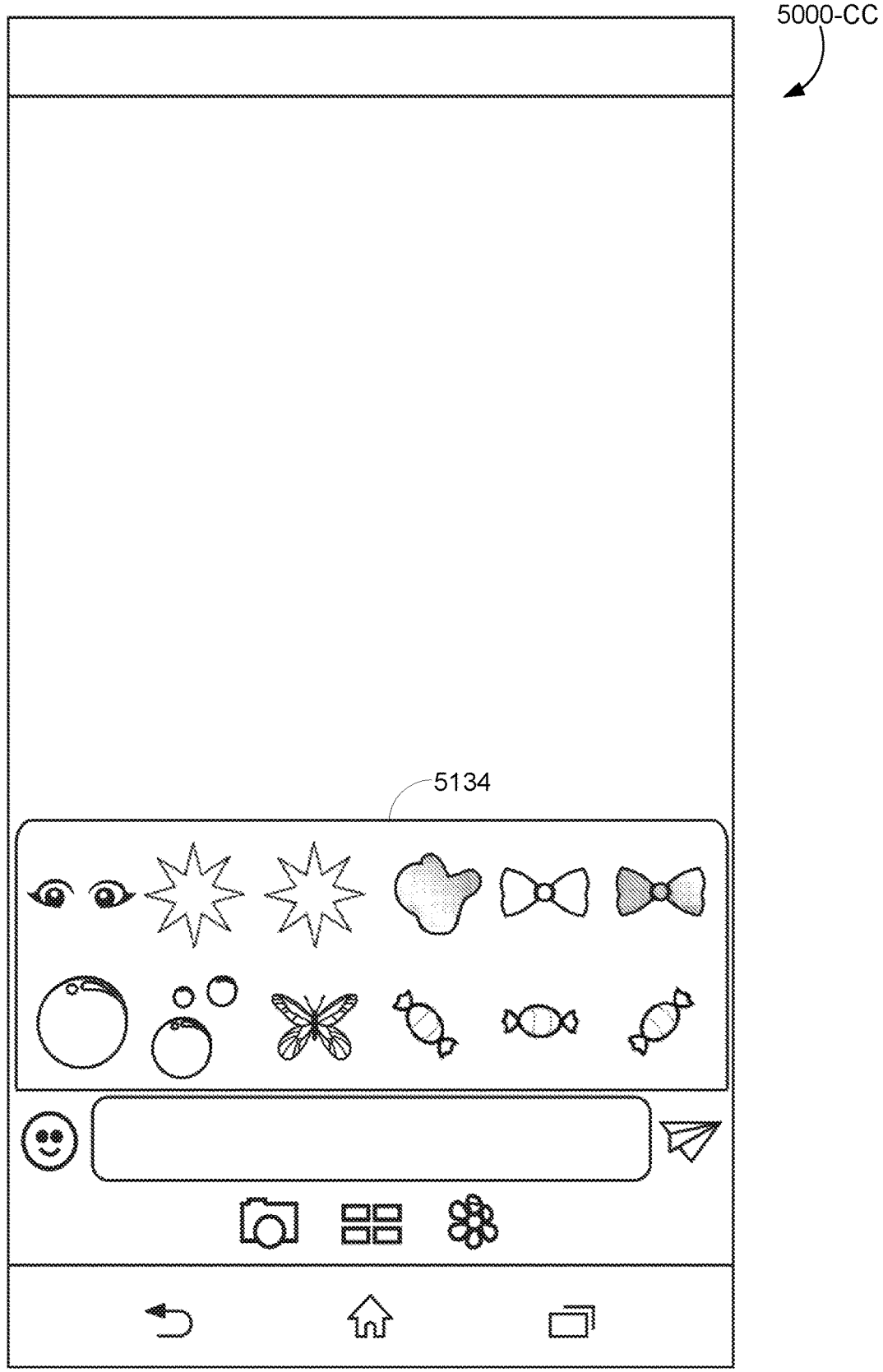
Figure 5D:
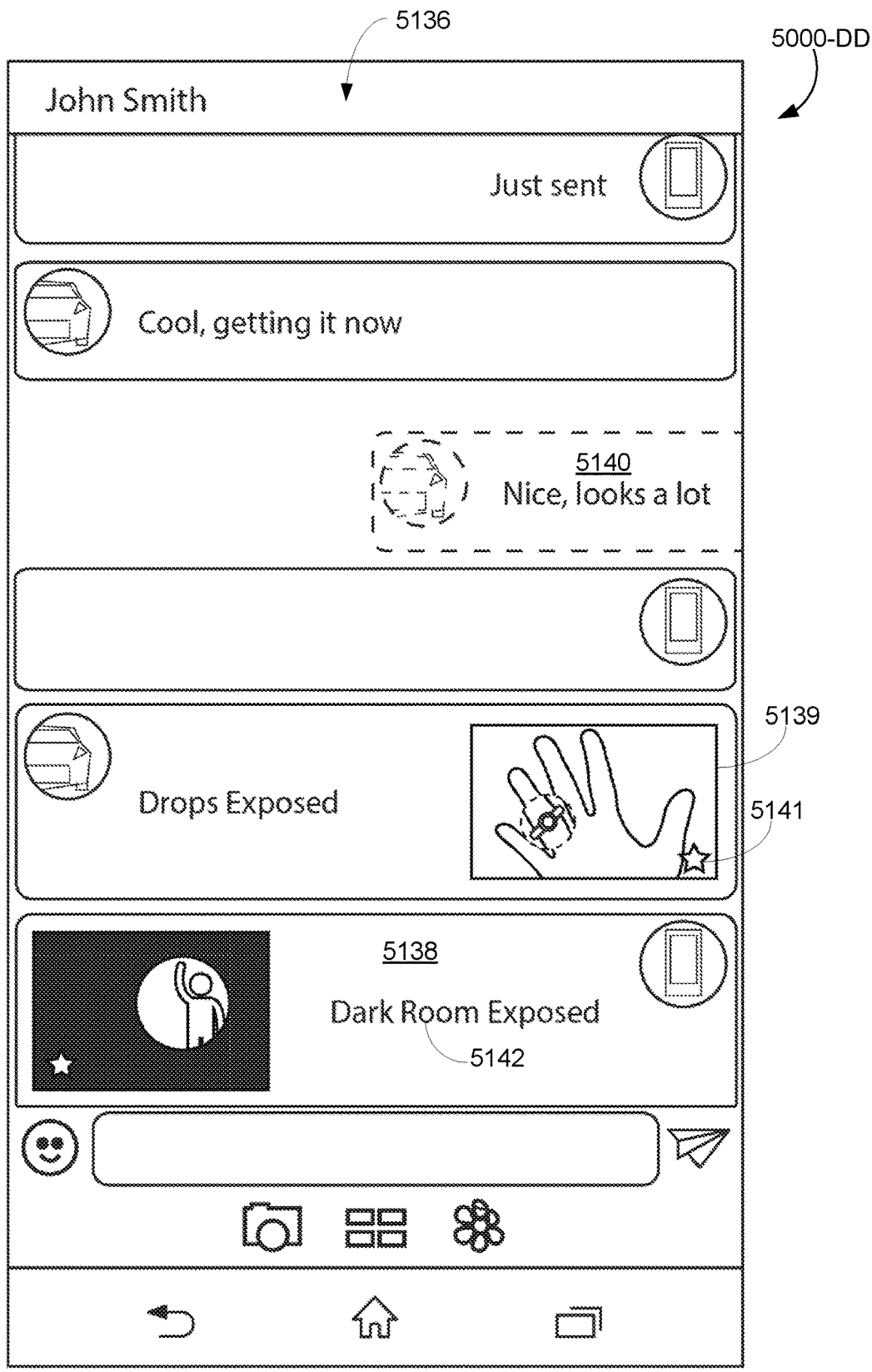
Figure 5E:
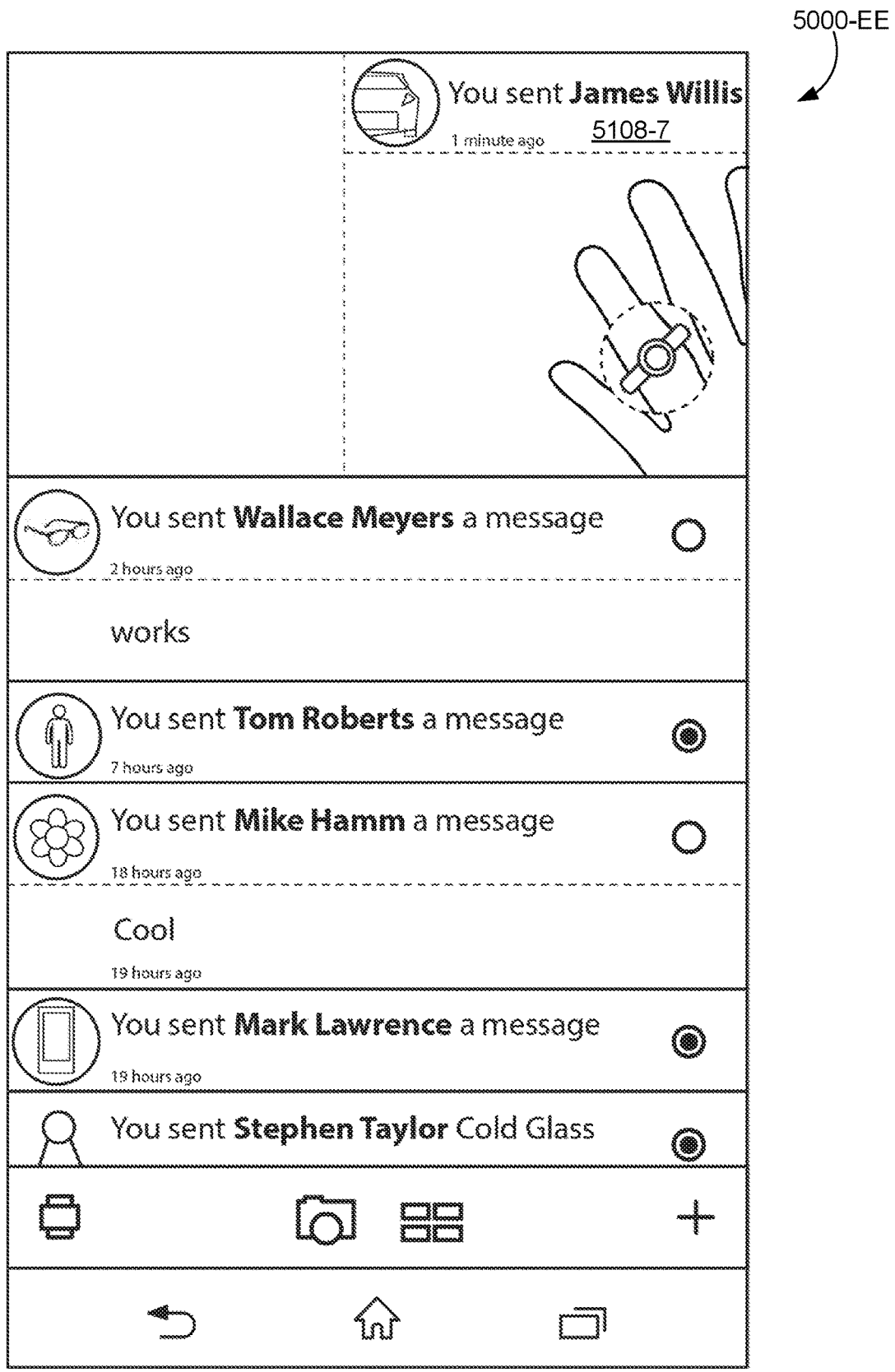
Figure 5F:
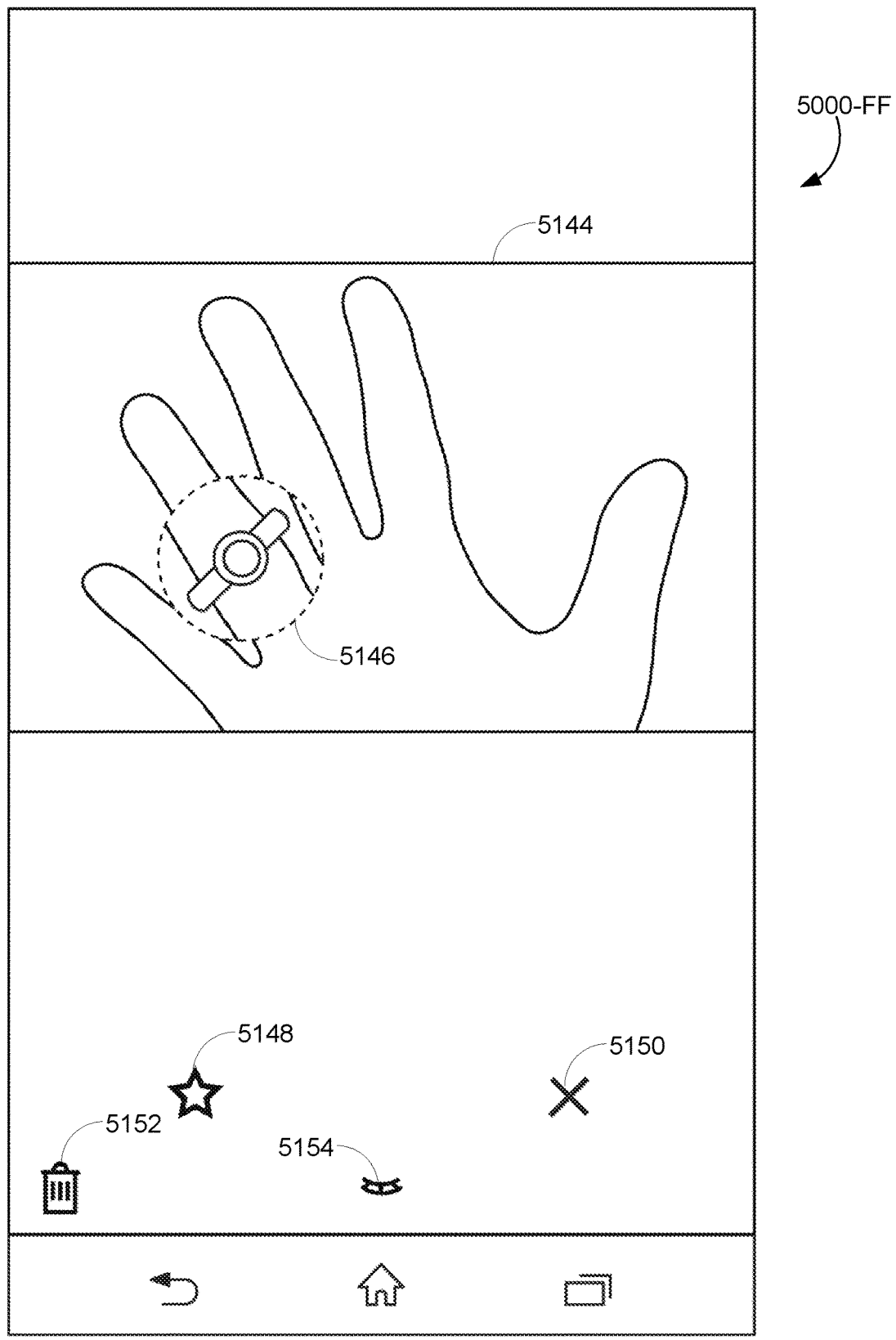
Figure 5G:
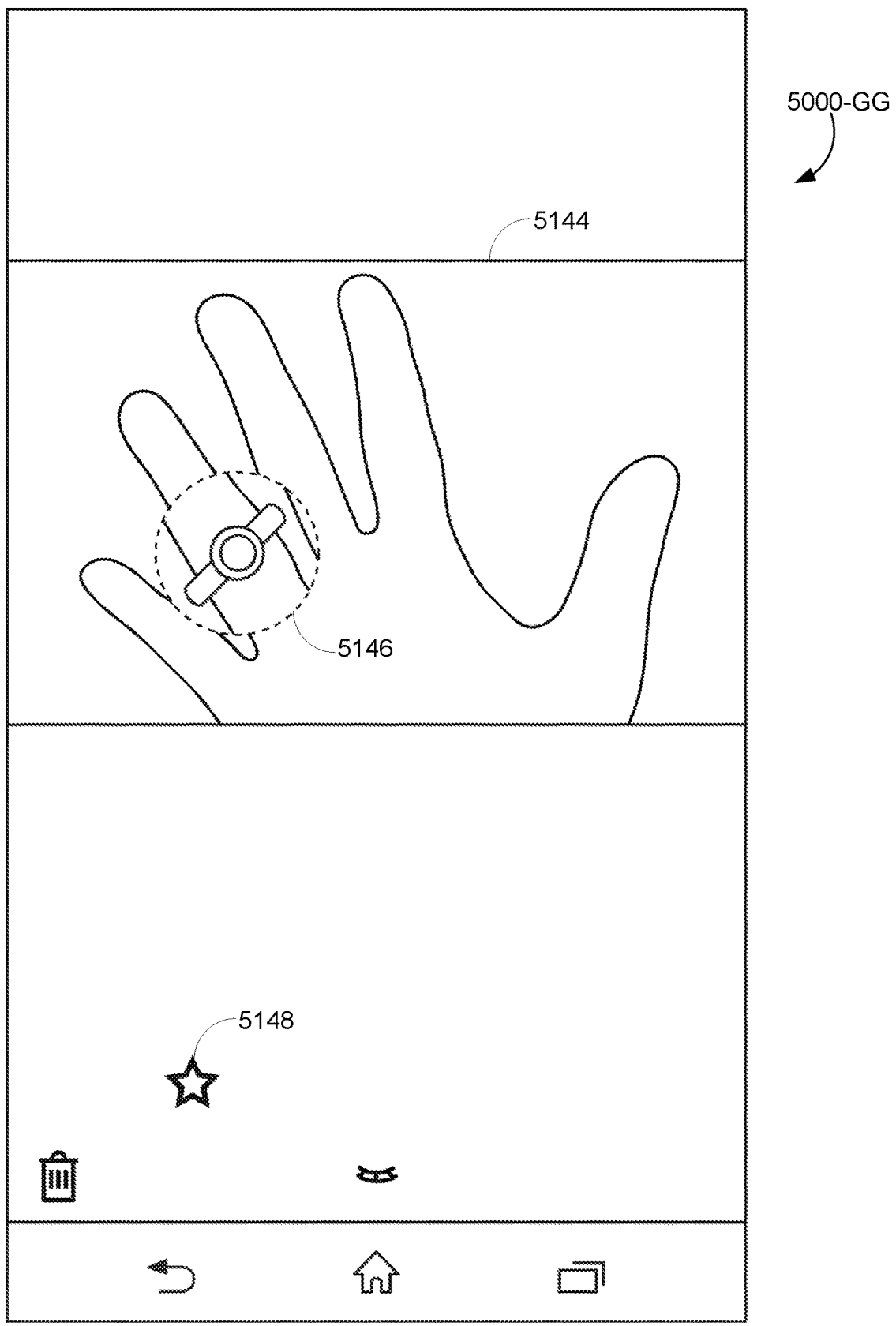
Figure 5H:
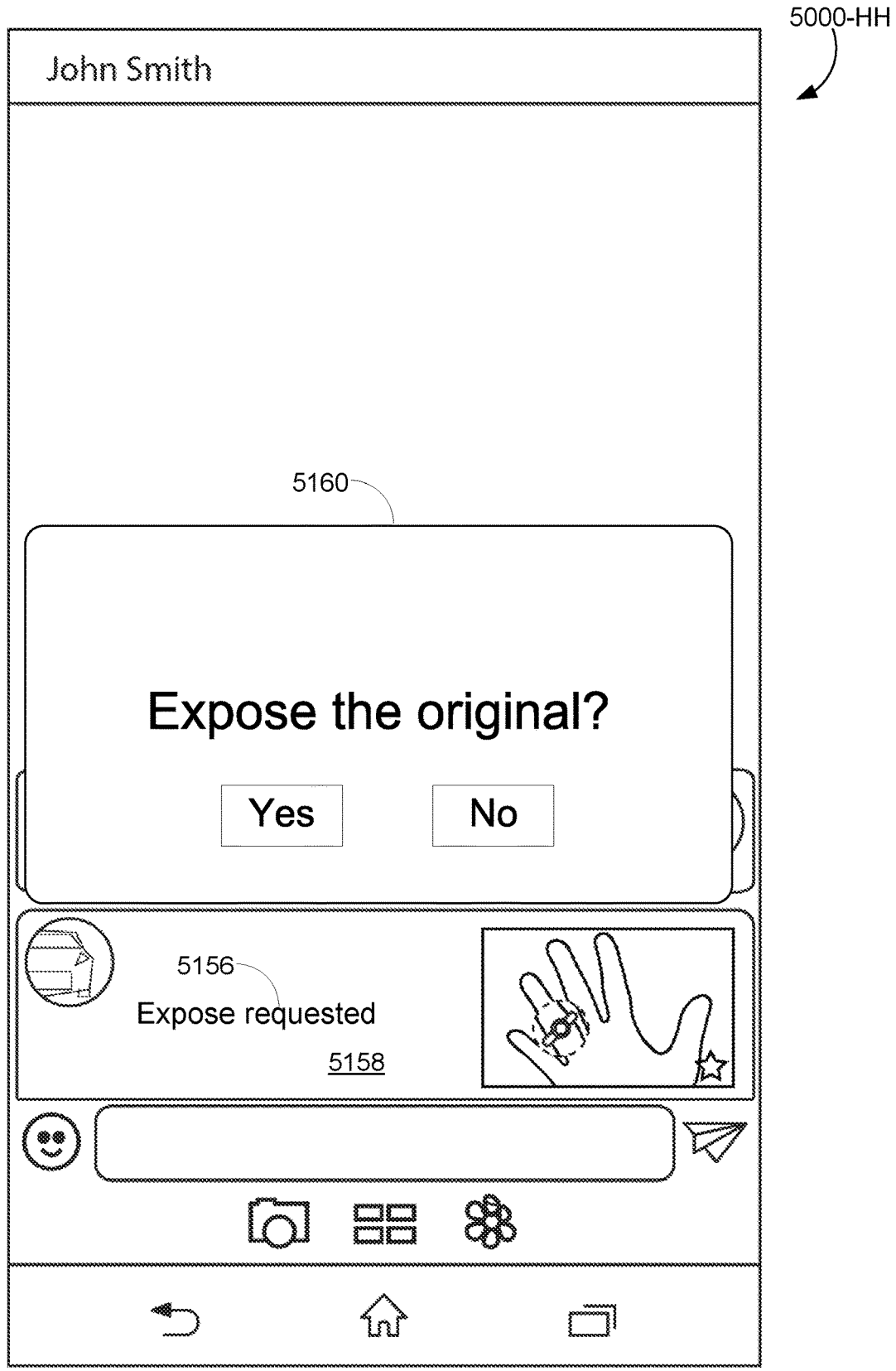
Figure 5I:
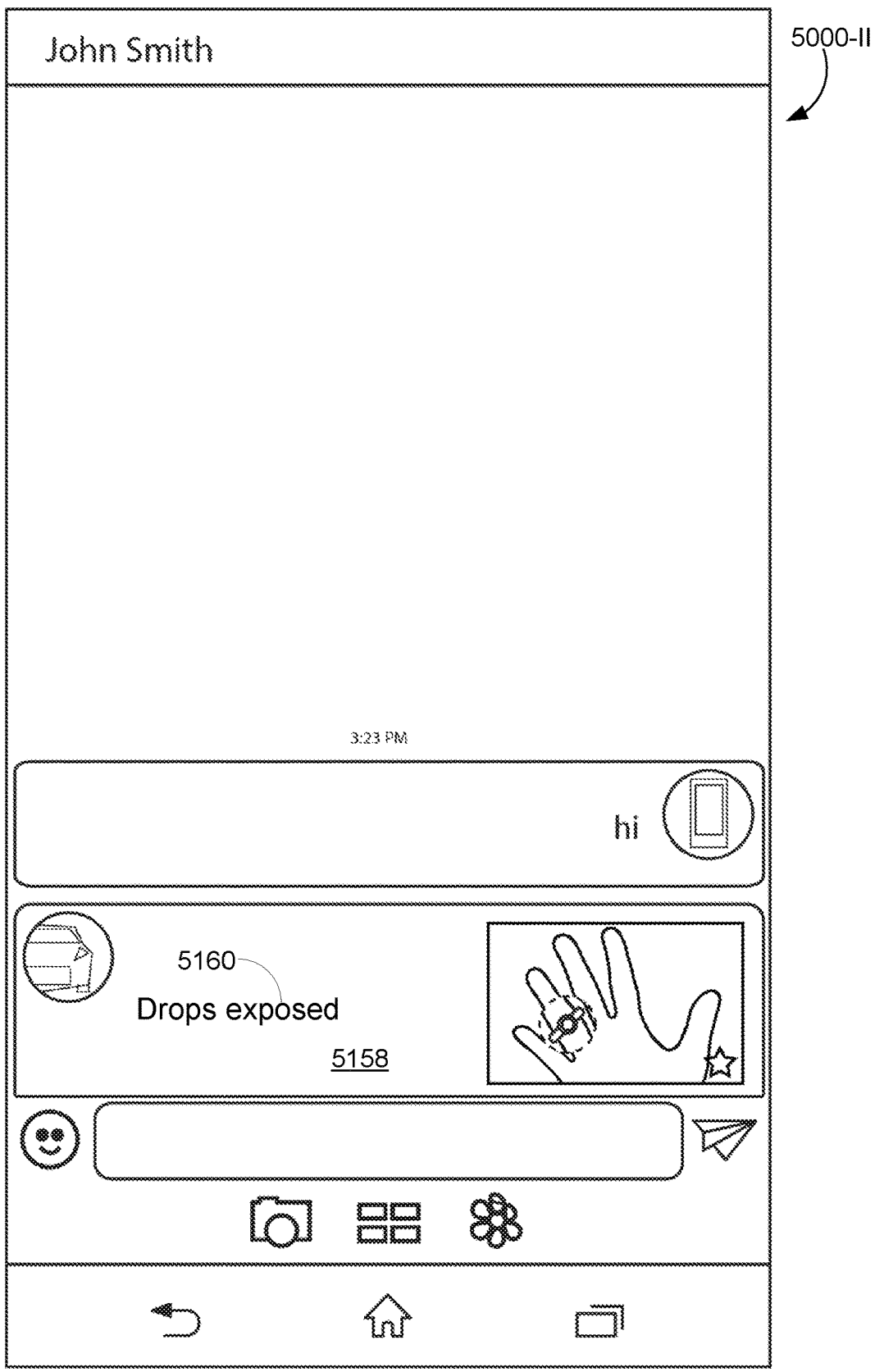
Figure 5J:
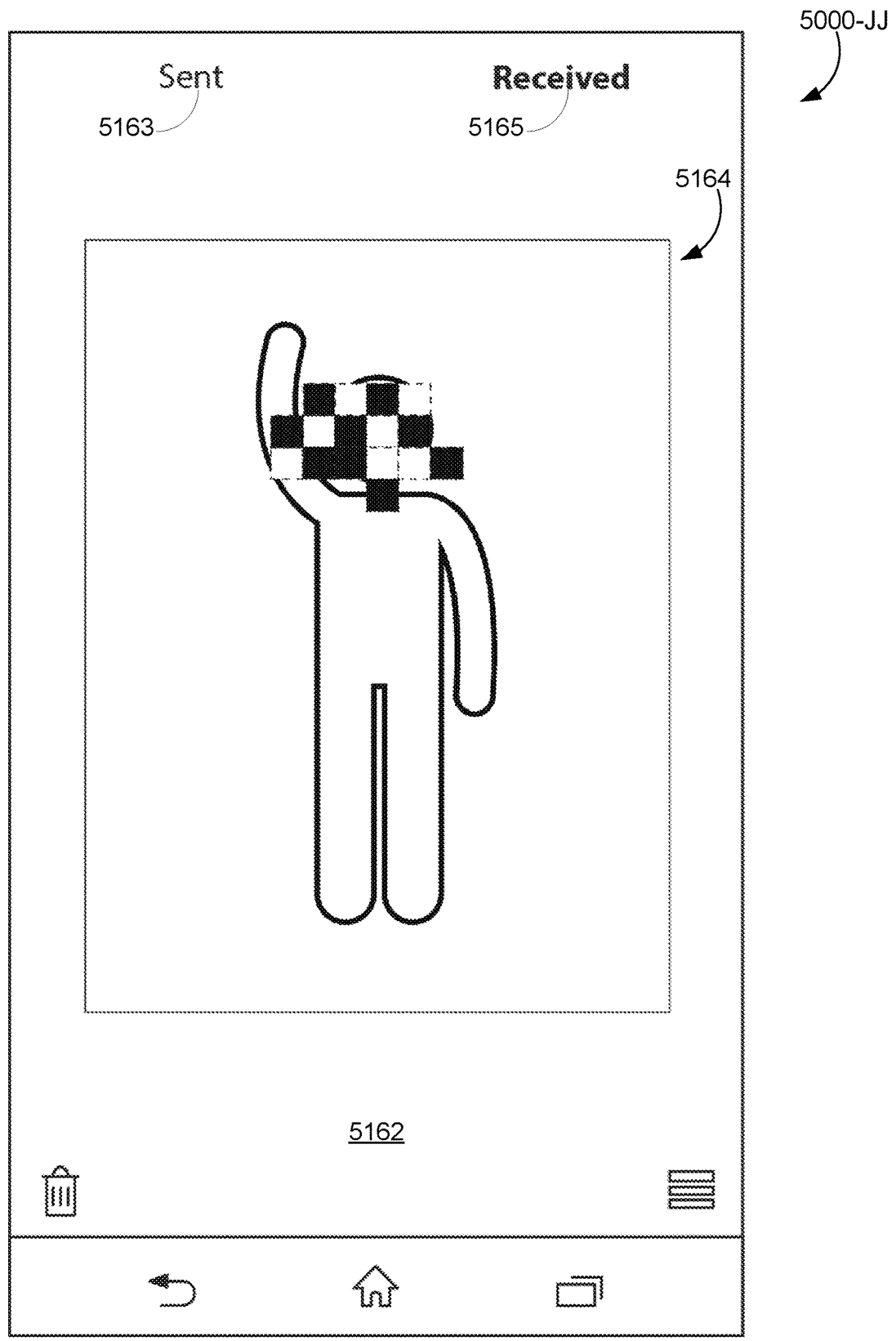
Figure 5K:
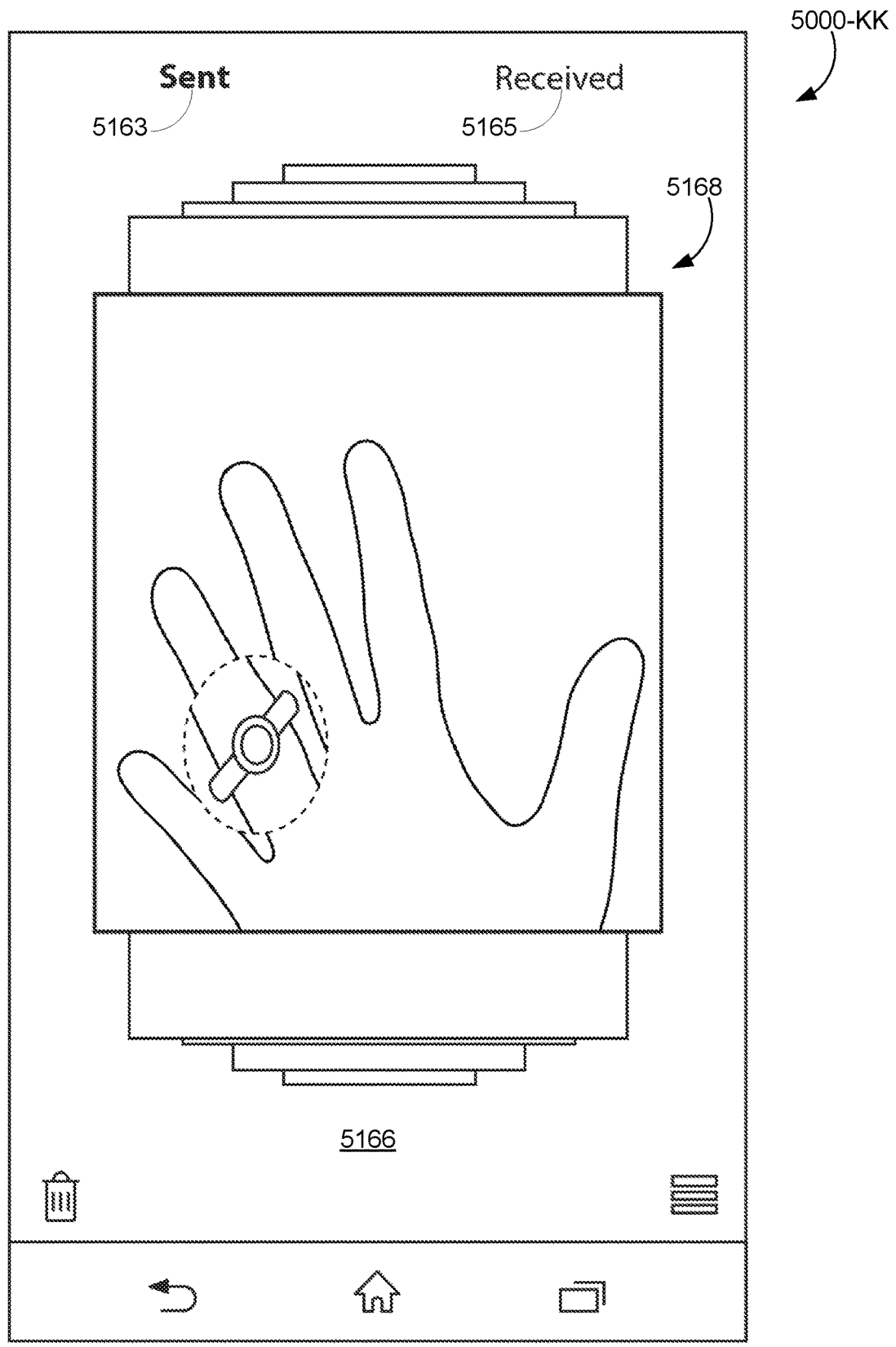

Each bar corresponding to a conversation 5108 is expandable to show the details of that last action in the conversation (e.g., last message or image sent or received). FIG. 5Z illustrates UI 5000-Z, which shows home screen 5116 with the scrollable list of active messaging conversations 5108, with some of the conversation bars expanded to show the details of the last action. For example, for conversation 5108-7, the last action was the user sending "James Willis" an image 5110 with the drops filter. For conversation 5108-1, the last action was the user sending "Wallace Meyers" the message "works" 5112. For conversation 5108-3, the last action was the user sending "Mike Hamm" the message "Cool" 5114.

It should be appreciated that the description of the conversation bars above are merely exemplary. More or less information may be displayed in the conversation bars than as shown in FIGS. 5Y-5Z, and the same information may be displayed differently than as shown. For example, a bar for a conversation may display the opposite party (name and avatar) in the conversation, the last action in the conversation (without indicating the sender-receiver direction), a time of the last action, and a viewed/not-viewed icon.

The user can tap on an expanded conversation (e.g., conversation 5108-1 or 5108-3 or 5108-7) to open that conversation and display the sent and received messages and content in the conversation. FIG. 5AA illustrates UI 5000-AA, which shows a user interface for an active conversation 5120 with "Jane Smith." The conversation 5120 includes messages/content 5118 sent by the user, and messages/content 5116 sent by "Jane Smith." For example, the user sent a message 5118-1, an image with the zipper filter 5118-2 (indicated by thumbnail 5119), and a sticker 5118-3 to "Jane Smith." The user received a message 5116-1 and a sticker 5116-2 from "Jane Smith." The user interface also includes an input field 5122, camera icon 5018, gallery icon 5020, emoji icon 5124, stickers icon 5126, and send icon 5034. The input field 5122 shows text and/or emoji and or sticker input by the user prior to sending. The user can select the send icon 5034 to send the input in input field 5122 to the other party in the conversation, in this case "Jane Smith." The user can select the camera icon 5018 to capture an image for sending (and the image is stored in the gallery 240) to "Jane Smith." The user can select the gallery icon 5020 to select an image from the gallery 240 to edit, if desired, and to send to "Jane Smith." The user can select the emoji icon 5124 to open an emoji input interface, as shown in FIG. 5BB. The user can select the stickers icon 5126 to open a stickers interface, as shown in 5CC. In some implementations, the positions of the icons 5018, 5020, 5034, 5124, 5126, and the input field 5122 may be different from the positions as shown in FIG. 5AA and elsewhere. Some of these icons shown here may be omitted, and some icons corresponding to other features and not shown here may be included.

FIG. 5BB illustrates UI 5000-BB, which shows an emoji input interface. The emoji input interface includes emoji keyboard 5128, emoji category selectors 5130 (e.g., last used emoji, respective categories of emoji) for switching to a different emoji keyboard, emoji delete icon 5132 for deleting emoji from the input field 5122, and send icon 5034 that, when selected, activates sending of emojis input into the input field 5122 to the other party in the conversation.

FIG. 5CC illustrates UI 5000-CC, which shows a sticker input interface. The sticker input interface includes sticker selection panel 5134, input field 5122, and send icon 5034. The user can select a sticker from the sticker selection panel 5134 to send to the other party in the conversation.

FIG. 5DD illustrates UI 5000-DD, which shows a conversation 5136 with a "John Smith." In the conversation 5136, the user received an image 5138 with an interactive filter. When the user receives an image with an interactive filter in a conversation, the user can tap on the balloon corresponding to the received image to open the image for viewing, an example of which is described below with reference to FIG. 5FF.

In some implementations, the user can also perform a swipe gesture in a predefined direction on a balloon corresponding to a message or content in the conversation to reveal a delete icon. The user can then select the delete icon to delete the message or content corresponding to that bubble. For example, the user had swiped on the balloon corresponding to the message 5140 to reveal a delete icon (not shown), which the user has selected. In response to the selection of the delete icon, the message 5140 is deleted (indicated by the dotted lines).

In some implementations, if the user had sent the message/content to be deleted, the message/content is deleted from the user's and the recipient's devices, and from the server system 106. In some implementations, if the user was the recipient of the message/content to be deleted, the message/content is deleted from only the user's device. In some other implementations, if the user was the recipient of the message/content to be deleted, the message/content is deleted from the recipient user's and the sender's devices, and from the server system 106.

Similarly, an entire conversation can be deleted, as shown for conversation 5108-7 in UI 5000-EE (FIG. 5EE). Thus, in some implementations, the sender and the recipient can "swipe to delete" a message, an image, a sticker, or an entire conversation universally.

FIG. 5FF illustrates UI 5000-FF, which illustrates an image 5144 opened by the receiving user of the image 5144 from an active conversation. The image 5144 includes a drop 5146 from the drop filter. The receiving user can interact with the drop 5146 (e.g., by tapping on it). In response to the tap, for example, the drop 5146 temporarily and partially reduces in size; the receiving user opens the image from the conversation in interactive mode. In some implementations, when the receiving user opens an image with an interactive filter, a preview of the interactive filter and the pre-filter image is displayed. For example, an animation showing the interactive filter automatically reversing partially and/or temporarily, without user interaction, revealing the pre-filter image, is displayed. In some implementations, images received in a conversation are automatically stored in the memory 206 and collected into the gallery 240.

Displayed along with the opened image 5144 are assent icon 5148, dissent icon 5150, delete icon 5152, and expose request icon 5154. The user can select the delete icon 5152 to delete image 5144 (e.g., delete from memory 206). The user can select the assent icon 5148 to give the image 5144 a favorable rating, or select the dissent icon 5150 to give the image 5144 an unfavorable rating. UI 5000-GG (FIG. 5GG) shows the assent icon 5148 displayed without the dissent icon 5150, in response to selection of the assent icon 5148; the user has given the image 5144 a favorable rating. In some implementations, the ratings for the images are displayed in the image thumbnails in the conversation (e.g., as icon 5139 in thumbnail 5141, FIG. 5EE). In some implementations, icons for the rating for the image after the image has been rated (E.g., icon 5148 in FIG. 5GG) are displayed at different positions (e.g., over the image at either lower corner) than as shown.

As described above, the receiving user opens an image in interactive mode; the user can interact with the interactive filter to reverse the interactive filter. In some implementations, the receiving user is allowed to partially and/or temporarily, but not completely, reverse the interactive filter through interaction unless authorization to "expose" the image is given by the sender of the image. The user can select the expose request icon 5154 to send a request to the sender of the image 5144 to expose the image. The request asks the sender authorization to "unlock" the interactive filter on image 5144, so that the user can completely reverse the filter (e.g., shrink and remove the drop 5416 completely) through interaction with the filter (or, in some implementations, remove the filter entirely and restore the pre-filter image at the receiving user's device), thus exposing the original image completely.

In some implementations, the sending user sets parameters regarding the receiving user's interactions with the interactive filters. For example, when the user selects the send icon 5034 to send an image, the user may be prompted to specify the parameters. Alternatively, or in addition, such parameters may be configured in the settings of the messaging application; the parameters configured in the settings serve as defaults. The parameters may include a time delay after complete or partial reversal of the interactive filter before the filter is restored and whether the receiving user is allowed to completely reverse the filter through interaction with the filter.

When an expose request is made for an image, at the device of the sender of the image, the sending user is notified that an expose request is made. For example, in UI 5000-HH (FIG. 5HH), an "Expose requested" message 5156 is displayed in the balloon 5158 corresponding to the sent image 5144). The sending user selects the balloon 5158 corresponding to the sent image 5144 with the expose request. In response to the selection, a prompt 5160 is displayed. The prompt asks the user whether to expose the original, pre-filter image (i.e., "unlock" the interactive filter for the sent image 5144), and includes "Yes" and "No" buttons that the user can select to respond to the prompt. If the user selects "Yes," a message 5160 indicating authorization of the exposure of the original image is displayed in the balloon 5158 at the sender's client device (as shown in UI 5000-II, FIG. 5II). When authorization to expose an original image is given by the sender, a message is displayed at the receiver's client device. For example, in FIG. 5DD, an exposure message 5142 is displayed in the balloon 5138 corresponding to a received image. In some implementations, messages or notifications of exposure requests and approvals are not displayed; just the thumbnails of the images send or received are displayed in the balloons in a conversation (e.g., messages 5142, 5156, and 5160 are omitted).

As described above with reference to FIG. 5C, when the user selects icon 5024, a user interface for browsing images is sent to other users and received from other users in conversations. FIG. 5JJ illustrates UI 5000-JJ, which includes an interface 5162 for browsing images received from other users in conversations. In some implementations, when the user selects icon 5024, interface 5162 is displayed in response. Within interface 5162, one or more received images 5164 and associated interactive filters are displayed. The received images 5164 are displayed as a list, in an array arrangement, or as cards that can be scrolled forward or backward, for example.

FIG. 5KK illustrates UI 5000-KK, which includes an interface 5166 for browsing images sent to other users in conversations. In some implementations, when the user selects icon 5024, interface 5166 is displayed in response. Within interface 5166, one or more sent images 5168 are displayed. The sent images 5168 are displayed as a list, in an array arrangement, or as cards that can be scrolled forward or backward, for example. The user can browse the images or open an image for display.

Within interface 5162 or 5166, images may be deleted, the user may toggle between display of the images as a list or as cards, and the user may switch back and forth between interface 5162 and 5166 (e.g., by selection of button/icon 5163 or 5165 as appropriate). The positions of buttons/icons 5163 and 5165 may be different than as shown in FIGS. 5JJ-5KK.

In some implementations, ratings of the images are displayed in the interfaces 5162 and 5166. For example, in the interface 5162 for sent images, for the image in focus, ratings from recipients of the image (e.g., number of assents and number of dissents) are displayed. In the interface 5166 for received images, for the image in focus, the rating the recipient user gave to the image (assent or dissent) is displayed.

In some implementations, when the user wants to add a contact with which to start a conversation, the messaging application locates users near the device and which also includes the messaging application. For example, the messaging application may broadcast discoverability by other devices with the messaging application. FIG. 5LL illustrates UI 5000-LL, which shows a list of nearby users 5170 located by the messaging application. In some implementations, the names (usernames or actual names) of the nearby users 5170 are partially revealed, but not enough for the user to ascertain the identities of the nearby users 5170, as in FIG. 5LL. In some other implementations, the names of the nearby users 5170 are not revealed at all. The user may tap on any of the nearby users 5170 to select that user and start a conversation with that user.

Figure 6A:
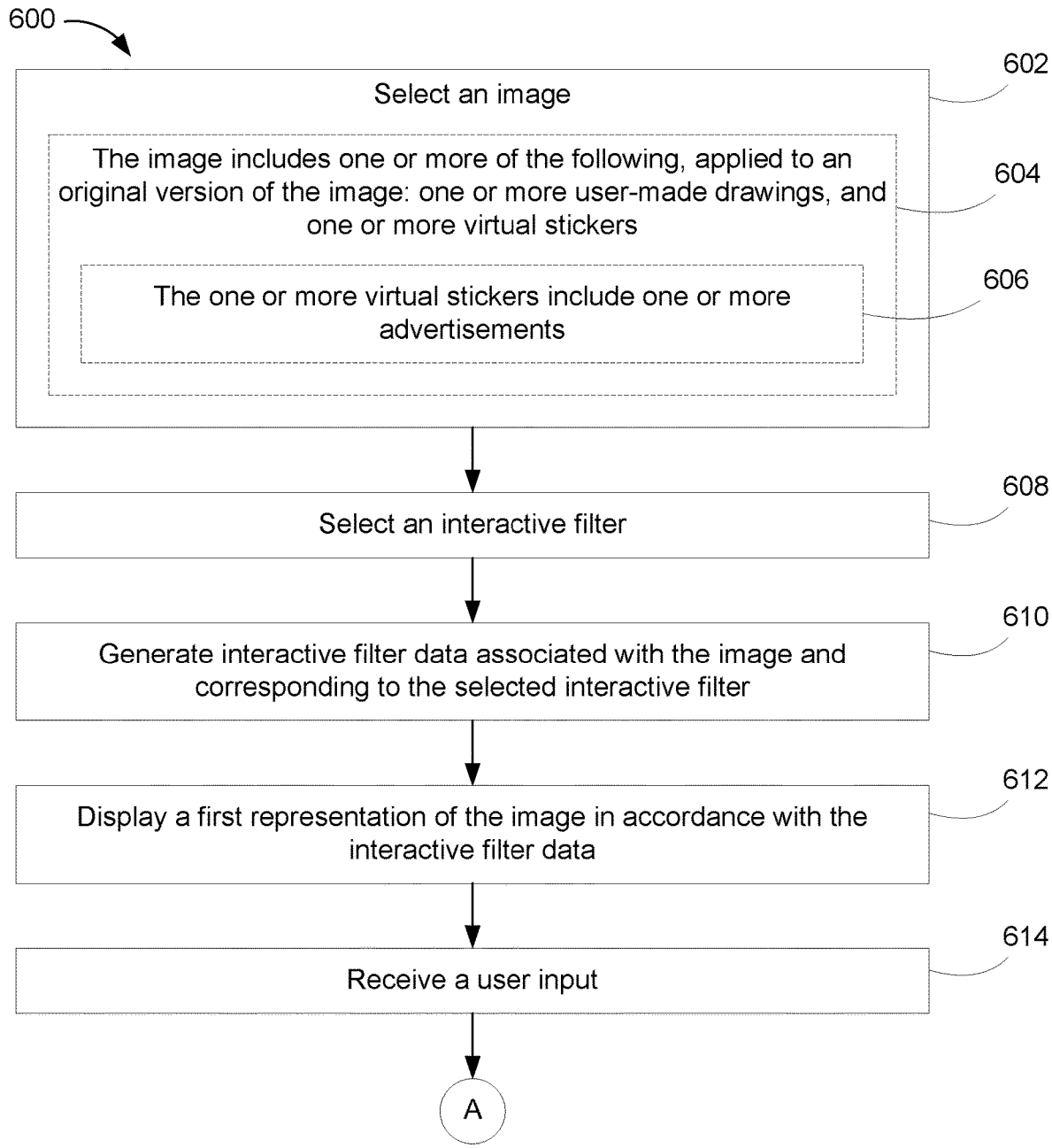
FIGS. 6A-6C illustrate a method of displaying images with interactive filters in accordance with some implementations.
Figure 6B:
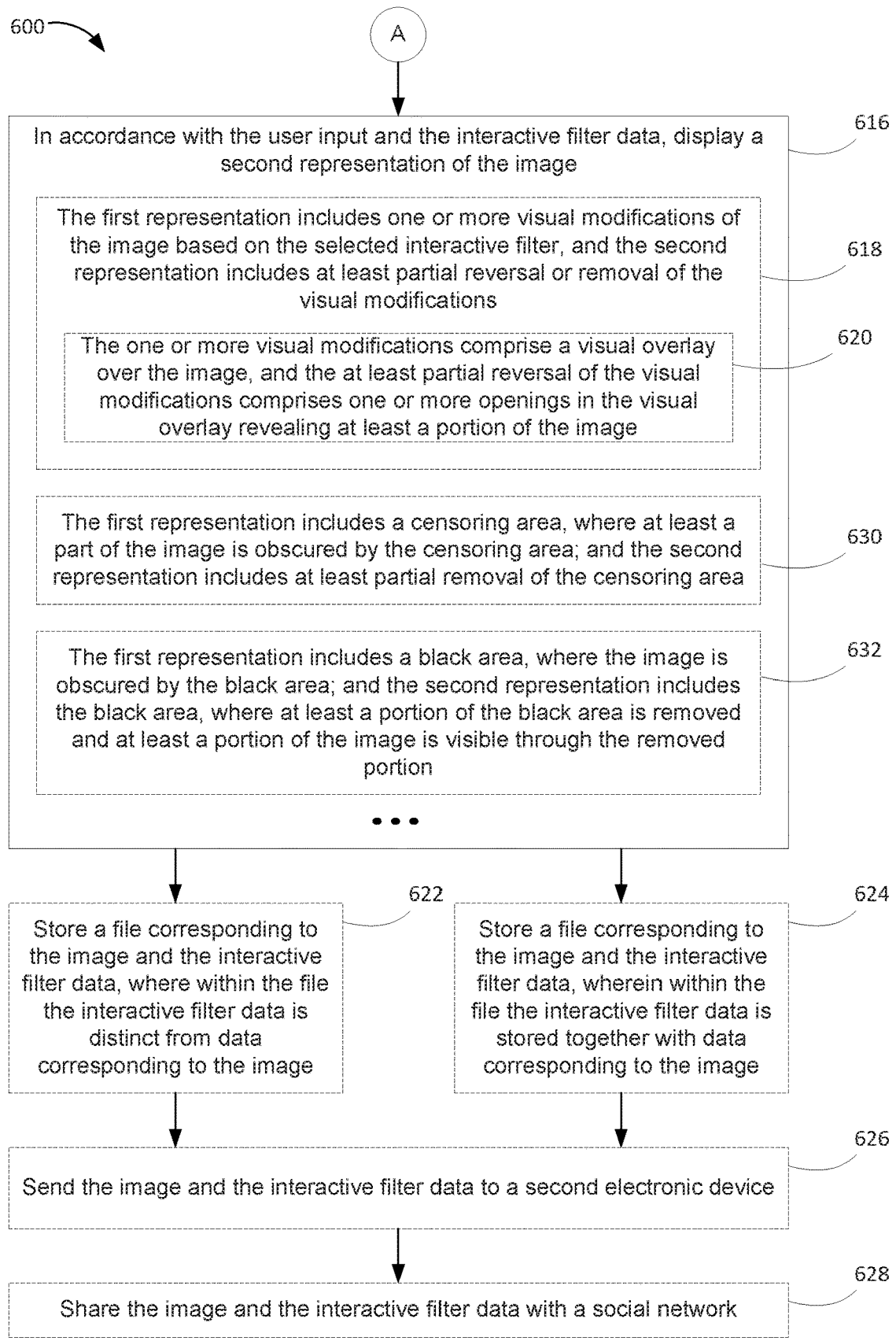
Figure 6C:
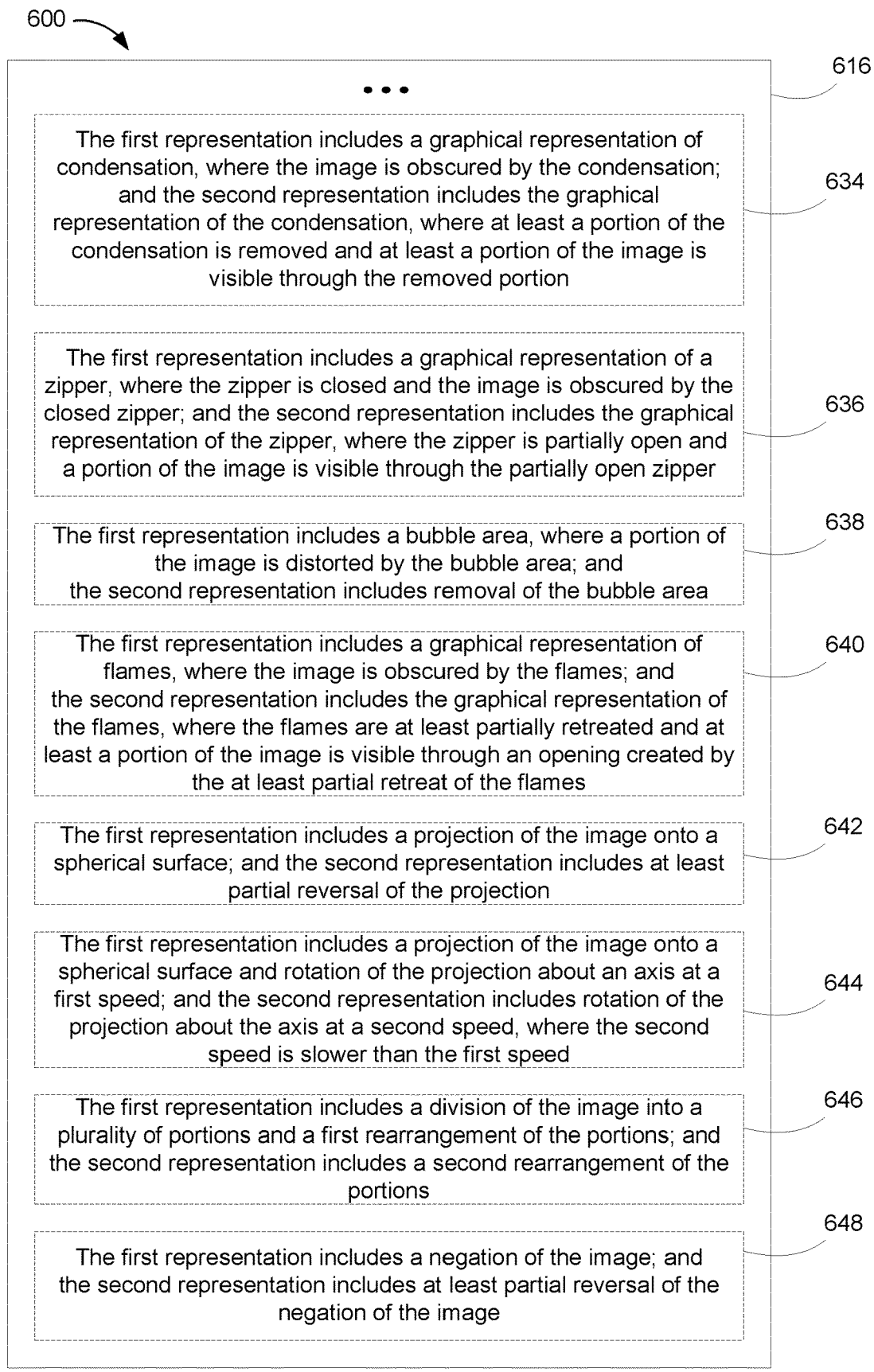

FIGS. 6A-6C are flow diagrams illustrating a method of displaying images with interactive filters on an electronic device (e.g., client device 102; a client device such as a smart phone, a tablet, a laptop, or a desktop computer) in accordance with some implementations. FIGS. 6A-6C correspond to instructions stored in a computer memory or computer readable storage medium (e.g., memory 206).

The device (602) selects an image. The device selects an image and opens the image in an editing interface in response to a user of the device selecting an image from an image browser. The user can open the image browser by selecting the icon 5020.

In some implementations, the image includes one or more of the following, applied to an original version of the image: one or more user-made drawings, and one or more virtual stickers (604). The image may include one or more drawings and/or stickers added on by a user to a version of the image without the drawing and stickers.

In some implementations, the one or more virtual stickers include one or more advertisements (606). The stickers may include brands or logos associated with a company or product or service, or banner advertisements.

The device selects (608) an interactive filter. When the image is opened in editing interface (e.g., as in FIGS. 5D-5U), the device selects an interactive filter in response to the user of the device selecting an icon 5036 corresponding to an interactive filter.

The device generates (610) interactive filter data associated with the image and corresponding to the selected interactive filter. When the selected interactive filter is applied to the image (e.g., as described above with reference to FIGS. 5D-5U), the device generates interactive filter data (e.g., interactive filter data 406, FIGS. 4A-4B) for the image. The interactive filter data specifies the parameters and characteristics of the interactive filter as applied to the image.

The device displays (612) a first representation of the image in accordance with the interactive filter data. The device displays the image with the interactive filter applied. The representation of the image with the interactive filter applied includes, for example, modifications to the image by the filter, such as obscuring the image (e.g., the censoring filter, FIG. 5E; the dark room filter, FIG. 5R), distortions of the image (e.g., drops filter, FIG. 5M; sphere filter, FIG. 5O), or other modifications (e.g., puzzle filter, FIG. 5T).

The device receives (614) a user input. When the first representation of the image is displayed in the interactive mode, a user input is received (e.g., a gesture on the first representation, shaking of the device, blowing into the microphone). In some implementations, the user input directly manipulates the interactive filter (e.g., tap on the censoring area, wiping off the condensation, rearranging tiles of the image).

In accordance with the user input and the interactive filter data, the device display (616) a second representation of the image. The second representation of the image includes the image with the interactive filter at least partially reversed. Thus, for example, in FIGS. 5F-5G, the first representation includes the image 5042 obscured by the closed zipper 5044, and the second representation includes the zipper 5044 partially open, creating an opening 5046 where the image and the image 5042 is visible through the opening.

In some implementations, the first representation includes one or more visual modifications of the image based on the selected interactive filter, and the second representation includes at least partial reversal or removal of the visual modifications (618). For example, in FIGS. 5H-5I, the first representation is the post-filter image 5048-B, which is a negation of pre-filter image 5048-A. The second representation is the pre-filter image 5048-B or somewhere in between the image 5048-B and the image 5049-A.

In some implementations, the one or more visual modifications comprise a visual overlay over the image, and the at least partial reversal of the visual modifications comprises one or more openings in the visual overlay revealing at least a portion of the image (620). An interactive filter may be implemented as an overlay over the image. For example, the condensation 5064 (FIG. 5P) corresponding to the condensation filter may be an overlay over the image 5062, and reversal of the condensation 5064 includes an opening 5066 in the condensation 5064 (FIG. 5Q).

In some implementations, the device stores (622) a file corresponding to the image and the interactive filter data, wherein within the file the interactive filter data is distinct from data corresponding to the image. For example, as shown in FIG. 4B, a container file 412 for Image A is stored. The container file 412 includes distinct image data 404 and interactive filter data 406.

In some implementations, the device stores (624) a file corresponding to the image and the interactive filter data, wherein within the file the interactive filter data is stored together with data corresponding to the image. For example, as shown in FIG. 4C, an image file 422 for Image A is stored. The image file 422 includes the image data and the interactive filter data 424 comingled together.

In some implementations, the device sends (626) the image and the interactive filter data to a second electronic device. For example, an image may be sent to another device, where the user of that device is in a conversation with the user of the sending device.

In some implementations, the device shares (628) the image and the interactive filter data with a social network. An image with an interactive filter may be shared with a social network. For example, the user may select sharing icon 5030 to open an interface for sharing the currently opened image and the associated interactive filter data with a third-party host 120 (e.g., a social network).

In some implementations, an image and the corresponding filter data is shared with or provided to a third-party host as a static image (i.e., in the version of the image shared with the third-party host, the changes to the image by the interactive filter are permanent). In some implementations, the static image includes a link to the image with the interactive filter, stored at a server. When a user viewing the static image at the third-party host clicks on the static image, for example, the image with the interactive filter is opened, and the user can interact with the filter in the image with the interactive filter.

In some implementations, an image and the corresponding filter data is shared with or provided to a third-party host, where users viewing the image at the third-party host may interact with the filter to only partially and/or temporarily reverse the filter. In some embodiments, the image at the third-party host is displayed with an initial animation showing partial and temporary reversal of the interactive filter.

In some implementations, the first representation includes a censoring area, wherein at least a part of the image is obscured by the censoring area; and the second representation includes at least partial removal of the censoring area (630). For example, in FIGS. 5D-5E, the first representation (i.e., the image 5026 with the interactive filter) includes a censoring area 5038 that obscures the head of the human figure 5028. The second representation includes at least partial removal of the censoring area 5038 to reveal at least a part of the head.

In some embodiments, the first representation includes a black area, wherein the image is obscured by the black area; and the second representation includes the black area, wherein at least a portion of the black area is removed and at least a portion of the image is visible through the removed portion (632). For example, in FIGS. 5R-5S, the first representation (i.e., the image 5068 with the interactive filter) includes a black area 5069 that obscures the image 5068. The second representation includes an opening 5070 in the black area 5069.

In some embodiments, the first representation includes a graphical representation of condensation, wherein the image is obscured by the condensation; and the second representation includes the graphical representation of the condensation, wherein at least a portion of the condensation is removed and at least a portion of the image is visible through the removed portion (634). For example, in FIGS. 5P-5Q, the first representation (i.e., the image 5062 with the interactive filter) includes a graphical representation of condensation 5064 that obscures the image 5062. The second representation includes an opening 5066 in the condensation 5064.

In some embodiments, the first representation includes a graphical representation of a zipper, wherein the zipper is closed and the image is obscured by the closed zipper; and the second representation includes the graphical representation of the zipper, wherein the zipper is partially open and a portion of the image is visible through the partially open zipper (636). For example, in FIGS. 5F-5G, the first representation (i.e., the image 5042 with the interactive filter) includes a graphical representation of a zipper 5044 that is closed and thus obscures the image 5042. The second representation includes a partially open zipper 5044, and the image 5042 is visible through the partially open zipper 5044.

In some embodiments, the first representation includes a bubble area, wherein a portion of the image is distorted by the bubble area; and the second representation includes removal of the bubble area (638). For example, in FIGS. 5L-5M, the first representation (i.e., the image 5054 with the interactive filter) includes a drop or bubble 5056 over the ring on the hand in the image 5054 and distorting and/or zooming the ring. The second representation includes removal of the bubble 5056.

In some embodiments, the first representation includes a graphical representation of flames, wherein the image is obscured by the flames; and the second representation includes the graphical representation of the flames, wherein the flames are at least partially retreated and at least a portion of the image is visible through an opening created by the at least partial retreat of the flames (640). For example, in FIGS. 5J-5K, the first representation (i.e., the image 5050 with the interactive filter) includes a graphical representation of flames 5052 obscuring the image 5050. The second representation includes lower or weakened flames 5052, with the image 5050 visible between the lower or weakened flames.

In some embodiments, the first representation includes a projection of the image onto a spherical surface; and the second representation includes at least partial reversal of the projection (642). For example, in FIGS. 5N-5O, the first representation (i.e., the image 5058 with the interactive filter) includes a sphere 5060 where the surface of the sphere 5060 is a projection of the image 5058 onto the surface. The second representation includes reversal of the projection; the projection on the surface of the sphere 5060 projects back toward a two-dimensional image.

In some embodiments, the first representation includes a projection of the image onto a spherical surface and rotation of the projection about an axis at a first speed; and the second representation includes rotation of the projection about the axis at a second speed, wherein the second speed is slower than the first speed (644). For example, in FIG. 5O, the first representation (i.e., the image 5058 with the interactive filter) includes a sphere 5060 where the surface of the sphere 5060 is a projection of the image 5058 onto the surface. The sphere 5060 is spinning at one speed. The second representation includes the sphere 5060 spinning at a slower speed or stops spinning.

In some embodiments, the first representation includes a division of the image into a plurality of portions and a first rearrangement of the portions; and the second representation includes a second rearrangement of the portions (646). For example, in FIG. 5T-5U, the first representation (i.e., the image 5072 with the interactive filter) includes a division of the image 5072 into tiles 5073-1 thru 5073-9, and the tiles 5073 are scrambled (as in FIG. 5T). The second representation includes a different arrangement of the times 5073 in response to the user moving the tiles 5073 around.

In some embodiments, the first representation includes a negation of the image; and the second representation includes at least partial reversal of the negation of the image (648). For example, in FIG. 5H-5I, the first representation (i.e., the image 5048 with the interactive filter) includes a negation of the pre-filter image 5048-A to the post-filter image 5048-B. The second representation includes reversal from the post-filter image 5048-B back toward the pre-filter image 5048-A.

Figure 7:
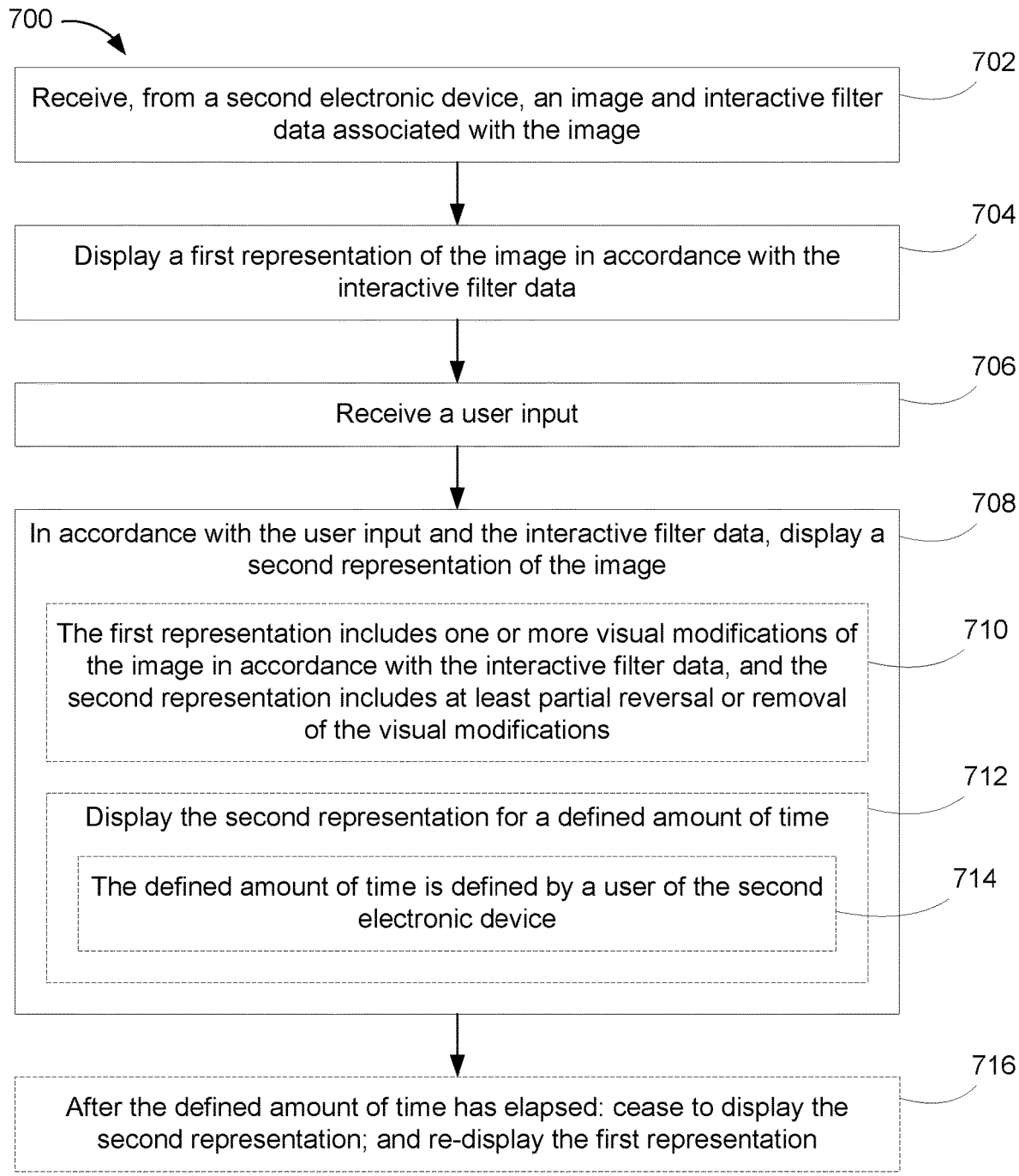
FIG. 7 illustrates a method of displaying images with interactive filters in accordance with some implementations.

FIG. 7 is a flow diagram illustrating a method of displaying images with interactive filters on an electronic device (e.g., client device 102; a client device such as a smart phone, a tablet, a laptop, or a desktop computer) in accordance with some implementations. FIG. 7 corresponds to instructions stored in a computer memory or computer readable storage medium (e.g., memory 206).

The device receives (702), from a second electronic device, an image and interactive filter data associated with the image. For example, a client device 102 receives an image with interactive filter data in a conversation in a messaging application.

The device displays (704) a first representation of the image in accordance with the interactive filter data. When a received image is opened, the image with the interactive filter is displayed with the filter active (e.g., as in FIG. 5FF, where the image 5144 is displayed with a bubble 5146).

The device receives (706) a user input. For example, in FIG. 5FF, the device may receive a user tap gesture on the bubble 5146.

In accordance with the user input and the interactive filter data, the device displays (708) a second representation of the image. For example, in response to the user tap gesture on the bubble 5146, the bubble 5146 is removed, and the image 5144 without the bubble 5146 is displayed.

In some embodiments, the first representation includes one or more visual modifications of the image in accordance with the interactive filter data, and the second representation includes at least partial reversal or removal of the visual modifications (710). For example, in FIG. 5FF, for the first representation, the image 5144 is modified to include the bubble 5146; the bubble 5146 may be an overlay over the image 5144. The second representation includes removal of the bubble 5146.

In some embodiments, the device displays (712) the second representation of the image comprises displaying the second representation for a defined amount of time. For example, the bubble 5146 is removed for a defined amount of time, before the bubble is restored.

In some embodiments, the defined amount of time is defined by a user of the second electronic device (714). The time may be defined by the user who sent the image 5144.

In some embodiments, after the defined amount of time has elapsed, the device ceases to display the second representation, and re-displays the first representation (716). After the defined time has elapsed, the image 5144 without the bubble 5146 ceases to be displayed, and the image 5144 with the bubble 5146 is re-displayed (i.e., the bubble 5146 is restored).

In some implementations, visual characteristics, such as transparency levels, of at least some of the interactive filters are adjustable or otherwise configurable by a user (e.g., the user editing an image and selecting one of these interactive filters to apply to the image). In one example, a transparency level of the condensation 5064 (FIGS. 5P-5Q) is set by a user when the user selects the condensation filter to apply to the image 5062. The transparency level sets how much the image 5062 is visible (but blurred) through the condensation 5064. As another example, an opacity level of the drop(s) 5056 of the drop filter is adjustable.

In some implementations, when an interactive filter is restored after the user's interaction has ended (e.g., the user's finger comes off of the touch screen) or after a time delay, the restoration is displayed as an animation or otherwise gradually. For example, a restoration of the zipper 5044 for the zipper filter (FIGS. 5F-5G) includes an animation showing the zipper object 5064 moving to close the zipper. As another example, a restoration of the condensation filter (FIGS. 5P-5Q) includes a gradual refilling of the opening 5066 with condensation 5064. The rate of the restoration (e.g., how fast/gradual is the restoration animation) may be based on a damping curve or some other mathematical function.

In some implementations, a user selects, and the device applies, two or more interactive filters to an image. In one example, a user first selects a censoring filter to apply to an image, and adds one or more censoring areas (e.g., censoring area 5038, FIGS. 5D-5E) to an image. Then, the user selects the zipper filter and adds a zipper (e.g., zipper 5044, FIGS. 5F-5G) to the image. In the interactive mode, the user first opens the zipper to reveal the image with the censoring area(s), and then taps on the censoring areas to remove the censoring areas. In some implementations, the selected multiple interactive filters are applied in a z-order based on the order of selection of the filters by the user, with the last one selected being the top-most in the z-order (i.e., the first a user sees when the image is opened). For example, in the censoring and zipper combination example above, the zipper is top-most in the z-order and appears first when the image is opened; the censoring areas that obscure portions of the image are obscured by the zipper. It should be appreciated that various filter combinations are possible. In some embodiments, the user can change the application order of already selected filters.

It should be appreciated that the user interfaces illustrated in the drawings and described above are exemplary. Many variations on the user interfaces illustrated in the drawings and described above are possible. For example, positions of icons and buttons within an interface may differ from what is shown in the drawings. Icons and buttons that are shown may be omitted, and icons and buttons that are not shown may be included. Backgrounds may differ from what is shown in the drawings. The arrangement of areas and objects within an interface may differ from what is shown in the drawings.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
    at a first electronic device with a display and an input device:
        receiving, from a second electronic device:
            (i) a native pixilated image, and
            (ii) interactive filter data associated with the native pixilated image, wherein the interactive filter data includes data or metadata identifying a user-selected interactive filter selected by a sender associated with the second electronic device from a plurality of interactive filters, wherein the interactive filter data identifies location information and size information of a plurality of pixels in the native pixilated image to which the user-selected interactive filter is applied, and wherein one or more pixel values of the interactive filter data are independent of one or more corresponding pixel values of the native pixilated image;
        after receiving from the second electronic device the native pixilated image and interactive filter data, displaying a first representation of the native pixilated image in accordance with the interactive filter data on the display, wherein all or a first subset of the pixels of the native pixilated image are replaced in the first representation by applying the user-selected interactive filter to the plurality of pixels in the native pixilated image, such that the first representation of the native pixilated image includes content independent from the native pixilated image;
        receiving a user input from a recipient associated with the first electronic device, with respect to the first representation, from the input device, the user input corresponding to interaction with the user-selected interactive filter applied to the native pixilated image;
        responsive to the user input, and for a limited period of time, displaying on the display, in place of the first representation, a second representation of the native pixilated image corresponding to the user interaction with the interactive filter, wherein none of the pixels in the native pixilated image are replaced or a second subset of the pixels of the native pixilated image are replaced in the second representation, and wherein a number of pixels in the second subset is less than a number of pixels in the first subset; and
        displaying on the display, after the limited period of time has elapsed, the first representation in place of the second representation.

2. The method of claim 1, wherein:
    the first representation includes one or more visual modifications of the native pixilated image based on the user-selected interactive filter, the one or more visual modifications corresponding to changing image data of the identified plurality of the pixels in the native pixilated image, and
    the second representation includes at least partial reversal or removal of the visual modifications by reversing the changed image data of the identified plurality of pixels to original image data in the native pixilated image.

3. The method of claim 2, wherein the one or more visual modifications comprise changing image data of the identified pixels to reflect a visual effect of a visual overlay over the native pixilated image, and the at least partial reversal of the visual modifications comprises one or more openings in the visual overlay revealing at least a portion of the native pixilated image.

4. The method of claim 1, wherein the native pixilated image comprises a user-made drawing or a virtual sticker applied to an original version of the native pixilated image.

5. The method of claim 1, wherein:
the first representation includes a censoring area, wherein at least a part of the native pixilated image is obscured by the censoring area; and
the second representation includes at least partial removal of the censoring area.

6. The method of claim 1, wherein:
the first representation includes a black area, wherein the native pixilated image is obscured by the black area; and
the second representation includes the black area, wherein at least a portion of the black area is removed and at least a portion of the native pixilated image is visible through the removed portion.

7. The method of claim 1, wherein:
the first representation includes a graphical representation of condensation, wherein the native pixilated image is obscured by the condensation; and
the second representation includes the graphical representation of the condensation, wherein at least a portion of the condensation is removed and at least a portion of the native pixilated image is visible through the removed portion.

8. The method of claim 1, wherein:
the first representation includes a graphical representation of a zipper, wherein the zipper is closed and the native pixilated image is entirely obscured by the closed zipper; and
the second representation includes the graphical representation of the zipper, wherein the zipper is partially open and a portion of the native pixilated image is visible through the partially open zipper.

9. The method of claim 1, wherein:
the first representation includes a bubble area, wherein a portion of the native pixilated image is distorted by the bubble area; and
the second representation includes removal of the bubble area.

10. The method of claim 1, wherein:
the first representation includes a division of the native pixilated image into a plurality of portions and a first rearrangement of the portions; and
the second representation includes a second rearrangement of the portions.

11. The method of claim 1, wherein:
the first representation includes a negation of the native pixilated image; and
the second representation includes at least partial reversal of the negation of the native pixilated image.

12. The method of claim 1, wherein the second representation reveals an entirety of the native pixilated image, wherein none of the pixels in the native pixilated image are obscured in the second representation.

13. A first electronic device, comprising:
a display;
an input device;
one or more processors;
memory; and
one or more programs, wherein the one or more programs are stored in the memory and configured to be executed by the one or more processors, the one or more programs including instructions for:
receiving, from a second electronic device:
(i) a native pixilated image, and
(ii) interactive filter data associated with the native pixilated image, wherein the interactive filter data includes data or metadata identifying a user-selected interactive filter selected by a sender associated with the second electronic device from a plurality of interactive filters, and wherein the interactive filter data identifies location information and size information of a plurality of pixels in the native pixilated image to which the user-selected interactive filter is applied, and wherein one or more pixel values of the interactive filter data are independent of one or more corresponding pixel values of the native pixilated image;
after receiving from the second electronic device the native pixilated image and interactive filter data, displaying a first representation of the native pixilated image in accordance with the interactive filter data on the display, wherein all or a first subset of the pixels of the native pixilated image are replaced in the first representation by applying the user-selected interactive filter to the plurality of pixels in the native pixilated image, such that the first representation of the native pixilated image includes content independent from the native pixilated image;
receiving a user input from a recipient associated with the first electronic device, with respect to the first representation, from the input device, the user input corresponding to interaction with the user-selected interactive filter applied to the native pixilated image;
responsive to the user input, and for a limited period of time, displaying on the display, in place of the first representation, a second representation of the native pixilated image corresponding to the user interaction with the interactive filter, wherein none of the pixels in the native pixilated image are replaced or a second subset of the pixels of the native pixilated image are replaced in the second representation, and wherein a number of pixels in the second subset is less than a number of pixels in the first subset; and
displaying on the display, after the limited period of time has elapsed, the first representation in place of the second representation.

14. The first electronic device of claim 13, wherein:
the first representation includes one or more visual modifications of the native pixilated image based on the user-selected interactive filter, the one or more visual modifications corresponding to changing image data of the identified plurality of the pixels in the native pixilated image, and
the second representation includes at least partial reversal or removal of the visual modifications by reversing the changed image data of the identified plurality of pixels to original image data in the native pixilated image.

15. The first electronic device of claim 14, wherein the one or more visual modifications comprise changing image data of the identified pixels to reflect a visual effect of a visual overlay over the native pixilated image, and the at least partial reversal of the visual modifications comprises one or more openings in the visual overlay revealing at least a portion of the native pixilated image.

16. The first electronic device of claim 13, wherein the native pixilated image comprises a user-made drawing or a virtual sticker applied to an original version of the native pixilated image.

17. The first electronic device of claim 13, wherein:
the first representation includes a censoring area, wherein at least a part of the native pixilated image is obscured by the censoring area; and the second representation includes at least partial removal of the censoring area.

18. The first electronic device of claim 13, wherein:
the first representation includes a black area, wherein the native pixilated image is obscured by the black area; and
the second representation includes the black area, wherein at least a portion of the black area is removed and at least a portion of the native pixilated image is visible through the removed portion.

19. The first electronic device of claim 13, wherein:
the first representation includes a graphical representation of condensation, wherein the native pixilated image is obscured by the condensation; and
the second representation includes the graphical representation of the condensation, wherein at least a portion of the condensation is removed and at least a portion of the native pixilated image is visible through the removed portion.

20. The first electronic device of claim 13, wherein:
the first representation includes a graphical representation of a zipper, wherein the zipper is closed and the native pixilated image is entirely obscured by the closed zipper; and
the second representation includes the graphical representation of the zipper, wherein the zipper is partially open and a portion of the native pixilated image is visible through the partially open zipper.

21. The first electronic device of claim 13, wherein:
the first representation includes a bubble area, wherein a portion of the native pixilated image is distorted by the bubble area; and
the second representation includes removal of the bubble area.

22. The first electronic device of claim 13, wherein:
the first representation includes a division of the native pixilated image into a plurality of portions and a first rearrangement of the portions; and
the second representation includes a second rearrangement of the portions.

23. The first electronic device of claim 13, wherein:
the first representation includes a negation of the native pixilated image; and
the second representation includes at least partial reversal of the negation of the native pixilated image.

24. The method of claim 13, wherein the second representation reveals an entirety of the native pixilated image, wherein none of the pixels in the native pixilated image are obscured in the second representation.

25. A method, comprising:
at an electronic device with a display and an input device:
obtaining a selection of a native pixilated image;
receiving a selection of an interactive filter to apply to the native pixilated image;
generating interactive filter data uniquely associated with the native pixilated image and corresponding to the interactive filter, wherein the interactive filter data includes data or metadata identifying the interactive filter, wherein the interactive filter data identifies location information and size information of a plurality of pixels in the native pixilated image to which the interactive filter is applied, wherein one or more pixel values of the interactive filter data are independent of one or more corresponding pixel values of the native pixilated image, and wherein the native pixilated image, the interactive filter, and the interactive filter data collectively format for sequential display on a remote electronic device of:
(i) a first representation of the native pixilated image in accordance with the interactive filter data, wherein all or a first subset of the pixels of the native pixilated image are replaced in the first representation by applying the interactive filter to the plurality of pixels in the native pixilated image, such that the first representation of the native pixilated image includes content independent from the native pixilated image,
(ii) responsive to a user input with respect to the first representation, the user input corresponding to interaction with the interactive filter applied to the native pixilated image, in accordance with a limited time, a second representation of the native pixilated image corresponding to the user interaction with the interactive filter, in place of the first representation, wherein none of the pixels in the native pixilated image are replaced or a second subset of the pixels of the native pixilated image are replaced in the second representation, and wherein a number of pixels in the second subset is less than a number of pixels in the first subset, and
(iii) the first representation in place of the second representation after the limited period of time has elapsed.

26. The method of claim 25, wherein;
the first representation includes one or more visual modifications of the native pixilated image based on the user-selected interactive filter, the one or more visual modifications corresponding to changing image data of the identified plurality of the pixels in the native pixilated image, and
the second representation includes at least partial reversal or removal of the visual modifications by reversing the changed image data of the identified plurality of pixels to original image data in the native pixilated image.

27. The method of claim 26, wherein the one or more visual modifications comprise changing image data of the identified pixels to reflect a visual effect of a visual overlay over the native pixilated image, and the at least partial reversal of the visual modifications comprises one or more openings in the visual overlay revealing at least a portion of the native pixilated image.

28. The method of claim 25, wherein the native pixilated image comprises a user-made drawing or a virtual sticker applied to an original version of the native pixilated image.

29. The method of claim 25, wherein:
the first representation includes a censoring area, wherein at least a part of the native pixilated image is obscured by the censoring area; and
the second representation includes at least partial removal of the censoring area.

30. The method of claim 25, wherein:
the first representation includes a black area, wherein the native pixilated image is obscured by the black area; and
the second representation includes the black area, wherein at least a portion of the black area is removed and at least a portion of the native pixilated image is visible through the removed portion.

31. The method of claim 25, wherein:
the first representation includes a graphical representation of condensation, wherein the native pixilated image is obscured by the condensation; and the second representation includes the graphical representation of the condensation, wherein at least a portion of the condensation is removed and at least a portion of the native pixilated image is visible through the removed portion.

32. The method of claim 25, wherein the second representation reveals an entirety of the native pixilated image, wherein none of the pixels in the native pixilated image are obscured in the second representation.

33. An electronic device, comprising:
a display;
an input device;
one or more processors;
memory; and
one or more programs, wherein the one or more programs are stored in the memory and configured to be executed by the one or more processors, the one or more programs including instructions for:
obtaining a selection of a native pixilated image;
receiving a selection of an interactive filter to apply to the native pixilated image;
generating interactive filter data uniquely associated with the native pixilated image and corresponding to the interactive filter, wherein the interactive filter data includes data or metadata identifying the interactive filter, wherein the interactive filter data identifies location information and size information of a plurality of pixels in the native pixilated image to which the interactive filter is applied, wherein one or more pixel values of the interactive filter data are independent of one or more corresponding pixel values of the native pixilated image, and wherein the native pixilated image, the interactive filter, and the interactive filter data collectively format for sequential display on a remote electronic device of:

(i) a first representation of the native pixilated image in accordance with the interactive filter data, wherein all or a first subset of the pixels of the native pixilated image are replaced in the first representation by applying the interactive filter to the plurality of pixels in the native pixilated image, such that the first representation of the native pixilated image includes content independent from the native pixilated image, (ii) responsive to a user input with respect to the first representation, the user input corresponding to interaction with the interactive filter applied to the native pixilated image, in accordance with a limited time, a second representation of the native pixilated image corresponding to the user interaction with the interactive filter, in place of the first representation, wherein none of the pixels in the native pixilated image are replaced or a second subset of the pixels of the native pixilated image are replaced in the second representation, and wherein a number of pixels in the second subset is less than a number of pixels in the first subset, and (iii) the first representation in place of the second representation after the limited period of time has elapsed.

* * * * *